United States Patent
Hunt et al.

(10) Patent No.: US 10,861,106 B1
(45) Date of Patent: Dec. 8, 2020

(54) COMPUTER GENERATED USER INTERFACES, COMPUTERIZED SYSTEMS AND METHODS AND ARTICLES OF MANUFACTURE FOR PERSONALIZING STANDARDIZED DEDUCTION OR ITEMIZED DEDUCTION FLOW DETERMINATIONS

(71) Applicant: INTUIT INC., Mountain View, CA (US)

(72) Inventors: Sharon E. Hunt, San Diego, CA (US); Yao H. Morin, San Diego, CA (US); Alexis Hartford, San Diego, CA (US); Brian Lyle Hofmaister, Poway, CA (US); Andrew Roe, Oceanside, CA (US); Varadarajan Sriram, Escondido, CA (US); Sylvia R. Knust, La Mesa, CA (US); Thai D. Dang, San Diego, CA (US); Robert E. Bamford, San Diego, CA (US); Carol Ann Howe, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 468 days.

(21) Appl. No.: 14/996,171

(22) Filed: Jan. 14, 2016

(51) Int. Cl.
*G06Q 40/00* (2012.01)

(52) U.S. Cl.
CPC .................... *G06Q 40/123* (2013.12)

(58) Field of Classification Search
None
See application file for complete search history.

(56) References Cited

U.S. PATENT DOCUMENTS

| | | | |
|---|---|---|---|
| 5,822,741 A * | 10/1998 | Fischthal | G06K 9/62 706/16 |
| 6,922,488 B2 | 7/2005 | Mastrianni et al. | |
| 6,973,418 B1 | 12/2005 | Kirshenbaum | |
| 7,539,635 B1 | 5/2009 | Peak | |

(Continued)

FOREIGN PATENT DOCUMENTS

WO   WO 2016/039779   3/2016

OTHER PUBLICATIONS

U.S. Appl. No. 14/726,051, filed May 29, 2015.

(Continued)

*Primary Examiner* — Mike Anderson
*Assistant Examiner* — Dario Bianco
(74) *Attorney, Agent, or Firm* — DLA Piper LLP (US)

(57) ABSTRACT

Computing systems, computer-implemented methods, articles of manufacture for making personalized assessments regarding whether a taxpayer should be presented with a standardized flow of interview screens, questions or topics, or with an itemized deduction flow of interview screens, questions or topics. This assessment is made utilizing a generated user interface and analytic data elements that generate outputs that reflect the taxpayer's data, e.g., in the form of ranges of numerical data that are based on the taxpayer's data. User interface elements representing response options in the form of range data may be selected by the user without entering specific electronic tax return data for the purpose of making standardized v. itemized determinations and to determine which questions or topics can be bypassed.

18 Claims, 44 Drawing Sheets

(56) References Cited

U.S. PATENT DOCUMENTS

| | | |
|---|---|---|
| 7,788,137 B1 | 8/2010 | Tifford |
| 7,797,166 B1 | 9/2010 | Bradley et al. |
| 8,090,794 B1 | 1/2012 | Kilat et al. |
| 8,099,309 B1 | 1/2012 | Bober |
| 8,185,463 B1 | 5/2012 | Ball |
| 8,190,499 B1 | 5/2012 | McVickar |
| 8,407,113 B1* | 3/2013 | Eftekhari ............. G06Q 40/123 705/31 |
| 8,452,676 B1 | 5/2013 | Talan |
| 8,478,671 B1 | 7/2013 | Tifford |
| 8,490,018 B2 | 7/2013 | Carter et al. |
| 8,656,273 B1 | 2/2014 | Tifford |
| 8,768,313 B2 | 7/2014 | Rodriguez |
| 8,806,444 B1 | 8/2014 | Podgorny et al. |
| 8,909,568 B1 | 12/2014 | Mann et al. |
| 9,355,650 B2 | 5/2016 | Dimitriadis et al. |
| 9,378,065 B2 | 6/2016 | Shear et al. |
| 9,444,824 B1 | 9/2016 | Balazs et al. |
| 9,648,171 B1 | 5/2017 | Eftekhari et al. |
| 9,760,953 B1 | 9/2017 | Wang |
| 9,891,792 B1 | 2/2018 | Morin et al. |
| 9,983,859 B2 | 5/2018 | Mascaro et al. |
| 9,990,544 B1 | 6/2018 | Uribe et al. |
| 10,013,721 B1 | 7/2018 | Laaser et al. |
| 2002/0152457 A1 | 10/2002 | Jahnke |
| 2003/0144868 A1 | 7/2003 | MacIntyre et al. |
| 2006/0143093 A1 | 6/2006 | Brandt et al. |
| 2006/0155632 A1 | 7/2006 | Cherkas et al. |
| 2006/0294084 A1 | 12/2006 | Patel et al. |
| 2008/0071703 A1 | 3/2008 | Evans |
| 2008/0127127 A1 | 5/2008 | Chitgupakar et al. |
| 2008/0147494 A1 | 6/2008 | Larson |
| 2009/0106178 A1 | 4/2009 | Chu |
| 2009/0313086 A1 | 12/2009 | Lee et al. |
| 2010/0306024 A1* | 12/2010 | Ryan .................... G06F 3/0482 705/7.32 |
| 2011/0264569 A1 | 10/2011 | Houseworth et al. |
| 2011/0288868 A1 | 11/2011 | Lloyd et al. |
| 2012/0005056 A1 | 1/2012 | Newman |
| 2012/0109792 A1* | 5/2012 | Eftekhari ............... G06Q 40/02 705/31 |
| 2012/0239416 A1 | 9/2012 | Langva |
| 2012/0284082 A1 | 11/2012 | Newman |
| 2013/0144715 A1 | 6/2013 | Kranzley |
| 2013/0159826 A1 | 6/2013 | Mason |
| 2013/0198047 A1 | 8/2013 | Houseworth et al. |
| 2013/0268468 A1 | 10/2013 | Vijayaraghavan et al. |
| 2013/0282539 A1 | 10/2013 | Murray |
| 2013/0311286 A1 | 11/2013 | Detwiler |
| 2014/0067518 A1 | 3/2014 | McGovern |
| 2014/0068600 A1 | 3/2014 | Ashok et al. |
| 2014/0075336 A1 | 3/2014 | Curtis et al. |
| 2014/0122381 A1 | 5/2014 | Nowozin |
| 2014/0201045 A1 | 7/2014 | Pai et al. |
| 2014/0214636 A1* | 7/2014 | Rajsky ................. G06Q 40/123 705/31 |
| 2014/0359261 A1 | 12/2014 | Collins et al. |
| 2015/0227962 A1 | 8/2015 | Wical et al. |
| 2016/0012350 A1 | 1/2016 | Narayanan et al. |
| 2016/0078567 A1 | 3/2016 | Goldman |
| 2016/0098804 A1 | 4/2016 | Mascaro et al. |
| 2016/0103667 A1 | 4/2016 | Chen et al. |
| 2016/0180470 A1 | 6/2016 | Mascaro et al. |
| 2016/0217534 A1 | 7/2016 | Goldman et al. |
| 2016/0247239 A1* | 8/2016 | Houseworth ........ G06Q 40/123 |
| 2016/0267397 A1 | 9/2016 | Carlsson |
| 2016/0275627 A1 | 9/2016 | Wang |
| 2016/0350870 A1 | 12/2016 | Morin |
| 2017/0004585 A1 | 1/2017 | Dang |
| 2017/0090893 A1 | 3/2017 | Aditya et al. |
| 2017/0178199 A1 | 6/2017 | Cessna et al. |
| 2017/0186097 A1 | 6/2017 | Mascaro et al. |
| 2017/0200087 A1 | 7/2017 | Mascaro et al. |
| 2017/0300933 A1 | 10/2017 | Mascaro et al. |
| 2017/0308960 A1 | 10/2017 | Mascaro et al. |
| 2017/0315791 A1 | 11/2017 | Mascaro et al. |
| 2018/0114275 A1 | 4/2018 | Wang |

OTHER PUBLICATIONS

U.S. Appl. No. 14/996,162, filed Jan. 14, 2016.
U.S. Appl. No. 14/996,158, filed Jan. 14, 2016.
U.S. Appl. No. 15/363,195, filed Nov. 29, 2016.
CalcXML, "Should I Itemize or Take the Standard Deduction?—Financial Calculators from CalcXML", Feb. 23, 2011 (Year: 2011).
Maertin, James, C.P.A., "Deductions", Feb. 10, 2007, http://jamesdance.com/deductions.htm (Year: 2007).
Hoeting et al., "Bayesian Model Averaging," Technical Report 335, Department of Statistics, University of Washington, May 28, 1998, 40 pages.
Rokach et al., "Top-Down Induction of Decision Trees Classifiers—A Survey," IEEE Transactions on Systems, Man, and Cybernetics—Part C: Applications and Reviews, vol. 35, No. 4, Nov. 2005, pp. 476-487.
Araujo et al., "Ensemble Forecasting of Species Distributions," ScienceDirect Trends in Ecology and Evolution, vol. 22, No. 1, Sep. 29, 2006, pp. 42-47.
Agrawal et al., "Thompson Sampling for Contextual Bandits with Linear Payoffs," Proceedings of the $30^{th}$ International Conference on Machine Learning, Atlanta, Georgia, USA, JMLR: W&CP vol. 28, 2013, 9 pages.
Irsoy et al., "Budding Trees," $22^{nd}$ International Conference on Pattern Recognition, 2014, pp. 3582-3587.
File History of U.S. Appl. No. 14/726,051, filed May 29, 2015 now U.S. Pat. No. 10,204,382 issued Feb. 12, 2019.
File History of U.S. Appl. No. 14/996,162, filed Jan. 14, 2016.
File History of U.S. Appl. No. 14/996,158, filed Jan. 14, 2016.
Partial File History of U.S. Appl. No. 14/996,162, filed Jan. 14, 2016 (Apr. 18, 2019 to present).
Partial File History of U.S. Appl. No. 14/996,158, filed Jan. 14, 2016 (Apr. 18, 2019 to present).
File History of U.S. Appl. No. 15/363,195, filed Nov. 29, 2016.
File History of U.S. Appl. No. 15/363,195, filed Nov. 29, 2016 (Oct. 21, 2019 to present).
Partial File History of U.S. Appl. No. 14/996,16, filed Jan. 14, 2016 (Mar. 17, 2020-present).
Partial File History of U.S. Appl. No. 14/996,158, filed Jan. 14, 2016 (Mar. 17, 2020-present).
Partial File History of U.S. Appl. No. 15/363,195, filed Nov. 29, 2016 (Mar. 17, 2020-present).
Partial File History of U.S. Appl. No. 15/363,195 filed Nov. 29, 2016 dated Oct. 5, 2020 (Sep. 18, 2020—present).

* cited by examiner

SVI

Income Landing Table

My Stuff

Landing Table

FIG. 8A

D & C transition

FIG. 8G

Deduction Summary

Great, you're getting the maximum refund possible with

Federal Standard Deduction ⌄

Let's move onto healthcare.

[Continue]
< Back

Healthcare

Did you have health insurance coverage in 2014?

Coverage includes plans through work, retirement, Medi-Cal, Medicare, VA, and others. What else counts?

○ I had health insurance coverage all year.

○ I didn't have it at any point.

○ I had it for part of 2014.

What if I have an exemption certificate number (ECN)?

[Continue]
< Back

---

Great, you're getting the maximum refund possible with

Federal Standard Deduction
This deduction for $6,300 will save you the most money.
☐ Change my deduction Let's move onto healthcare.

[Continue]
< Back

FIG. 8K

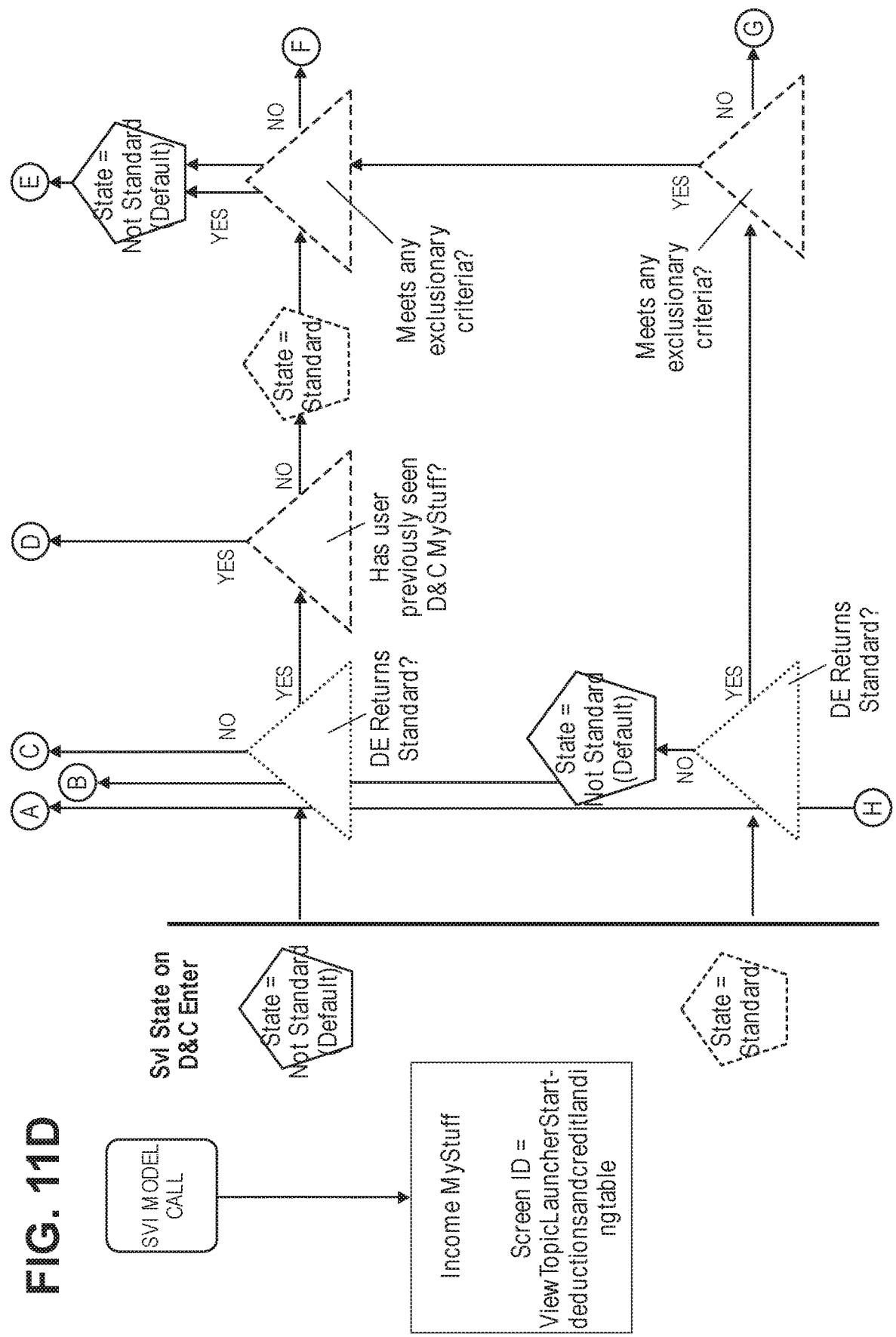

SvI Gateway: First Visit + Accessed from MyStuff (L)

About these tax breaks...

Let's save some time -- and still get your biggest deduction

Based on what you've told us so far, your biggest deduction is shaping up to be the Standard Deduction.

This means we won't need details or exact amounts for these tax breaks.

Next, we'll ask some questions to make sure the Standard Deduction is right for you.

(N)

[ Ok, let's confirm this ]

< Back

SvI Gateway: First Visit + Accessed from SvI Topic in Landing Table (Q)

About donations...

Let's save some time -- and still get your biggest deduction

Based on what you've told us so far, your biggest deduction is shaping up to be the Standard Deduction.

This means we won't need details or exact amounts for donations

Next, we'll ask some questions to make sure the Standard Deduction is right for you.

[ Ok, let's confirm this ]

< Back

SVI interview

Confirming your biggest deduction...

Did you have tax prep fees over $100?

[ Yes ]  [ No ]

About how much did you donate to charity?
Learn more

| $0-$400 | $401-$800 | Over $800 |

Did you have medical expenses over $6,000?
Learn more

[ Yes ]  [ No ]

---

Let's also check a few other things

Do you own a home?
Learn more

[ Yes ]  [ No ]

Do you have over $1,200 in job expenses?
Learn more

[ Yes ]  [ No ]

Any car registration fees? If so, about how much?
Learn more

| $0-$200 | $201-$500 | Over $500 |

That really helps. Thanks.

[ Continue ] → (AC)

< Back

COMPUTER GENERATED USER INTERFACES, COMPUTERIZED SYSTEMS AND METHODS AND ARTICLES OF MANUFACTURE FOR PERSONALIZING STANDARDIZED DEDUCTION OR ITEMIZED DEDUCTION FLOW DETERMINATIONS

CROSS-REFERENCE TO RELATED APPLICATIONS

This application is related to U.S. application Ser. No. 14/726,051, filed May 29, 2015, entitled METHOD AND SYSTEM FOR IDENTIFYING USERS WHO BENEFIT FROM FILING ITEMIZED DEDUCTIONS TO REDUCE AN AVERAGE TIME CONSUMED FOR USERS PREPARING TAX RETURNS WITH A TAX RETURN PREPARATION SYSTEM, U.S. application Ser. No. 14/996,158, filed Jan. 14, 2016, entitled COMPUTER GENERATED USER INTERFACES, COMPUTERIZED SYSTEMS AND METHODS AND ARTICLES OF MANUFACTURE FOR DETERMINING AND DISPLAYING NUMERICAL RANGE DATA FOR STANDARDIZED VERSUS ITEMIZED FLOW DETERMINATIONS DURING PREPARATION OF ELECTRONIC TAX RETURN, and U.S. application Ser. No. 14/996,162, filed Jan. 14, 2016, entitled COMPUTER GENERATED USER INTERFACES, COMPUTERIZED SYSTEMS AND METHODS AND ARTICLES OF MANUFACTURE FOR OVERRIDING STANDARDIZED FLOW DETERMINATION DURING PREPARATION OF ELECTRONIC TAX RETURN, the contents of all of which are incorporated herein by reference as though set forth in full.

BACKGROUND

Computerized tax return preparation applications (such as TURBOTAX tax return preparation application) have been utilized by many taxpayers to prepare and file electronic tax returns with various tax authorities. TURBOTAX is a registered trademark of Intuit Inc., Mountain View, Calif. Traditional tax return preparation applications, however, are often structured with inherent limitations as a result of being in the form of a fixed or predetermined and pre-packaged, structure or sequence of questions that are presented to all users as part of the interview process. These traditional tax return preparation systems use a sequence of interview questions, and/or other user experiences, that are static features and that are typically hard-coded elements of the tax return preparation system, and consequently, are not amenable to effective or efficient modification which, in turn, leads to "standardized" or inflexible electronic tax return user experiences, and user experience changes require redeployment of the tax return preparation system itself. Consequently, while traditional tax return preparation applications may be comprehensive, they often present interview questions or screens to a user that are not relevant to the user. This has a number of potentially negative consequences including, for example, increased time and computing resources required to prepare an electronic tax return, user confusion, frustration and dissatisfaction with the tax return preparation application, and an impression that the tax return preparation application is impersonal or not applicable to the user, which may result in users abandoning the preparation process, switching to another tax return preparation application, or hiring a tax professional to prepare the electronic tax return, which is often much more expensive than using a tax return preparation application.

Further, with traditional tax return preparation applications, it may the case that the user has expenses that could be itemized (such as moving expenses or tax return preparation costs), and given these possible deductions, the user proceeds with answering the series of itemized deduction questions, many of which still do not apply to the user, but with the result that this effort was for naught since the amount of itemized deductions is less than a threshold and the standard deduction is the better option for that user.

Accordingly, what is needed is a computerized tax return preparation system, computer implemented method, computer program product, and interactive and adaptive user interfaces that provide for analytics applications that can identify taxpayers who are standard deduction filers in contrast to itemized deduction filers, so that the more complicated and involved itemized deduction questions can be bypassed, and that provide for confirmation of such standard versus itemized determinations while accounting for taxpayer attributes and doing so with a user friendly interactive user interface that does not require the user to enter specific electronic tax return data, and in order to reduce the time required to prepare electronic tax returns, utilize computing device resources more efficiently, and to provide an improved and personalized user experience.

SUMMARY

Embodiments are related to computer-centric technologies such as computerized tax return preparation applications, user interfaces and interactions with user interfaces. Computerized tax return preparation applications may be desktop or local versions that execute on computing devices, mobile application, or on-line versions that are accessible by browsers executing on user computing devices.

Embodiments are related to computing device resource management and improving computing resource efficiency during preparation of electronic tax returns.

Embodiments are related to determining when certain interview screens, topics and questions, and in particular, itemized deduction interview screens, topics and questions, can be bypassed.

Embodiments are related to providing personalized electronic tax return preparation experiences while also providing for more efficient utilization processor and memory resources and network communications (in the case of on-line versions) during preparation of an electronic tax return by bypassing certain interview screens, questions and topics.

Embodiments are related to how determinations to bypass itemized deduction interview screens, topics or questions can be confirmed or validated, and how determinations to bypass itemized deduction interview screens, topics or questions can be confirmed but subsequently overridden or invalidated.

Embodiments are related to how determinations to bypass itemized deduction interview screens, topics or questions can be confirmed or validated by use of a special purpose, personalized user interface that is presented by a tax return preparation application during preparation of an electronic tax return.

Embodiments are related to determining and displaying of numerical range data and utilizing numerical ranges for purposes of confirming determinations to proceed with a standard deduction flow and bypassing itemized deduction interview screens, topics and questions.

Embodiments are related to generating user interfaces that include numerical range data and user interface elements for numerical range data for purposes of making standard vs. itemized deduction determinations.

Embodiments are related to confirming determinations to proceed with a standard deduction flow and bypassing itemized deduction interview screens, topics and questions without requiring the user to enter or type specific numerical data and instead answering questions concerning presented ranges of data.

Embodiments are also related to how interview screens or electronic tax forms of a computerized tax return preparation application are presented to a user, e.g., in a standard deduction flow versus itemized deduction flow, and how such determinations are confirmed by use of personalized user interfaces generated during preparation of an electronic tax return. Personalized interfaces include ranges of numerical data such that it is not required for users to enter, or know exactly, numerical data for a particular tax topic or question. These determinations are confirmed by use of user interface elements and associated numerical range data independently of the electronic tax return data itself, i.e., responses involving selection of a range of numerical data or a response to a question involving a range of numerical data is not entered into the electronic tax return and instead is limited to standardized versus itemized related determinations.

Embodiments are related to computer generated user interfaces the content of which is determined during preparation of electronic tax returns and personalizing user interface content and tax return preparation experiences.

Embodiments are related to modifying user interfaces and user experiences on the fly in real time during preparation of an electronic tax return, and adapting user interfaces in response to changes in electronic tax return data and user actions.

Embodiments are related to computer executable predictive models and/or data analytic elements (which may be a predictive model or a programmed rules or business logic) and integration of results generated by such predictive models and data analytic elements into tax return preparation applications. Results generated by analytic data elements are incorporated into user interfaces, e.g., into a particular interview screen or electronic tax form, and user interface elements such as "buttons" or other UI elements may be encoded with or reflect a result generated by a predictive model or data analytics element.

One embodiment is directed to a computing system implemented method in which a computerized tax return preparation system that is executable to prepare and electronically file an electronic tax return receives taxpayer data (e.g., manually entered data and/or imported from an electronic source or an indication of a user selection such as a selected interview screen, form or tax topic) and executes a first predictive model with the received taxpayer data as input(s). The computerized tax return preparation system transforms or modifies a user experience state from an itemized deduction experience or state to a standard deduction experience or state based at least in part upon a result generated by the first predictive model. After this modification or transformation, at least one data analytics element (which may be in the form of another predictive model or a computer executable rule or business logic that may be a programmed component of the tax return preparation application), is executed. A result generated by the data analytics element is used to determine questions and respective response options that involve ranges of numerical data. During preparation of the electronic tax return, a user interface is generated and includes questions and response options determined based on the result generated by the data analytic element and user interface elements that represent or are encoded as respective response options. The user interface, e.g., in the form of an interview screen or worksheet, includes ranges of numerical data associated with respective determined questions and response options. Question text may specify numerical ranges, or the user interface elements may represent or be encoded as respective response options for numerical ranges. The generated user interface is presented to the preparer through a display of the computing system. A user interface element is selected by the preparer when answering a determined question, e.g., by use of a mouse, keyboard or touchscreen. Since embodiments involve whether to present an itemized deduction flow or a standard deduction flow (as opposed to entry of actual tax return data), selection of a user interface element in order to answer a presented question in the user interface does not require, and does not result in, entry of specific numerical data into the electronic tax return (unless the user separately navigates to a different screen or form and enters data independently of the user interface that is generated). The standard deduction flow or experience may be confirmed based at least in part upon the response options associated with selected user interface elements, with the result that itemized deduction interview screens, questions and topics can be bypassed to reduce a number of questions presented to the preparer and to reduce computing system resources required to prepare the electronic tax return, and in the case of an on-line tax return preparation application, this may involve a reduced number of network communications and associated computing resources. If itemized deductions are to be subsequently addressed, the user's specific data for these matters are included in the electronic tax return (in contrast to answers to questions concerning standardized versus itemized determinations or confirmations).

Another embodiment involves how such standard deduction state or flow determinations, or confirmations of same, can be overridden or invalidated. For example, after the standard versus itemized deduction analysis has been completed, and the result is that the standard deduction state or flow should be utilized, before the itemized to standard deduction modification is implemented, the computerized tax return preparation system may determine whether this determination should be overridden or invalidated. For this purpose, according to one embodiment, the received taxpayer data is analyzed to determine whether it includes one or more pre-determined types or pre-determined combinations of pre-determined types of taxpayer data. If so, the itemized deduction flow is maintained and the computerized tax return preparation system overrides the determination that the deduction state or flow should be changed to a standard deduction state or flow. In another embodiment, rather than, or in addition to, making these "override" determinations before modifying a state or flow to a standard deduction state or flow, the computerized tax return preparation may also determine, after the state or flow has been modified, whether the received taxpayer data includes one or more pre-determined types or pre-determined combinations of pre-determined types of taxpayer data, or whether the preparer has navigated to a pre-determined interview screen or selected a certain form or topic, in which case the computerized tax return preparation system may override the prior standard deduction state or flow determination and revert back to the itemized deduction state or flow in view of these taxpayer data changes.

Yet another embodiment involves standard versus itemized state or flow determinations, and user interfaces for confirming a standard deduction state or flow that is personalized for a taxpayer. Thus, when a state or flow of the computerized tax return preparation system is modified from itemized deduction standard deduction based at least in part upon a result generated by the first predictive model, a personalized user interface which, according to one embodiment, is not a pre-defined, programmed screen of the computerized tax return preparation system, is generated during preparation of the electronic tax return for purposes of whether the standard deduction state or flow determination should be confirmed, or whether it should be overridden or invalidated. For example, a personalized user interface may include questions and respective response options that are determined to be pertinent to the taxpayer and are pertinent to a standard versus itemized state or flow determination or confirmation for that particular taxpayer. Questions and response options may be based at least in part upon the taxpayer data, which is an input to a data analytics element utilized for confirmation. A generated user interface, e.g., in the form of an interview screen, may include user interface elements such as "buttons," which are encoded as, or represent, numerical ranges of data that were determined based at least in part upon execution of the data analytics element. Thus, for example, one user may be presented with user interface elements for range data of $0-1000, $1001-3000, and $3001-6000, whereas another user may be presented with other range data of 0-2000, 2001-4000 and 4001-7000. These numerical ranges serve as response options or answers to determined or selected questions concerning whether a standard deduction flow or state should be confirmed such that itemized deduction questions or topics can be bypassed. Thus, a user interface element can be selected by a user by use of an input device comprising a computer mouse, a keyboard or a touchscreen and does not involve the preparer typing response data (e.g., typing a specific numerical value or typing a range of values) in order to select a response option and answer a determined question.

Other embodiments are directed to computerized systems for confirming standardized flow determinations, and doing so in a personalized manner while also providing for the ability to override such determinations.

Yet other embodiments are directed to computer program products or articles of manufacture comprising a non-transitory computer readable medium embodying instructions executable by a computer to execute computer-implemented method embodiments or aspects thereof.

Further embodiments are directed to user interfaces that may be generated and personalized for a taxpayer and utilized for confirmation of standardized flow determinations. Generated user interfaces in the form of a special purpose interview screen or pop-up window that is separate from and independent of an interview screen that is used to collect data for entry into an electronic tax return, includes questions and/or user interface elements including numerical ranges. The special purpose interview screen includes personalized attributes such as the questions determined to be pertinent to a user for confirmation of a standard deduction state or flow determination and/or ranges of numerical data for those questions. Questions and/or numerical ranges may be based on a result of execution of a data analytics element, which may be in the form of one or more business logic or rules and/or one or more predictive models.

In a single or multiple embodiments, the personalized user interface includes a plurality of determined or selected questions, each question being associated with a plurality of user interface elements encoded as, or representing, respective response options to a determined or selected question. A generated user interface or interview screen according to embodiments may include response options that are binary (e.g., "Yes" or "No") and/or for respective ranges of numerical data. Thus, one determined or selected question may be answerable by selecting a "Yes" or "No" user interface element, whereas another determined or selected question may be answerable by selecting a user interface element for a range of numerical values. Embodiments do not require a user to know a specific numerical value (e.g., "what were your car registration fees for last year?") and instead utilize determined ranges of values. Accordingly, answers to these special-purpose questions are not included in the electronic tax return, but subsequent entry of specific numerical data for these topics are entered into the electronic tax return. Thus, embodiments are able to provide a recommendation flow that is predictive (before user enters itemized topics and consumes time answering itemized deduction questions that may be irrelevant to the user), educates customers regarding why they do not qualify for itemized topics and does so in a personalized manner given the questions presented in the special purpose user interface and numerical data ranges therein.

In a single or multiple embodiments, respective ranges of numerical data are based at least in part upon a result generated by execution of the data analytics element that is a second predictive model different than the first predictive model utilized for the standard versus itemized state determination. The result generated by the second or other predictive model, or confirmation predictive model, may also serve as an input to the first predictive model. In this case, the second predictive model may generate results that are used for both first predictive model inputs and to determine numerical data ranges, or the second predictive model may be executed a first time to generate the input to the first predictive model and a second time for the confirmation analysis and determining respective ranges of numerical data. Thus, the second predictive model be in communication with or associated with the first predictive model or the second predictive model may execute independently of the first predictive model.

In a single or multiple embodiments, the first, second and other predictive models may be or utilize one or more of logistic regression; naive bayes; k-means classification; K-means clustering; other clustering techniques; k-nearest neighbor; neural networks; decision trees; random forests; boosted trees; k-nn classification; kd trees; generalized linear models and support vector machines.

In a single or multiple embodiments, the second predictive model may be a predictive model involving charitable contributions, job expenses, medical expenses, and income taxes.

In a single or multiple embodiments, the user interface or special purpose interview screen that is generated includes at least one determined or selected question and user interface elements that are encoded as, or represent, response options for respective numerical ranges, and at least one question that itself includes a range of numerical data in the text of the question together with user interface elements encoded as or that represent binary response options to the question. Thus, embodiments may involve question text that does not include a numerical range and a numerical range is reflected in a user interface element encoded as or representing a numerical range response options, the question itself may include a numerical range and a user interface element may be encoded as or represent a binary response options, or both representation of numerical range data. The questions in the special purpose user interface or interview screen may involve, for example, tax return preparation application fees, charitable donations, medical expenses, employment expenses, automobile registration fees, and home ownership. According to one embodiment, a special purpose user interface or interview screen for confirming a standard deduction flow determination includes each of these six questions presented in a single screen view to provide a desired level of confidence in the standardized flow determination (e.g., confirming a standard deduction flow determination with ~95% accuracy).

In a single or multiple embodiments, the computerized tax return preparation application may be triggered to execute the first predictive model for making a standard deduction flow versus itemized deduction flow determination in response to pre-determined events or criteria such as the preparer navigating to a pre-determined interview screen, electronic tax form or selecting a certain topic, or in response to a change of the electronic tax return data or an update to electronic tax return data. The data analytics element that is utilized to confirm the first predictive model output may be triggered to execute to determine questions and respective numerical range response options in response to an output or a changed output generated by execution of the first predictive model that indicates that the deduction state or experience state should be modified to the standard deduction state or experience.

In a single or multiple embodiments involving overriding or invalidating a standardized flow determination and confirmation, the standardized flow determination may be overridden based on pre-determined exclusionary or disqualifying criteria or data. For example, although the first predictive model generated an output to proceed with a standard deduction state or flow rather than an itemized deduction state or flow, and this determination was subsequently confirmed by execution of the data analytics element, this determination can be overridden or invalidated based on the taxpayer data already entered into the electronic tax return being data of certain types (such as income data of multiple states, property tax, mortgage interest, mortgage points, adjusted gross income=0, a taxpayer can be claimed as a dependent by another taxpayer, the electronic tax return is for a pre-determined state tax authority, a filing status of the electronic tax return being married and filing jointly, and a charitable contribution deduction carryover from a prior tax year) or that the user has navigated to a certain interview screen or electronic tax form of the computerized tax return preparation application for such data.

Thus, embodiments not only provide for transformation or modification of deduction states, flows and user experiences, and generation of personalized user interfaces or interview screens during preparation of an electronic tax return, but also improve the functioning of the computing system executing the computerized tax return preparation application by providing for more efficient use of computing resources (e.g., processor, memory and network communications) by determining and confirming that a standard deduction state or flow should apply thus bypassing interview screens, questions or topics for itemized deduction analysis and generating an presenting associated tangible results to a preparer of the electronic tax return. Embodiments also provide improvements to various technical fields including, for example, computerized tax return preparation applications, electronic tax returns, electronic tax return preparation, user experiences including customization or personalization of electronic tax return preparation experiences, predictive model applications, user interfaces and data collection and data processing according to various embodiments.

BRIEF DESCRIPTION OF THE DRAWINGS

FIGS. 8A-K, 9A-B, 10A-C and 11A-N illustrate additional examples of process flows and UIs that involve various types of user inputs, standard vs. itemized deduction determinations, interview screens and how standard vs. itemized, confirmation and override modules are implemented.

Common reference numerals are used throughout Figures and the detailed description to indicate like elements. One skilled in the art will readily recognize that the above Figures are examples and that other architectures, modes of operation, orders of operation, and elements/functions can be provided and implemented without departing from the characteristics and features of the invention, as set forth in the claims.

DETAILED DESCRIPTION OF ILLUSTRATED EMBODIMENTS

Embodiments of the invention are related providing an intelligent way to determine whether a user should be presented with a standard deduction flow (interview screens, questions or topics) rather than an itemized deduction flow in which case itemized deduction interview screens, questions and topics, which are often more complicated and time consuming, can be bypassed, and to review the standard deduction state determination and confirm that it should be utilized. Embodiments are particularly useful in cases in which a user has expenses that may be possible deductions, but itemizing these expenses would not be financially beneficial since the user may not meet an itemized deduction threshold such that the standard deduction is the better option for the user. In such cases, those and other itemized deduction interview screens, topics and questions can be bypassed, thus eliminating the need to present more involved and less familiar itemized deduction questions to the user, which improves user satisfaction, engagement with and confidence in the tax return preparation application, and reducing the time and computing resources required to prepare the electronic tax return. Embodiments achieve these improvements while presenting questions that can be answered by selection of predicted ranges of tax data that are personalized for the user rather than typing in specific numerical data, which may not be known or readily available.

Thus, embodiments provide for an intelligent way of determining how particular users should complete their respective tax returns, while not subjecting users to lengthy itemized deduction questions that are not required and not requiring specific numerical tax data in order to confirm that a standard deduction should be selected.

In certain embodiments, an override system serves as a safeguard to ensure that if a determination is made to proceed with the more streamlined standard deduction state or flow, and such determination has been confirmed, certain criteria (e.g., certain data has been received or entered, or the user has navigated to a certain interview screen or form or selected a certain topic), may dictate overriding the standard deduction state or flow in favor of the default or itemized deduction state or flow. Various embodiments and aspects thereof are described with reference to FIGS. 1A-11N and associated Appendix Materials.

Figure 1A:
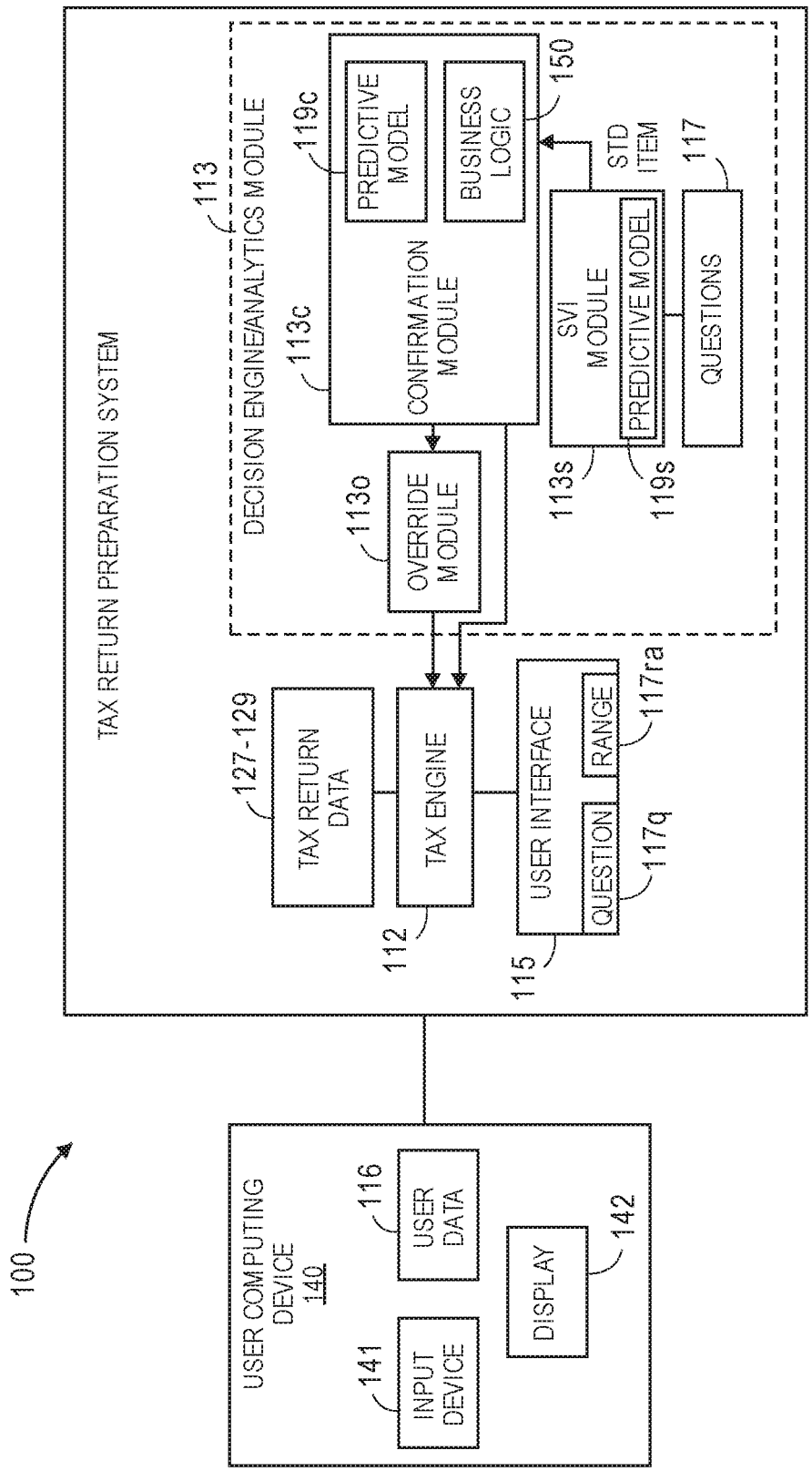
FIGS. 1A-B are block diagrams of tax return preparation systems configured to present a special purpose user interface for determining whether to confirm a determination that a user can bypass itemized deduction interview screens or questions, in accordance with embodiments.

Referring to FIG. 1A, in a computerized system 100 constructed according to one embodiment, a tax return preparation system 111 is in communication with a user computing device 140, which includes an input device 141 (such as a mouse, keyboard or touchscreen, microphone, camera, etc.), a display 142 and a memory component in which user data 116 is stored. The tax return preparation system 111 includes a tax engine 112 in communication with a user interface (UI)/user interface controller 115 (generally, UI) and a decision engine or analytics module 113 (generally, analytics module). According to one embodiment, the analytics module 113 includes a standard versus itemized ("svi") analytics module 113s ("s" referring to "standard" versus itemized), a standard deduction state confirmation module 113c ("c" referring to "confirmation"), and an override module 113o ("o" referring to "override"). The svi analytics module 113s is configured to execute a svi model 119s based on user data 116 or other inputs to generate a result that indicates whether the tax return preparation system 111 should be placed in a standard deduction state, flow or user experience, or in an itemized deduction state, flow or user experience. The confirmation module 113c includes one or more other predictive models 119c and/or business logic or programmed rules 150 (generally, data analytics elements), which are executed to confirm a result generated by execution of the svi predictive model 119s, e.g., the user should proceed with a standard deduction state, flow or experience. For this purpose, the confirmation module 113c generates a personalized UI or interview screen 115 that includes determined or selected questions 117q and response options 117r. Determined or selected questions (text thereof) may include numerical range data 117ra determined by execution of the confirmation predictive models 119c, or numerical range data 117ra may be encoded in or represented by UI 115 elements. UI 115 elements that represent response options 117r (e.g., binary or "yes/no" responses, or response options for ranges of numerical data 117ra) are presented to the user and selected by use of an input device 141 of the user's computing device 140. These responses are utilized to confirm the standard deduction state as determined by the svi predictive model 113s. This confirmation, or the svi predictive model 113s output itself, can be overridden or invalidated for the particular tax return data processed by override module 113o. Thus, even though the svi predictive model 119s generated a result of standard deduction state, and even though this was confirmed by the confirmation module 113c, the override module 113o may maintain or revert back to an itemized deduction state. If the standard deduction state is maintained (confirmed and not overridden), itemized deduction interview screens, questions or topics can be bypassed. Otherwise, if the standard deduction state is not confirmed or is overridden, the tax return preparation system 111 is placed in an itemized deduction state and itemized interview screens, questions and topics are presented to the user.

Figure 2:
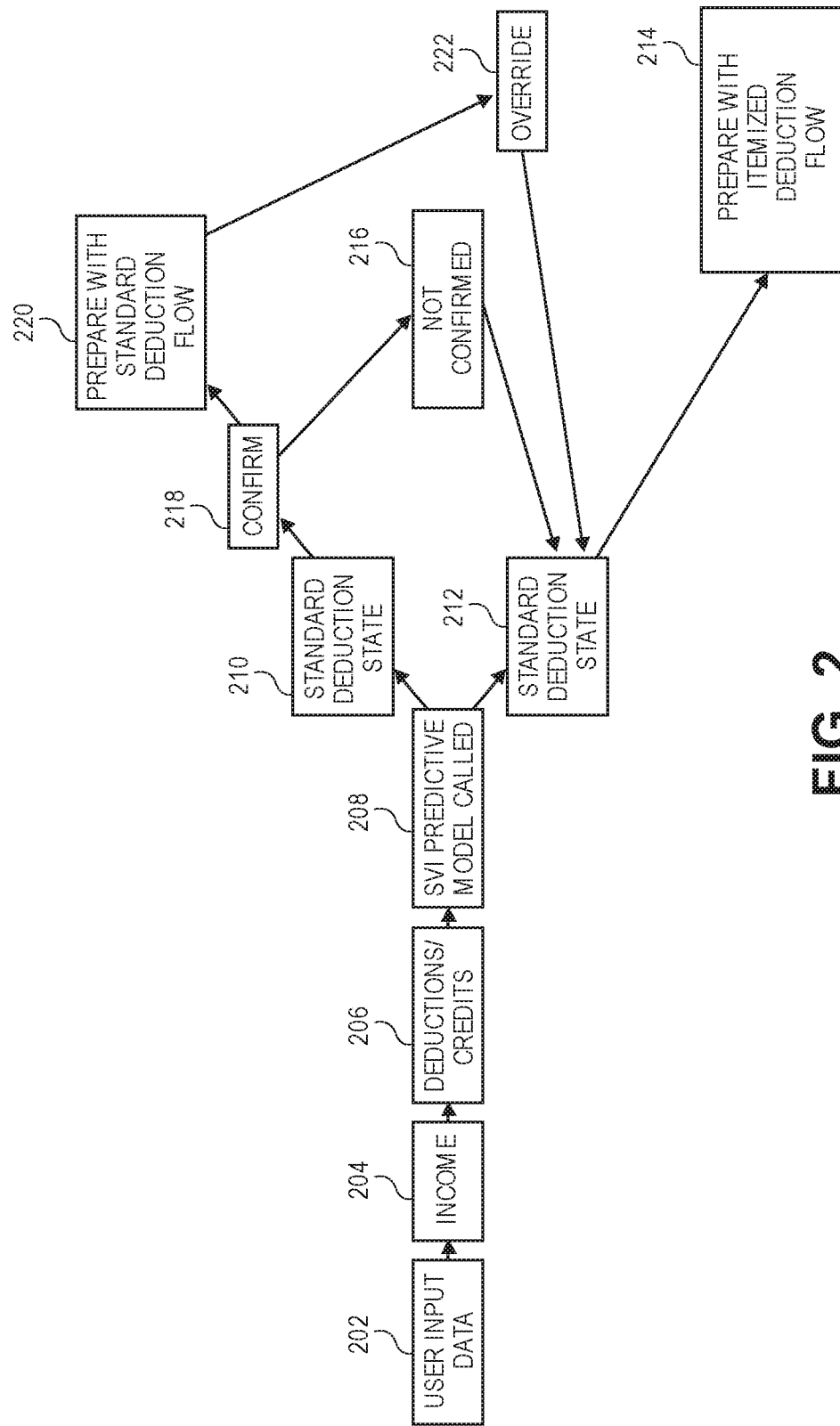
FIG. 2 is a flow diagram illustrating how standard deduction vs. itemized deduction state decisions are made, confirmed and overridden or invalidated, in accordance with one embodiment.

Referring to FIG. 2, one example of how embodiments may be implemented involves the svi predictive model 119s receiving inputs. Input data 202 may be the user data such as one or more of manually entered data, data imported from an electronic source such as a computerized financial management system, a prior year electronic tax return or a financial institution computer. Input data 202 may also involve user interactions such as whether and/or when the user navigated to a certain screen or selected a certain topic or form (e.g., based on tax return data in "MyStuff" and topics listed in a landing table in TURBOTAX tax return preparation application). For example, TURBOTAX tax return preparation application collects profile information about the tax filers through the Year Over Year, Get to Know Me, Personal Information, Personalized Tax Topics and Income sections. One or more or all of these types of profile information can be inputs to the svi model 119s. The user may proceed with entry of data for topics such as personal information and income at 204.

During the preparation process, at 206, the user may navigate to an interview screen or form for tax deductions or credits, or tax deduction or credit data may be received. According to one embodiment, these events serve as triggers for the svi predictive model 119s to be called and execute at 208. Execution of the svi predictive model 119s results in generation of a result indicating a standard deduction state 210 or an itemized deduction state 212

If the svi predictive model 119s result is itemized deduction state 212, then the computerized tax return preparation system 111 proceeds with the "default" of presenting interview screens, questions and topics for itemized deductions and the electronic tax return is prepared and completed and includes data of itemized deductions at 214.

If the svi predictive model 119s result is standard deduction state 210, then according to one embodiment, this triggers the confirmation predictive model(s) 119c and/or business logic or rule(s) 150 of the confirmation module 113c to execute, resulting in generation of a personalized user interface 115 including determined questions 117q and response options 117r and associated numerical range data 117ra. The user proceeds to select UI 115 elements that are encoded as or represent response options 117r for these determined or selected questions 117q, and based on the user input, the confirmation module 113c determines whether the result generated by the svi predictive model 119s of standard deduction state 210 should be maintained. If not, at 216, then the tax return preparation system 111 is placed in an itemized deduction state 212 and the preparation of the electronic tax return proceeds on this basis at 214. If the standard deduction state determination is confirmed 218, then the tax return preparation system 111 is placed in or continues to be in the standard deduction state 210 and preparation of the electronic tax return is based on the user taking a standard deduction 220.

In embodiments including an override module 113o (as shown in FIG. 1A), the override module 113o receives the result generated by the confirmation module 113c and is triggered to execute and determine whether to continue with the standard deduction state 210, or to override 222 the svi predictive model's 119s decision (and the result generated by the confirmation module 113c) and proceed with the itemized deduction state 212 instead.

Figure 1B:
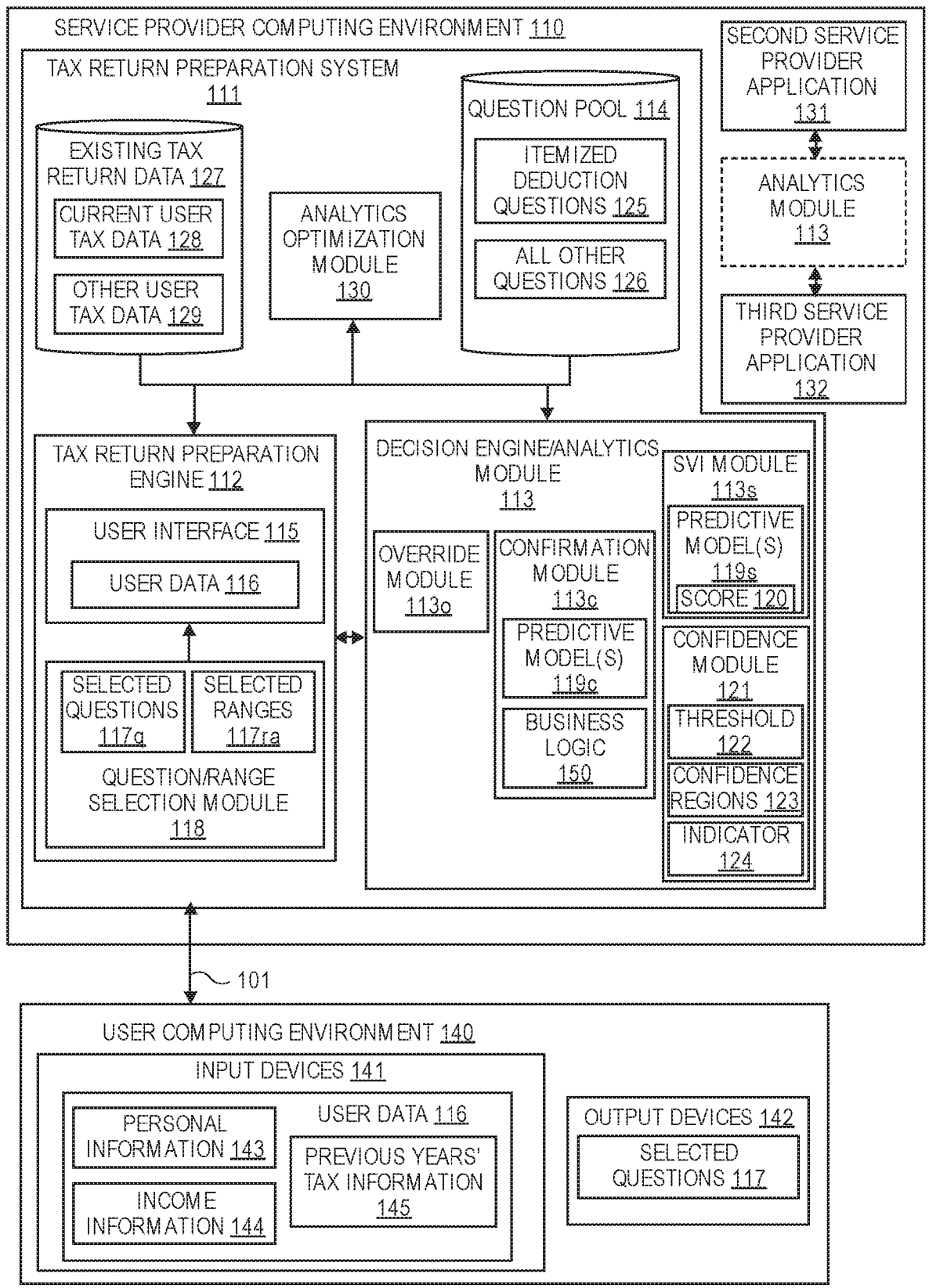

FIG. 1B illustrates a more detailed system implementation and how the svi predictive model 119s may be executed to generate a result that is used to determine whether the system should be placed in a standard deduction state or an itemized deduction state, and the result being confirmed and possibly overridden according to embodiments of the invention. Aspects of one example of a svi predictive model 119s and how standardized v. itemized analysis may be performed are also discussed in U.S. application Ser. No. 14/726,051, filed May 29, 2015, entitled METHOD AND SYSTEM FOR IDENTIFYING USERS WHO BENEFIT FROM FILING ITEMIZED DEDUCTIONS TO REDUCE AN AVERAGE TIME CONSUMED FOR USERS PREPARING TAX RETURNS WITH A TAX RETURN PREPARATION SYSTEM, previously incorporated herein by reference. Various details of the svi model 119s and associated system architecture are described below, but all details are not repeated.

FIG. 1B illustrates a block diagram of a production environment 100 for applying one or more analytics models to a tax return preparation system to identify users who benefit from filing itemized deductions and to reduce an average time consumed by users preparing tax returns with the tax return preparation system 111. The tax return preparation system 111 receives user data 116, executes the svi predictive model 119s utilizing the user data 116 or applies the user data 116 to the svi predictive model 119s to enable the svi predictive model 119s to determine a likelihood of the user benefiting from an itemized deduction. Based at least in part upon the generated result, the tax return preparation system 111 skips, omits, de-emphasizes, reorders, re-ranks, and/or postpones the irrelevant itemized deduction tax questions for users who are less likely or who are unlikely to benefit from itemizing their deductions.

By applying analytics models to a tax return preparation system to identify users who benefit from filing itemized deductions and to reduce an average time consumed for users preparing tax returns with a tax return preparation system, implementation of embodiments of the present disclosure allows for significant improvement to the fields of user experience, electronic tax return preparation, data collection, and data processing, according to one embodiment. As one illustrative example, by selectively skipping or postponing tax questions that otherwise extend the tax return preparation interview (without financial gain to the user), embodiments of the present disclosure allows for progressing a user through a tax return preparation session with fewer processing cycles and less communications bandwidth. As a result, embodiments allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., svi predictive models 119s and other analytics elements) to select relevant questions for a user or to determine whether the system should be in a standard deduction state or an itemized deduction state, implementation of embodiments represent a significant improvement to the field of providing an efficient user experience and, in particular, efficient use of human and non-human resources. As one illustrative example, by reducing the number of irrelevant questions provided to a user of a tax return preparation system 111, the user can devote less time and energy to preparing his/her taxes. Additionally, by selectively presenting itemized deduction questions to a user when the user financially benefits from an itemized deduction, the tax return preparation system 111 maintains, improves, and/or increases the likelihood that a potential customer will convert into a paying customer because the potential customer is receiving confirmation that the tax return preparation system appears to understand the particular user's tax situation, according to one embodiment. Consequently, using embodiments of the present disclosure, the user experience is less burdensome and time consuming.

In the embodiment illustrated in FIG. 1B, the production environment 100 includes a service provider computing environment 110 and a user computing environment 140 for identifying users who are likely to reduce their taxable income more with an itemized deduction than with a standard deduction, according to one embodiment. The computing environments 110 and 140 are communicatively coupled to each other with a communication channel 101, according to one embodiment.

The service provider computing environment 110 represents one or more computing systems such as, but not limited to, a server, a computing cabinet, and/or distribution center that is configured to receive, execute, and host one or more applications for access by one or more users, e.g., clients of the service provider, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment. The one or more applications can include, but are not limited to tax return preparation systems, other financial management systems, and applications that support the tax return preparation systems and/or the other financial management systems, according to one embodiment.

The service provider computing environment 110 includes a tax return preparation system 111 that utilizes one or more predictive models 119s to determine a likelihood of a user benefiting from itemizing his/her deductions, so that the tax return preparation system 111 can omit, skip, postpone, and/or re-rank tax questions related to itemizing deductions if it will be financially advantageous for the user to elect a standard deduction over an itemized. Further, according to current embodiments described herein, one or more data analytic elements, generally illustrated as a confirmation module 113c and an override module 113o, may be used to confirm and/or override these svi predictive model 119s determinations by use of a personalized and special purpose user interface or interview screen that includes determined ranges of numerical data 117ra (as opposed to specific numerical data of the electronic tax return being prepared).

By identifying users who are likely to benefit from itemizing their deductions and by identifying users who are likely to benefit from standardizing their deductions by use of a svi predictive model 119s, the tax return preparation system 111 can reduce the amount of time users spend in tax return preparation interviews by partially or wholly skipping over the questions that are presented merely for the purpose of assisting a user in itemizing his/her deductions. When applied to millions of users per tax season, the time saved by partially or wholly skipping over itemized deduction questions, it is estimated that tax return preparation interview hours can be reduced tens of thousands of hours each tax season, saving users time and confusion and saving service providers costs associated with running and maintaining computing systems. The tax return preparation system 111 includes various components, databases, engines, modules, and data to support identifying users who are likely to benefit from itemizing or standardizing their tax return deductions, according to one embodiment. The tax return preparation system 111 includes a tax return preparation engine 112, an analytics module 113 (which according to embodiments, may include an svi model module 113s, a confirmation module 113c, and an override module 113o), and a question pool 114, according to one embodiment.

The tax return preparation engine 112 guides the user through the tax return preparation process by presenting the user with questions 117, according to one embodiment. The tax return preparation process includes progressing a user through a tax return preparation interview or flow of interview screens or tax topics. The tax return preparation interview can be broken into multiple tax return preparation sessions, during which the user accesses or "logs into" the tax return preparation system 111, according to one embodiment.

A user may access or login to the tax return preparation system 111 multiple times, e.g., in multiple sessions, to complete a tax return preparation interview. At the end of a tax return preparation interview, the tax return preparation system 111 files a federal tax return, and may file one or more state tax returns (as needed), in response to receiving instructions from the user to do so, according to one embodiment. Thus, the tax return preparation process can include, but is not limited to: completing a tax return preparation interview to enable the tax return preparation system 111 to complete/prepare a tax return for the user, and filing one or more federal and state tax returns, according to one embodiment. The completion and filing of the one or more federal and state tax returns are processed over one or more tax return preparation sessions, in which the user accesses or logs into the tax return preparation system 111, according to one embodiment.

The tax return preparation engine 112 includes a UI 115 to gather and receive user data 116 from the user and to present selected questions 117 to the user, to progress the user through the tax return preparation process, according to one embodiment. The UI 115 includes one or more user experience elements and graphical user interface tools, such as, but not limited to, buttons, slides, dialog boxes, text boxes, drop-down menus, banners, tabs, directory trees, links, audio content, video content, and/or other multimedia content for communicating information to the user and for receiving the user data 116 from the user, according to one embodiment.

The tax return preparation engine 112 employs the UI 115 to receive the user data 116 from input devices 141 of the user computing environment 140 and employs the UI 115 to transmit the selected questions 117 to output devices 142 of the user computing environment 140, according to one embodiment. The input devices 141 include, but are not limited to, touchscreens, mice, keyboards, microphones, cameras, touchpads, and the like, and are configured to receive various types of user data 116, according to one embodiment. For example, the input devices 141 gather user data 116 such as personal information 143, income information 144, and previous years' tax information 145, according to one embodiment. The user data 116 can also include user responses to the selected questions 117 that are presented to the user by the tax return preparation system 111. The output devices 142 include, but are not limited to, monitors, speakers, touchscreens, and the like, according to one embodiment. The output devices 142 display/present the selected questions 117 and various user interface elements to the user, as provided by the tax return preparation system 111, according to one embodiment.

User data 116 received by the user interface 115 represents both the information that is obtained from the user through the user computing environment 140, as well as information that is obtained from other sources, according to one embodiment. For example, the user data 116 can include information from existing tax return data 119, such as one or more previous years' tax return data for a particular user. The existing tax return data 119 is stored in a data store, a database, and/or a data structure, according to one embodiment. The user data 116 can also include information that the tax return preparation system gathers directly from one or more external sources such as, but not limited to, a payroll management company, state agencies, federal agencies, employers, military records, public records, private companies, and the like, according to one embodiment. More particular examples of the user data 116 include, but are not limited to, a user's name, a Social Security number, government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system or in the preparation of a user's tax return, according to various embodiments. In some implementations, the user data 116 is a subset of all of the user information used by the tax return preparation system 111 to prepare the user's tax return, e.g., is limited to marital status, children's information, and annual income.

Personal information 143 and the income information 144 of the user data can be limited to a subset of the user data 116 which may include, but not be limited to, an age of the user, an age of a spouse of the user, a zip code, a tax return filing status, state income, a home ownership status, a home rental status, a retirement status, a student status, an occupation of the user, an occupation of a spouse of the user, whether the user is claimed as a dependent, whether a spouse of the user is claimed as a dependent, whether another taxpayer is capable of claiming the user as a dependent, whether a spouse of the user is capable of being claimed as a dependent, salary and wages, taxable interest income, ordinary dividend income, qualified dividend income, business income, farm income, capital gains income, taxable pension income, pension income amount, IRA distributions, unemployment compensation, taxable IRA, taxable Social Security income, amount of Social Security income, amount of local state taxes paid, whether the user filed a previous years' federal itemized deduction, whether the user filed a previous years' state itemized deduction, number of dependents, and whether the user is a returning user to the tax return preparation system.

User data 116 can also include browsing behavior data that is obtained from the user's interaction with the user interface 115 of the tax return preparation system 111, and can also include information obtained from Internet advertising companies, public records servers, social media servers, and the like, according to one embodiment. The user data 116 can dynamically change as the user enters additional information, so the tax return preparation engine 112 can be configured to periodically or continuously receives, update, and transmit the user data 116 to the analytics module 113 to enable the analytics module 113 to continuously update the likelihood that a user should file his/her return with an itemized or standard deduction. Periodically or continuously providing user data 116 to the analytics module 113 also enables the tax return preparation system to personalize and reduce the duration of the tax return preparation process by determining which questions from the question pool 114 are applicable to assisting a user in efficiently filing his/her tax return with the tax return preparation system 111, according to one embodiment. The question pool 114 includes a data store, a database, and/or some type of data structure to store the questions, according to one embodiment The tax return preparation engine 112 presents selected questions 117 based on scores, indicators, or levels of confidence that are generated or provided by the analytics module 113, according to one embodiment. For example, when one or more of the svi predictive models 119s within the analytics module 113 provides a score that is indicative of the likelihood that a user will benefit more from an itemized or standard deduction, the tax return preparation system 111 determines the selected questions 117 from the question pool 114 in order to reduce itemized deduction questions provided to users who are unlikely to benefit from itemizing deductions for their tax returns, according to one embodiment. The tax return preparation engine 112 includes a question selection module 118 for at least partially determining whether to include itemized deduction questions and/or how many itemized deduction questions to include in the selected questions 117, according to one embodiment. The question selection module 118 is configured to receive a score, an indicator, and/or a level of confidence from the analytics module 113 and/or from one or more of the predictive models within the analytics module, from which the question selection module 118 determines how many (if any), itemized deduction questions to include in the selected questions 117 that are provided to the user.

The analytics module 113 receives user data 116 and determines the likelihood that the user will reduce his/her tax return by itemizing deductions or by electing a standard deduction, according to one embodiment. The analytics module 113 includes a svi module 113s, a confirmation module 113c and in certain embodiments, an override module 113o. One or more svi predictive models 119 for determine a likelihood that a user will reduce his/her taxable income by itemizing deductions or by electing a standard deduction, according to one embodiment. The one or more svi predictive models 119s receive user data 116, which includes the personal information 143, the income information 144, and/or the previous years' tax information 145, according to one embodiment. Using this data 116, the one or more svi predictive models 119s generate a score 120 that is from 0 to 1, i.e., that is no less than 0 and no greater than 1, according to one embodiment. The score 120 represents the likelihood or probability that a particular user is likely to reduce his/her tax return by itemizing deductions. For example, the closer the score 120 is to 1, the higher the likelihood/probability/certainty is that the user will financially benefit from itemizing his/her deductions to lower his/her taxable income more than electing a standard deduction, according to one embodiment, whereas the closer the score 120 is to 0, the higher the likelihood/probability/certainty is that the user will financially benefit from electing a standard deduction to lower his/her taxable income more than by itemizing his/her deductions, according to one embodiment.

The one or more svi predictive models 119s can include multiple predictive models, which can each be trained to serve a different group, class, type, and/or characteristic of tax filer, according to one embodiment. For example, the one or more svi predictive models 119s can include at least 6 different predictive models, trained for different scenarios. In one embodiment, a first predictive model is for first-time users, a second predictive model is for returning users to the tax return preparation system 111, a third predictive model is for users who file during a first peak of the tax filing season (e.g., between February $1^{st}$-March 15), a fourth predictive model is for users who file during a second peak of the tax filing season (e.g., between March $15^{th}$-April $30^{th}$), a fifth predictive model is for first-time users who file after April, and a sixth predictive model is for returning users who file after April. Of course, additional svi predictive models 119s that are trained for additional scenarios can also be included in the analytics module 113 to provide a more specialized analysis of the user data 116 and to more particularly determine the likelihood that a user will have a lower taxable income by itemizing his/her deductions, according to one embodiment. Notably, users who file earlier in the tax filing season are more likely to receive money from filing their tax returns, are more likely to have relatively easy to prepare tax returns, and are more likely to have W-2s to file. By contrast, users who file later in the tax filing season are more likely to owe additional taxes, are more likely to have more complex tax returns, are more likely to be procrastinators, and are more likely to have 1099 income and other types of income. Accordingly, users can be categorized/grouped based on not only their income characteristics but also by their tax return filing characteristics, configuring the analytics module 113 to use one or more predictive models 119sv to analyze the user data 116 can be used to generate a more accurate prediction of the likelihood that the user will benefit from itemizing deductions or from electing a standard deduction, according to one embodiment. As a result, some of the svi predictive models 119s may provide more accurate results than others. For example, a returning user will have information that is indicative of whether the user itemized deductions the previous year. Along with a user's number of exemptions and W-2 or 1099 Misc information, whether a user itemized deductions in a previous year is a very strong indicator/predictor of whether a user will benefit from itemizing deductions in the current year. In other words, whether the user itemized deductions that a previous year, W-2/1099 Misc information, and a user's number of exemptions are dominant/strong features for predicting/determining whether a user is likely to benefit from itemizing his/her deductions, according to one embodiment. For new users, the tax return preparation system may not have data that is indicative of the user's previous tax filings, so whether the user itemized deductions a previous year may not be available to the tax return preparation system 111 and to the analytics module 113. Therefore, for new users, the dominant/strong features for predicting/determining whether a user is likely to benefit from itemizing his/her did actions includes W-2/1099 Misc information and the user's number of exemptions, according to one embodiment.

The svi analytics module 113s uses one or more techniques for analyzing the score 120, according to one embodiment. The svi analytics module 113s, for example, in one embodiment, may include a confidence module 121 for analyzing the score 120. The confidence module 121 receives the score 120, and compares the score 120 to one or more thresholds 122. The thresholds 122 can be implemented as a single threshold, can be implemented as two thresholds, or can be implemented as multiple thresholds, in order to find one or more confidence regions 123, according to one embodiment.

For example, the thresholds 122 can include a first threshold, e.g., 0.8, which when the score 120 exceeds the first threshold, the confidence module 121 provides an indicator 124 that the user is highly likely to benefit from itemizing deductions. In one embodiment, the indicator 124 is a flag, such as an "itemize deductions" flag. As another example, the threshold 122 can include a second threshold, e.g., 0.5, which when the score 120 is below the second threshold, the confidence module 121 provides an indicator 124 that the user is highly likely to benefit from electing standard deductions. In one embodiment, the indicator 124 is a flag, such as a "select standard deductions" flag. In one embodiment, the confidence module 121 outputs the score 120 and one or more indicators 124 to the tax return preparation engine 112, to enable the tax return preparation engine 112 to make suggestions or recommendations to the user to itemize deductions or to wait until the end of the tax return preparation interview to review the itemized deductions questions, according to one embodiment. Further aspects of aspects of a system constructed according to one embodiment, including confidence graphs 200, confidence module 121, are described in U.S. application Ser. No. 14/726,051, entitled METHOD AND SYSTEM FOR IDENTIFYING USERS WHO BENEFIT FROM FILING ITEMIZED DEDUCTIONS TO REDUCE AN AVERAGE TIME CONSUMED FOR USERS PREPARING TAX RETURNS WITH A TAX RETURN PREPARATION SYSTEM, previously incorporated herein by reference. Further, while aspects of embodiments are described with reference to svi predictive models 119s, other predictive models 119 utilized by embodiments may employ similar processing and analysis.

The question selection module 118 is configured to populate the selected questions 117q ("q" referring to "question") from the question pool 114 at least partially based on the score 120, the confidence regions 123, and/or the indicator 124 received from the one or more predictive models 119, the confidence module 121, and/or the analytics module 113, according to one embodiment. As described in further detail below, embodiments also determine numerical ranges 117ra of data and associated response options 117r, and numerical range data 117ra may be included within text of a question 117q or part of a response option 117r or associated UI 115 element.

For example, the question selection module 118 can be configured to insert the itemized deduction questions 125 into the selected questions 117 for presentation to the user, when the confidence module 121 or the analytics module 113 provides an indicator 124 or a score 120 that is indicative of a high likelihood that the user will benefit from itemizing his/her deductions (i.e., more than electing a standard deduction). Similarly, the question selection module 118 can be configured to insert the standard deduction questions 125 into the selected questions 117 for presentation to the user, when the confidence module 121 or the analytics module 113 provides an indicator 124 or a score 120 that is indicative of a high likelihood that the user will benefit from taking a standard deduction.

In one embodiment, the question selection module 118 populates the selected questions 117q with the itemized deduction questions 125 when the score 120 or the confidence regions 123 correspond with an itemized deduction region. In one embodiment, the question selection module 118 sparingly, strategically, tactically populates the selected questions 117q with the itemized deduction questions 125 when the score 120 or the confidence regions 123 correspond with the indeterminate region. In one embodiment, the question selection module 118 populates the selected questions 117 with the all other questions 126 and skips or postpones presentation of the itemized deduction questions 125 where the score 120 or the confidence regions 123 correspond with the standard deduction region, or populates the selected questions 117 with only standard deduction questions, skipping or bypassing, or postponing, presentation of itemized deduction questions 125 where the score 120 or the confidence regions 123 correspond with the standard deduction region.

When tax questions for itemized deductions are skipped, the system can provide the user with an option of reviewing the skipped questions near the end of the tax deduction section or near the end of the tax return preparation interview so that if the user believed itemized deduction questions are relevant to the user, the user can optionally review and respond to the itemized deduction questions, according to one embodiment. In one embodiment, the tax return preparation system 111 ranks the relevancy of all of the questions in the question pool 114 and the questions are re-ranked and reordered during the tax return preparation interview. The reordering and re-ranking of the question may include moving less relevant or irrelevant question to an optional section to allow the user to have the option of reviewing those questions although the tax return preparation system 111 has determined that those questions are not relevant to the user's situation. Although the question selection module 118 is illustrated as being incorporated in the tax return preparation engine 112, in alternative embodiments, the question selection module 118 is configured to operate independently of the tax return preparation engine 112, according to one embodiment The tax return preparation system 111 uses the output of analytics module 113s to rank or prioritize the order in which tax topics are presented to the user during the tax return preparation interview, according to one embodiment. The tax return preparation system 111 can use the question selection module 118 or some other component to determine and prioritize a number of tax topics for the user, based on relevance to the user, based on the score 120, and/or based on the output of the confidence module 121 (e.g., the confidence regions 123 and/or the indicator 124). By ranking the tax topics for the user, based on the one or more predictive models 119 (or based on the analytics module 113), the tax return preparation system 111 can be configured to present more relevant tax topics (e.g., through tax questions) to the user and postpone the presentation of less relevant tax topics, so that the user feels like the system is customized and catering to the particular user's situation and needs, according to one embodiment.

The service provider computing environment 110 trains the one or more predictive models 119 using existing tax return data 127, according to one embodiment. The existing tax return data 127 includes current user tax data 128 and other user tax data 129, according to one embodiment. The existing tax return data 127 includes tax data collected from previous years' tax return filings and/or includes tax data collected from a current year by users who have partially or completely prepared their tax returns using the tax return preparation system 111, according to one embodiment. The one or more predictive models 119 are trained using one or more of a variety of machine learning techniques including, but not limited to, regression, logistic regression, decision trees, artificial neural networks, support vector machines, linear regression, nearest neighbor methods, distance based methods, naive Bayes, linear discriminant analysis, k-nearest neighbor algorithm, random forests; boosted trees; k-nn classification; kd trees; generalized linear models or another mathematical, statistical, logical, or relational algorithm to determine correlations or other relationships between the user data (e.g., personal information, income information, tax filing timing, etc.) and whether users filed itemized deductions. In other words, the one or more predictive models 119 are trained using existing inputs and outputs for the predictive models that are stored in the existing tax return data 127.

The analytics module 113 which, according to embodiments, may include a svi module 113s, a confirmation module 113c, and an override module 113o in certain embodiments, is illustrated and described as being incorporated in the tax return preparation system 111, but in alternative embodiments, the analytics module 113 is implemented independently of the tax return preparation system within the service provider computing environment 110.

The analytics module 113 is optionally hosted on a different server, a different computing system, a different virtual device and/or as a different application than the tax return preparation system 111, according to one embodiment. The analytics module 113, when implemented externally to the tax return preparation system 111, receives the user data 116 from the tax return preparation system 111 over one or more networks and returns the score 120, the confidence regions 123, and/or the indicator 124 to the tax return preparation system 111 to enable the tax return preparation system 111 to select appropriate questions for presentation to the user, based on the likelihood that the user will financially benefit from itemizing or standardizing his/her deductions with his/her tax filing, according to one embodiment. In one embodiment, a second service provider application 131 and/or a third service provider application 132 also use the services of the analytics module 113, and the analytics module 113 is modularized to enable exchanging, updating, and/or replacing one or more of the one or more predictive models 119 without interrupting or without changing the applications hosted by the service provider computing environment 110 (e.g., the tax return preparation system 111).

The tax return preparation system 111 includes an analytics optimization module 130 for periodically updating and/or training the one or more predictive models 119 during use (e.g., during a current tax return preparation season), according to one embodiment. The analytics optimization module 130 monitors the accuracy of the analytics module 113 by comparing the predictions of the one or more predictive models 119 with the actual final selection made by the user (or made by the tax return preparation system 111) regarding whether the user should file his/her tax return using an itemized deduction or a standard deduction. The analytics optimization module 130 is configured to adjust the thresholds 122 so that the tax return preparation system 111 provides itemized or standard deduction recommendations within the tolerances for error and accuracy that have been defined for the system. Operating points, false positive rates, and false negative rates for the predictive model are discussed below. However, according to one embodiment, the analytics optimization module 130 periodically, such as hourly, daily, weekly, biweekly, monthly, quarterly, etc., adjusts one or more of the thresholds 122 for the score 120 to tune or manipulate the false positive rates and/or the false negative rates to be near one or more particular operating points.

In addition to improving overall computing performance, by using analytics models (e.g., svi predictive models 119s) to select relevant questions for a user such as questions of a standard deduction flow or experience or an itemized deduction flow or experience, implementation of embodiments of the present disclosure represent a significant improvement to the field of providing an efficient user experience and, in particular, efficient use of human and non-human resources. As one illustrative example, by reducing the number of irrelevant questions provided to a user.

Other details regarding how svi model 119s and other system components may be implemented and performance metrics thereof are described in U.S. application Ser. No. 14/726,051, previously incorporated herein by reference. Further, it will be understood that while various predictive model processing is described with reference to a svi predictive model 119s, similar types of processing or other known predictive model processing may be utilized for other predictive models 119, e.g., for determining numerical range data.

Figure 3:
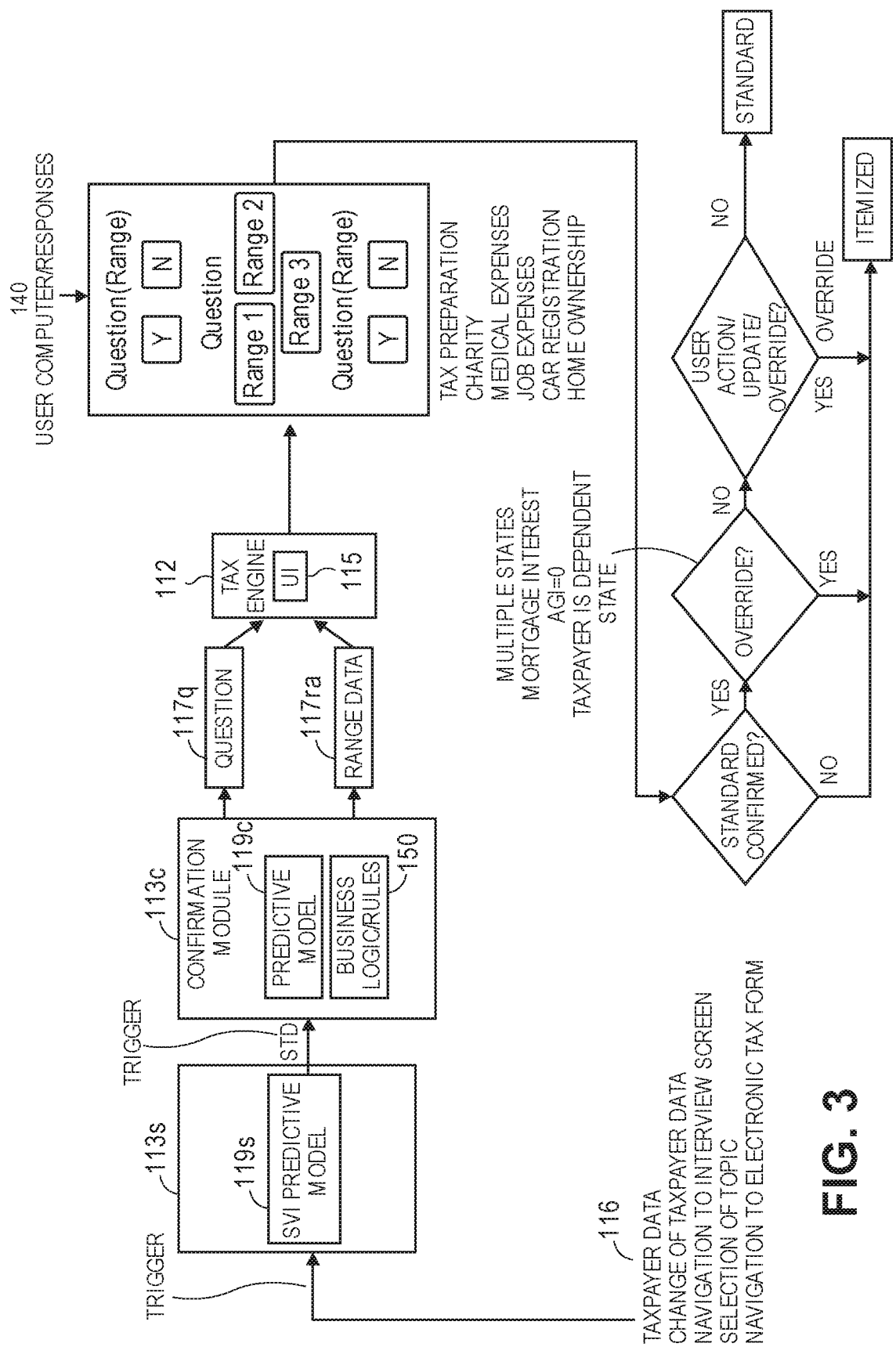
FIG. 3 is a system flow diagram illustrating a tax return preparation system constructed according to one embodiment that presents a special-purpose user interface that includes determined or selected questions and response options with associated numerical range data and that is used for confirming a result generated by a standard v. itemized predictive model.

Referring now to FIG. 3, having described examples of computing environments in which embodiments of the invention may be implemented and execute with reference to FIGS. 1A-B and 2, in a system constructed according to one embodiment, the analytics module 113*s* shown in FIG. 3 is illustrated as including one or more predictive models including svi model 119*s*, which may be utilized to determine whether the user should be presented with a standard deduction flow of interview screens and questions, or an itemized deduction flow of interview screens or questions, a confirmation module 119*c* and an override module 119*o*. In the illustrated embodiment, the result generated by the svi predictive model 119*s* is provided to the confirmation module 119*c*. The confirmation module 113*c* may include one or more predictive models 119*c* and/or one or more business logic or rule elements 150.

Figure 4:
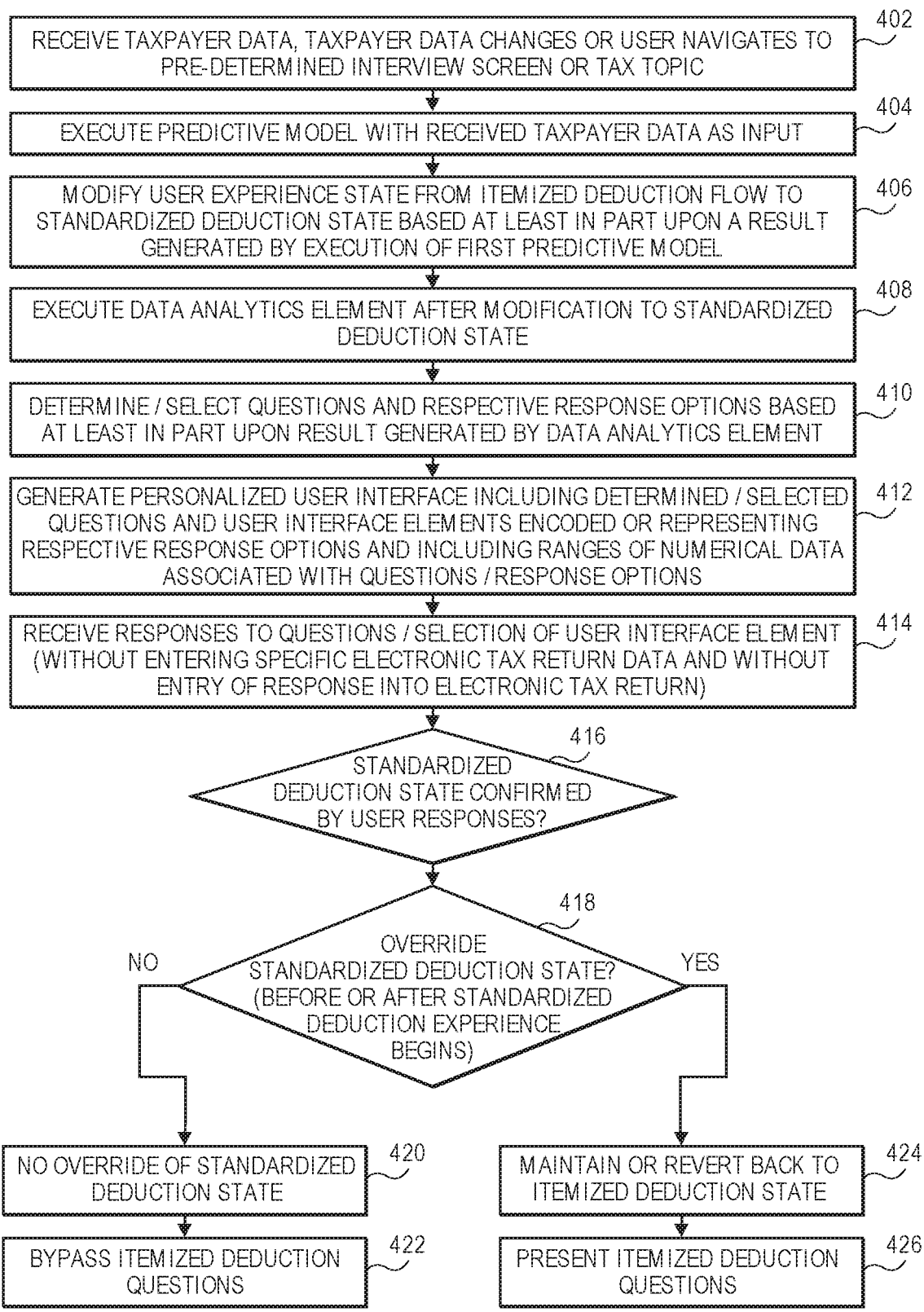
FIG. 4 is a flow diagram illustrating how standard deduction vs. itemized deduction determinations are made, confirmed and overridden or invalidated, in accordance with one embodiment.

Referring to FIG. 4, and with continuing reference to FIG. 3, 402, the svi predictive model 119*s* receives inputs 116 which, according to one embodiment, includes taxpayer data, and at 404, is triggered to execute based on receipt of taxpayer data 116. For example, the svi model 119*s* may be triggered to execute upon receiving an indication that taxpayer data has changed tax data, or an indication that a user has navigated to a pre-determined interview screen or tax topic. A trigger may be based on the user manually entering new data, modifying previously entered data, deleting previously entered data, importing new data, navigating to a certain interview screen or form or selecting a certain tax topic or browsing activity. These triggers may occur at various times during the electronic tax return preparation process, and the svi predictive model 119*s* can be configured to execute at times when there may be or is likely to be a transition in the deduction state.

According to one embodiment, the svi predictive model 119*s* may also receive additional inputs in the form of a result or output generated by another data analytics element 113, e.g., a predictive model 119*c* that is a component of the confirmation module 113*c*. These additional inputs provided by other predictive models 119 may further improve the performance of the svi predictive model 119*s* and provide more accurate determinations of whether to place the computerized tax return preparation system 111 in a standard deduction state or an itemized deduction state.

According to one embodiment, predictive models 119*c* that may be utilized to generate outputs that serve as inputs to the svi predictive model 119*s* include predictive models 119*c* for charitable contributions, job expenses, medical expenses, and an income tax model, for example. Outputs from one or more or all of these other predictive models 119*c* may be used as inputs to the svi predictive model 119*s*.

In another embodiment, the svi predictive model 119*s* and other predictive models 119*c* execute independently of each other, and a confirmation predictive model 119*c* or other confirmation data analytics element, business logic or rule 150 is triggered to be activated or execute in response to an output of a standard deduction state generated by the svi model 119*s*. For ease of explanation, reference is made generally to inputs of the svi predictive model 119*s*, but it will be understood that such inputs may involve various types of electronic tax return data and results generated by other data analytic elements such as predictive models 119*c* that are part of the confirmation module 113*c*.

With continuing reference to FIG. 4, at 406, the state or user experience is modified from an itemized deduction state or flow (which may be a default) to standard deduction state or flow based at least in part upon a result generated by execution of svi predictive model 119*s*. This svi model output 119*s* is provided to confirmation module 113*c*.

At 408, the confirmation module 113*c* is triggered to execute one or more data analytics elements in response to receiving the svi model 119*s* output of standard deduction state or flow. As noted above, data analytics elements of the confirmation module 113*c* may be a predictive model 119*c* as noted above, e.g., one or more or more of the charitable contributions, job expenses, medical expenses, and an income tax predictive models and/or business logic or rules 150.

At 410, confirmation predictive models 119*c* and business logic or rules 150 are both utilized determine or select questions 117*q* to be included in a UI 115 at 412, e.g., as selected from question pool 114 as shown in FIG. 1B, and the generated UI 115 is presented to the user.

According to one embodiment, the UI 115 is a special-purpose UI structured to include at least one question 117*q* associated with user interface elements encoded as response options 117*r* for respective ranges 117*ra* of numerical data. These questions 117*w* and response options 117*r* are personalized since different questions 117*q* and/or response options 117*r* may be determined or selected based on different data of different taxpayers. For example, confirmation predictive models 119*c* may be executed to determine that a first user is to be presented with UI elements for range data 117*ra* of $0-1000, $1001-3000, and $3001-6000, whereas another user may be presented with other range data 117*ra* of 0-2000, 2001-4000 and 4001-7000 for the same question 117*q*, and these ranges 117*ra* serve as response options 117*r* or answers to determined questions 117*q* concerning whether a standard deduction flow or state should be confirmed for respective taxpayers. Thus, by utilizing various taxpayer data 116, UI elements can be personalized for different users for purposes of confirming whether a standard deduction state of the tax return preparation system 111.

Numerical range data 117*ra* determined by execution of one or more data analytics elements may be part of a selected or determined question 117*q* itself, or encoded as or represented by a UI 115 element that can be selected by the user to respond to a question 117*q* that does not specify numerical range data 117*ra*. For example, referring to FIG. 5, a UI 500 or interview screen in the form of a single interview screen or single screen view, includes questions 117*q* and response options 117*r* determined by execution of confirmation predictive models 119*c* and/or business logic or rules 150 in which text of certain determined or selected questions 502*a*, 502*c*, 502*d* specify respective ranges of numerical data 504*a*, 504*c*, 504*d* that is the subject of the question (e.g., "Did you have tax prep fees over $100"? and "Do you have job expenses over $1,200?" and for these examples, the numerical ranges are expressed as 0-100 and 100+ and 0-1200 and 1200+). For these types of determined or selected questions 117*q*, the generated UI 500 may include elements or buttons 510 that can be selected via an input device 141 of the user's computing system 150 such as a mouse or touchscreen to enter a "Yes" or "No' answer. Thus, in the illustrated embodiment, numerical range data 504 determined by execution of one or more confirmation predictive models 119*c* may be expressed in the text of the question 117*q* itself and response options 117*r* may be binary response options 510 (e.g., Y/N response options).

Figure 5:
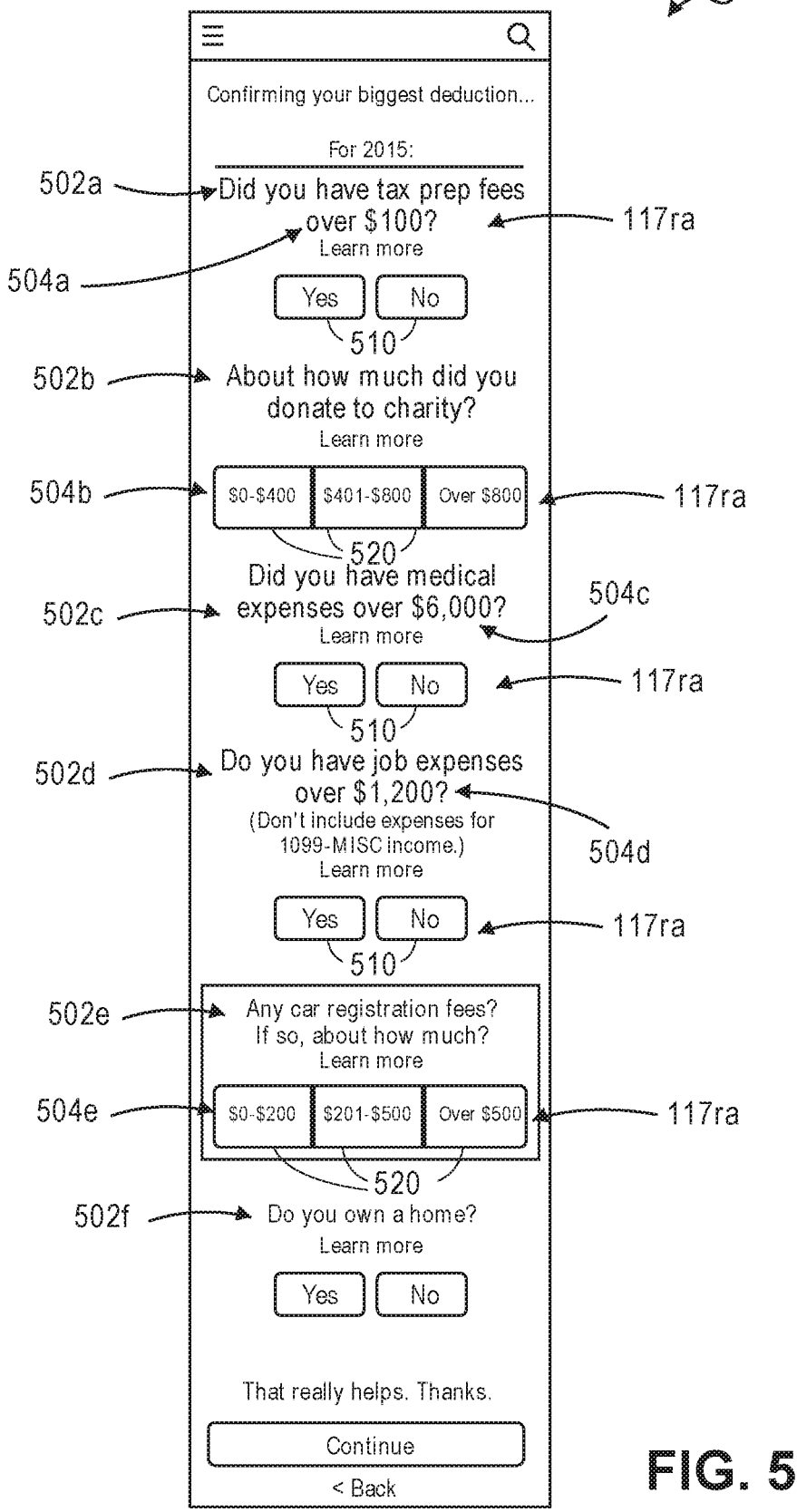
FIG. 5 illustrates a special-purpose user interface generated according to one embodiment and that includes determined or selected questions and associated response options in the form of binary response options or user interface elements encoded with or representing numerical ranges of data and that is utilized to determine whether a standard deduction state or flow should be confirmed.

As another example, also referring to FIG. 5, the U 1500 may include questions 504*b*, 504*e* and response options 117*r* determined by the confirmation predictive model 119*c* or business logic 150 such that text of certain questions does not specify a range of numerical data 117*ra* that is the subject of the determined or selected question 117*q*. Instead, UI elements or buttons 520 are encoded with or represent response options of the numerical range data 504*b*, 504*e*.

For example, execution of a confirmation predictive model 119c may determine or select questions 117q of (e.g., "Did you have tax prep fees over $100"? and "Do you have job expenses over $1,200?" and for these examples, the numerical ranges are expressed as 0-100 and 100+ and 0-1200 and 1200+). For these types of questions 117q, the UI 115 may include elements or buttons 520 that can be selected via an input device 141 of the computing system 140 such as a mouse or touchscreen to enter a "Yes" or "No' answer. Thus, in the illustrated embodiment, numerical range data 117ra/504 determined by execution of one or more confirmation predictive models 119c may be expressed in the question 117q itself such that response options 117r may be binary response options (e.g, Y/N).

As another example, execution of a confirmation predictive model 119c may determine or select questions 117q of (e.g., "About how much did you donate to charity?") such that the text of the selected or determined question 117q does not include any numerical range data 117ra/504, and instead, numerical range data 117ra/504 is included in UI element 520 that is encoded with or represents numerical range options 117ra/504, such as $0-400, $401-800 and Over 800. Thus, in contrast to the "binary" response options 117r discussed above, the UI 115 that is generated for these types of questions 117q may include elements or buttons 520 that are encoded as or represent numerical data ranges 117ra/504, and can be selected via an input device 141 of the user's computing system 140 such as a mouse or touchscreen to select, for example, the "$401-800" UI element as shown in FIG. 5. The generated UI 115 may also include a combination of questions and response options as shown in FIG. 5, i.e., both determined or selected or determined questions 117q, the text of which specifies a numerical range 117ra and UI elements are encoded with or represent response options 117r for numerical ranges, 117ra as well as determined or selected questions 117q in which numerical range data 117ra is incorporated into the question 117q text itself, and can be answered with UI elements that represent binary response options 117r.

In the illustrated embodiment, the generated UI 115 resulting from execution of data analytics elements of the confirmation module 113c include six questions 117q (502a-f), answers to which have been determined to provide ~95% success rates in confirming standard deduction states. In the illustrated embodiment, the UI 115 includes determined or selected questions 117q and respective response options 117r involving tax return preparation application fees, charitable donations, medical expenses, employment expenses, automobile registration fees, and home ownership (502a-502f as shown in FIG. 5).

Referring again to FIG. 4, and with continuing reference to FIG. 3, at 414, the confirmation module 113c receives responses to the presented questions 117q/502a-f (e.g., the six questions shown in FIG. 5) by the user selecting a UI element encoded as or representing a binary response option 117r or selecting a UI element 117r encoded as or representing a numerical range of data 117ra. UI selection may be made by the user manipulating an input device 141 such as a mouse or touchscreen. These responses in the form of UI element selection, however, are not entered is not the electronic tax return at this stage, and the responses are made without entry of specific numerical data (e.g., $250) since a UI element for the range of $401-$800 is selected instead. Thus, the user is not required to know or type in specific tax return data for purposes of svi model 119s output confirmation.

Continuing with reference FIGS. 3-4, at 416, if the standard deduction state output by the svi predictive model 119s is confirmed based on the selected UI elements, then the method continues to 418 for potential override of the standard deduction state. If the standard deduction state output by the svi model 119s is not confirmed, then the tax return preparation system 111 maintains or reverts back to the itemized deduction state at 424, and at 426, presents itemized questions to the user.

For example, in the embodiment in which a UI 115 generated according to embodiments involves the six questions 502a-f shown in FIG. 5, according to one embodiment, if all of the questions are answered as "No" and a pre-determined range is selected, then the standard deduction state can be confirmed. Otherwise, if the user answers in a different way, the standard deduction state is not confirmed and the tax return preparation system 111 reverts back to or maintains the itemized deduction state based on the confirmation module 113c output.

With continuing reference to FIG. 4, in cases in which the svi model's 119s output of modifying the itemized deduction state to the standard deduction state is confirmed by the confirmation module 113c and user's selection of applicable response options 117r, at 418, the override module 113o may then be triggered to execute in response to the standard deduction state confirmation generated by confirmation module 113c.

The override module 113o may implement an itemized deduction state despite the svi predictive model 119s result indicating standard deduction state and the standard deduction state being confirmed if certain criteria have been satisfied. For example, override criteria may be or involve a certain type of data in the received taxpayer data 116, a change in the taxpayer data 116, the user navigating to a pre-determined interview screen or electronic tax form, or the use selecting a certain topic from a list of tax topics. In one embodiment, at 418, if the override module 113o determines that the user has income data of multiple states, entered home ownership data such as property tax, mortgage interest and mortgage points, the user has adjusted gross income=0, the taxpayer can be claimed as a dependent by another taxpayer, the electronic tax return is for a pre-determined state tax authority, a filing status of the electronic tax return being married and filing jointly, and a charitable contribution deduction carryover from a prior tax year, then the standard deduction state, as determined by the svi predictive model 119, and confirmed by the confirmation predictive model 11pc, is overridden such that the state remains as or reverts back to the itemized deduction state at 424. However, at 420, if the pre-determined override criteria has not been satisfied such that there is no override and the standard deduction state is confirmed again or allowed to proceed, then at 422, interview screens, questions or topics for the standardized experience can be presented to the user, while more involved and complicated itemized deduction questions can be bypassed and the user enters data into interview screens or tax forms for the standard deduction flow. Entry of data into the electronic tax return, via an interview screen or form, is in contrast to user responses to generated UI for svi predictive model 119s confirmation, which are not entered not entered into the electronic tax return.

FIGS. 6A-G are examples of interview screens that further illustrate how embodiments may be implemented and involves the UI discussed above with reference to FIG. 5.

Figure 6A:
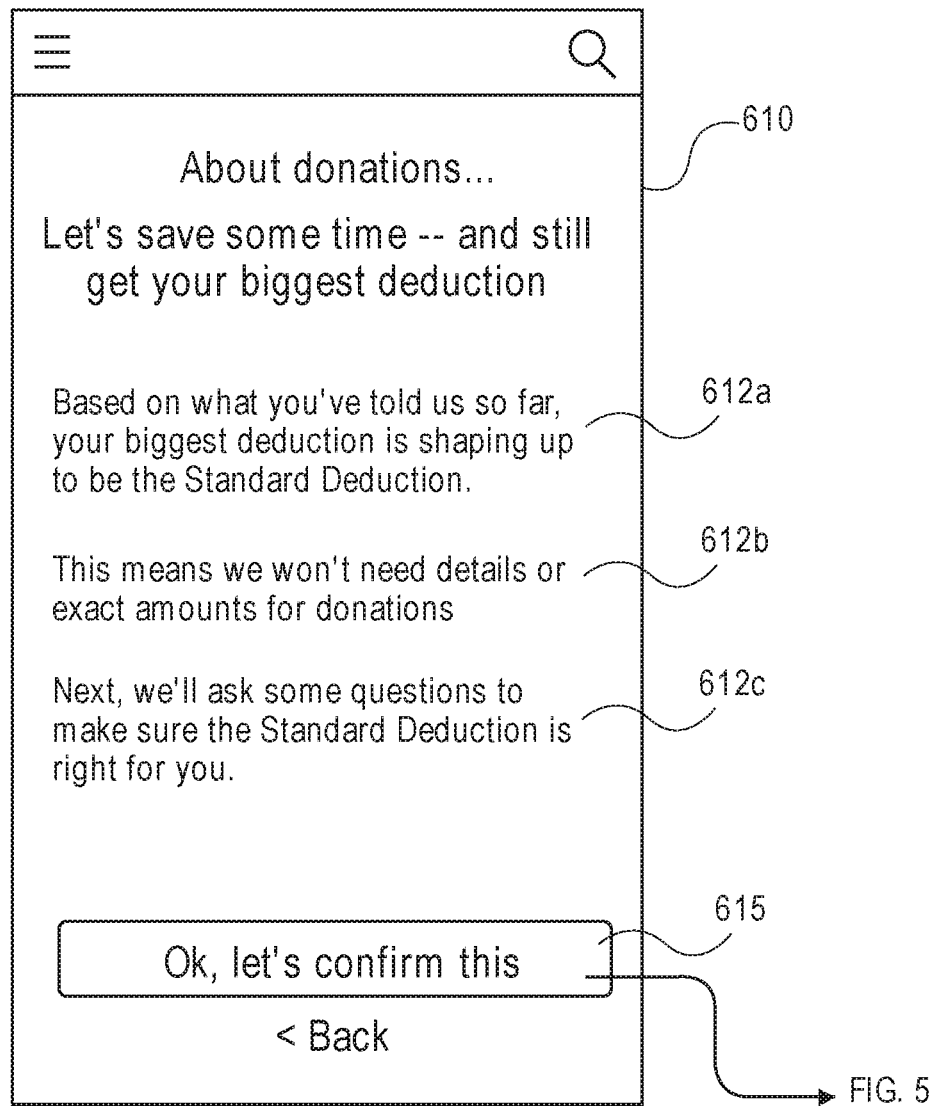
FIGS. 6A-C are examples of interview screens that serve as gateways to the special purpose user interface according to embodiments.
Figure 6B:
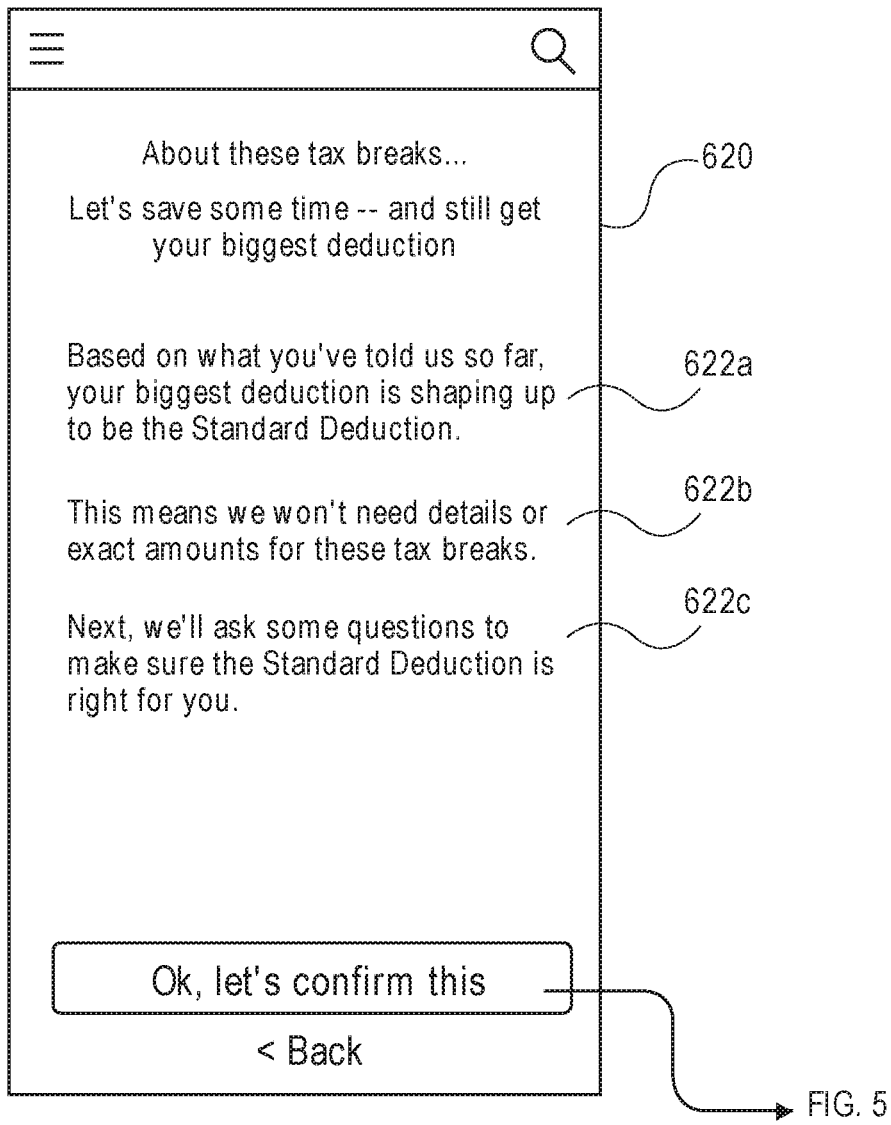
Figure 6C:
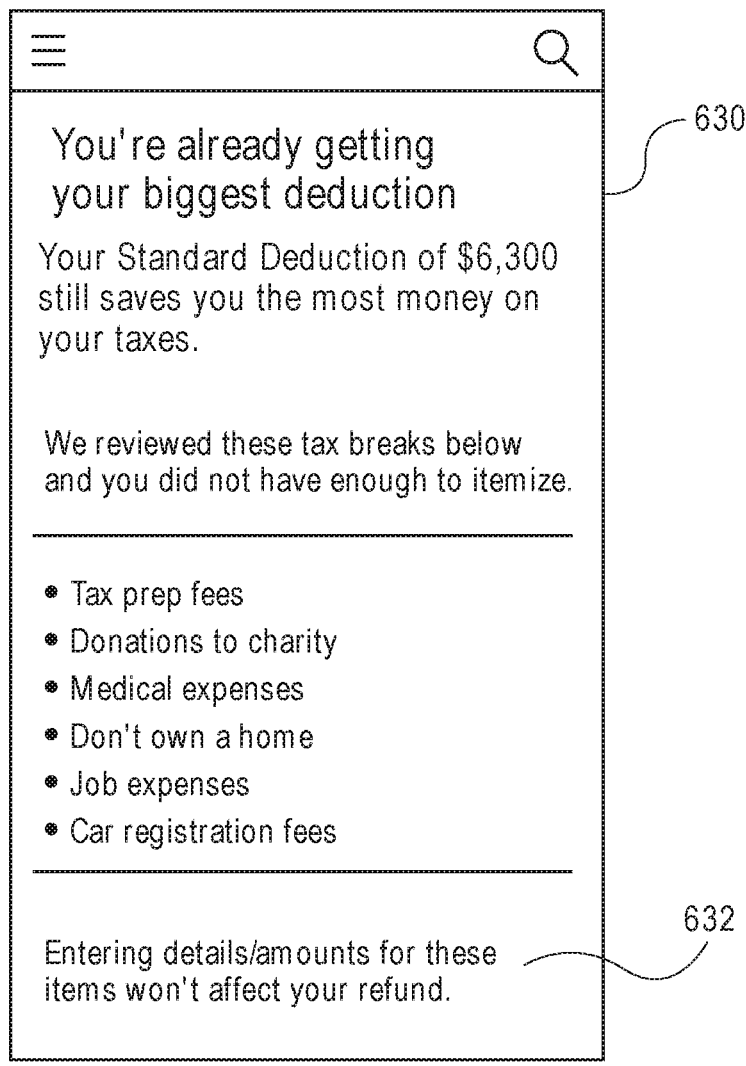

FIGS. 6A-C illustrate examples of interview screens 610, 620, 630 that are "gateways" to a standard deduction confirmation UI 115/500 (e.g., as shown in FIG. 5) and that may be presented to a user based on their current tax data, e.g, in "MyStuff" or tax topics listed in or selected from a landing table that includes a list of tax topics that are determined to be relevant to the user.

For example, in FIGS. 6A-B, the tax return preparation system has executed the svi predictive model 119s to determine that the system should be in a standard deduction state, and the interview screens 610, 620 include various explanations 612a-c, 622a-c that may, for example, inform the user that it appears that it is most beneficial for the user to take a standard deduction, that it will not be necessary to review itemized deduction questions or topics and that the standard deduction determination will need to be confirmed, and by selecting the UI element 615, the user proceeds to the svi confirmation interview, previously discussed with reference to FIG. 5. FIG. 6C illustrates an example of an interview screen 620 with another type of message 632 that may be presented to the user to explain that although the user may have expenses that are possible itemized deductions, the user did not have enough to itemize them such that going through the itemized deduction process would not affect the refund that is based on a standard deduction.

It will be understood that gateway interview screens may be presented at various times during the electronic tax return preparation process, and may involve the user's tax return data that has already been entered or imported, tax topics that have been selected by a user, or a generate list of tax topics. Thus, reference to tax data in "MyStuff" and tax topics in a landing table are provided as examples of sources of data that may be used as inputs to a svi model for making a determination whether the tax return preparation system should be placed in a standard deduction state. For example, as noted above, and discussed with reference to FIG. 2, input data 202 may be the user data such as one or more of manually entered data, data imported from an electronic source such as a computerized financial management system, a prior year electronic tax return or a financial institution computer. Input data 202 may also involve user interactions such as whether and/or when the user navigated to a certain screen or selected a certain topic or form (e.g., based on tax return data in "MyStuff" and topics listed in a landing table in TURBOTAX tax return preparation application). For example, TURBOTAX tax return preparation application collects profile information about the tax filers through the Year Over Year, Get to Know Me, Personal Information, Personalized Tax Topics and Income sections. Further, Appendix 1 provides examples of the types of data that may be used as inputs to one or more predictive models 119 utilized in embodiments.

Thus, FIGS. 6A-B are illustrative examples of gateway interview screens that include a UI element that can be selected by the user to initiate the standardized deduction state confirmation process and presentation of the UI 115 with respective questions 117q and response options 117r including ranges of numerical data 117ra as previously described with reference to FIG. 5.

Figure 6D:
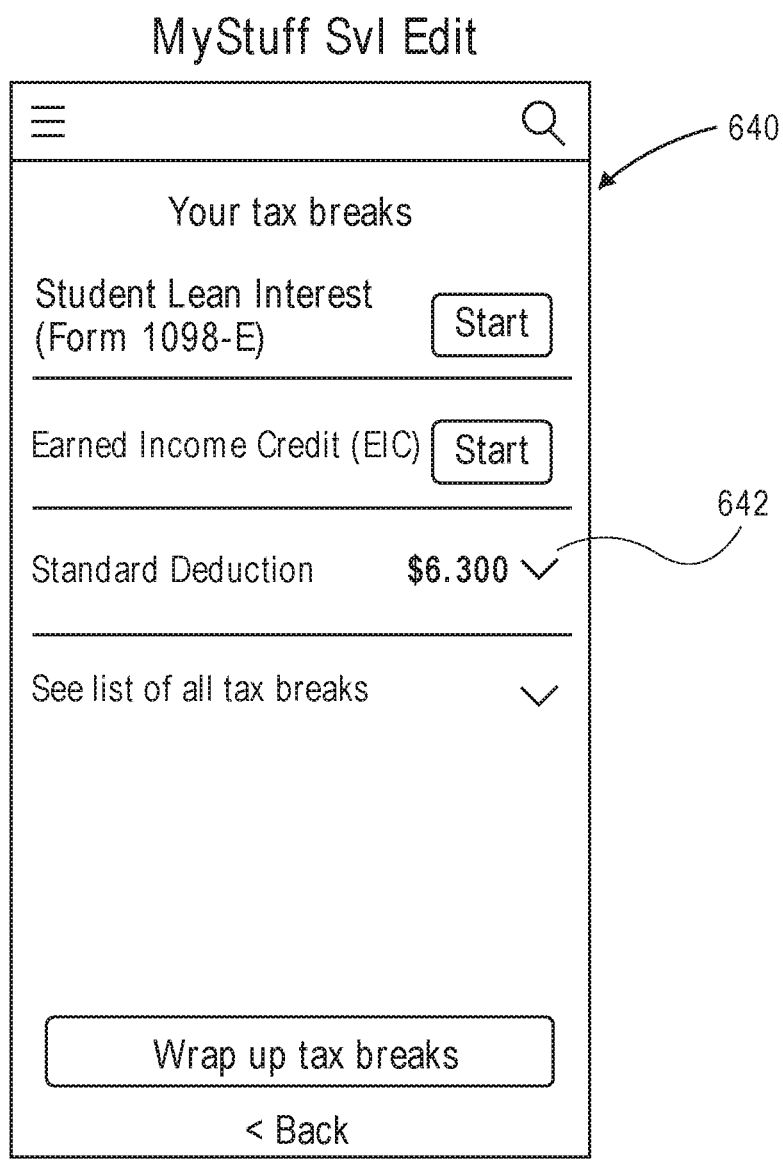
FIG. 6D is an example of an interview screen that is presented to the user after standard deduction has been confirmed utilizing the special-purpose user interface of FIG. 5 such that the tax return preparation state can be modified from an itemized deduction state to a standard deduction state.

Referring to FIG. 6D, when the svi predictive model 119s output of standard deduction state has been confirmed based on the responses to the questions 117q in the UI 500 shown in FIG. 5, the user may be directed to a home page or home deduction and tax credit page 640, which indicates the standard deduction 642 in the amount of $6,300.

Figure 6E:
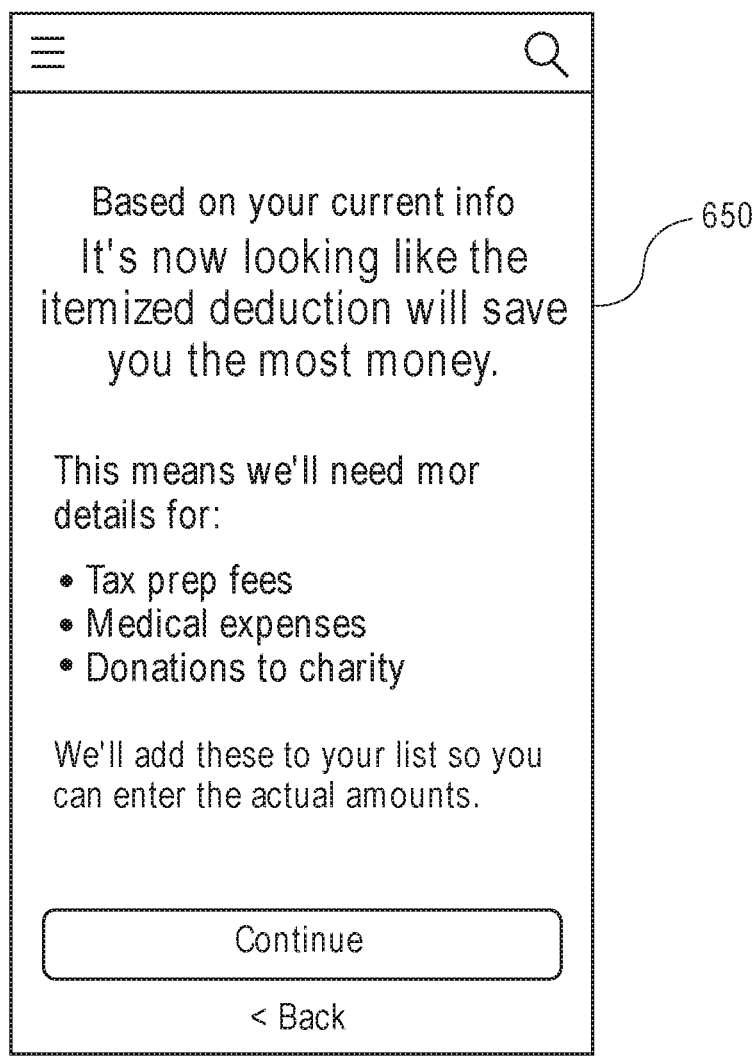
FIG. 6E is an example of an interview screen that is presented to the user after standard deduction state or flow determination has not been confirmed utilizing the special-purpose user interface of FIG. 5 such that the tax return preparation application state is not modified to, or is maintained as, an itemized deduction state or flow.

Otherwise, referring to FIG. 6E, based on the user's response to the questions in the interface of FIG. 5, the svi model's 119s output of standard deduction is not confirmed (or is confirmed but overridden), in which case the user is presented with a screen 650 that explains that itemized deductions should be reviewed, and the state of the tax return preparation system is not modified to a standard deduction state (if already in an itemized deduction state), or reverted back to an itemized deduction state.

Figure 6F:
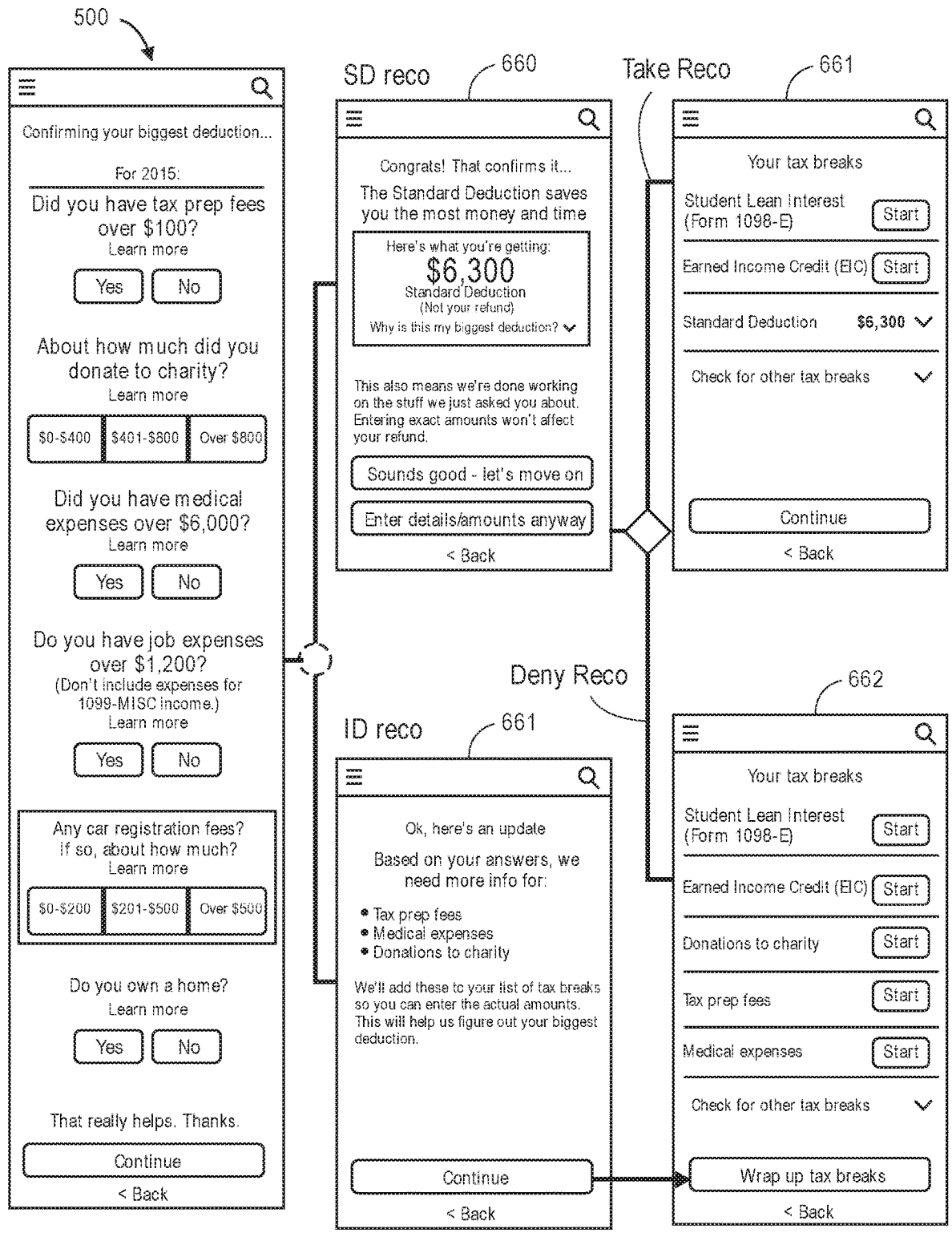
FIG. 6F illustrates examples of interview screens that may be presented to a user depending on whether the a standard deduction state or flow determination has been confirmed.

FIG. 6F further illustrates the flows described above depending on whether the user's responses to the questions 117q presented in the generated UI 500 according to embodiments confirms a standard deduction flow or maintains or reverts back to an itemized deduction flow. Interview screen 660 is generated when the standard deduction flow is confirmed, and may include a message indicating the amount of the standard deduction. If the user accepts this conclusion, the user is directed to interview screen 661, which may be an interview screen for deductions and credits and as shown, confirms the standard deduction in the amount of $6,300. If the user rejects this conclusion, the user is directed to interview screen 662 to proceed with questions and topics for itemized deductions. Thus, while it was determined that a standard deduction applies, and that determination was confirmed, the user has the option of proceeding with the standard deduction or exploring itemized deductions. Otherwise, if the svi model 119s output is not confirmed, the user proceeds to interview screens 661 and 662 for itemized deductions.

Figure 7:
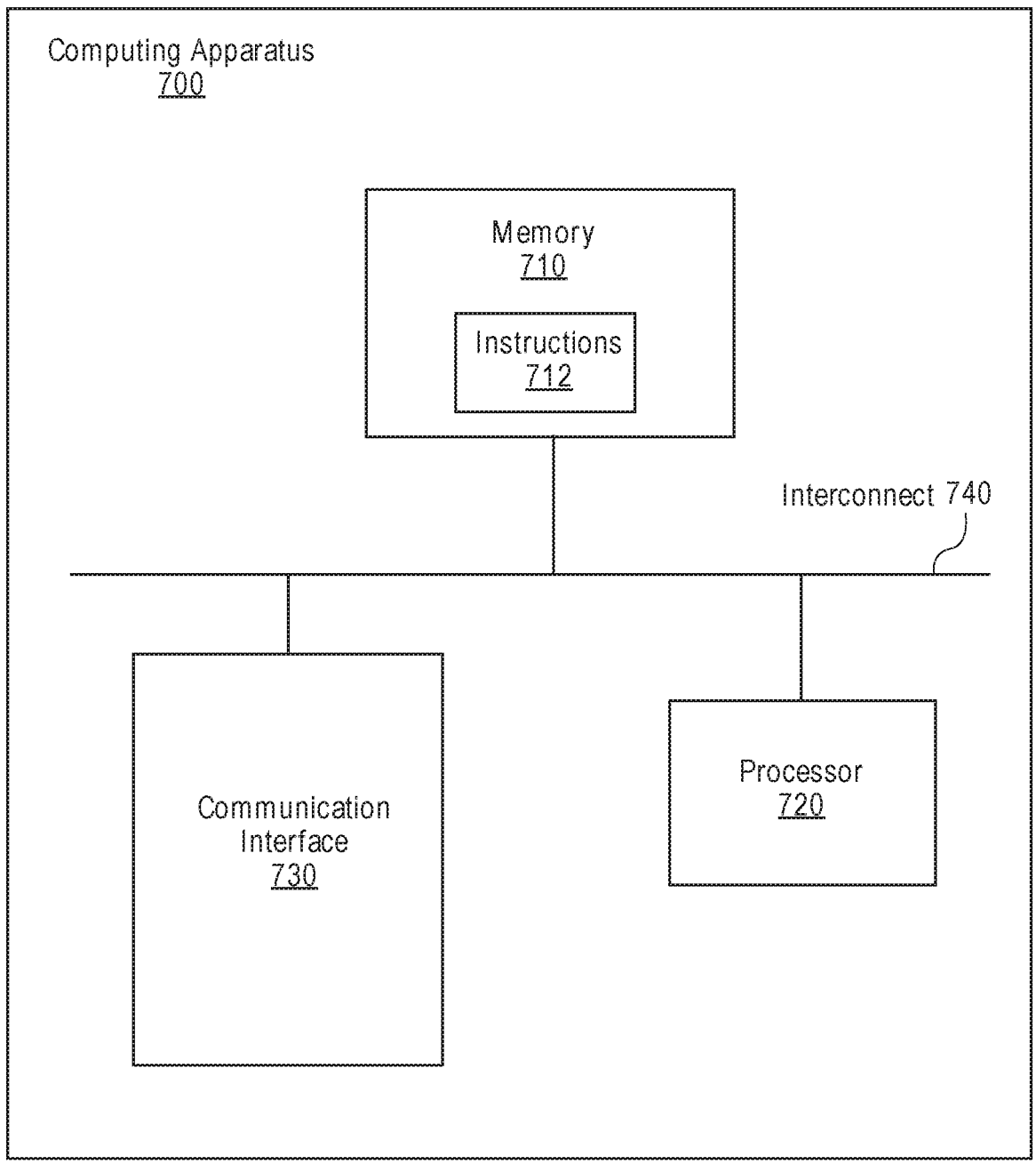
FIG. 7 is a block diagram of components of a computer system that may be programmed or configured to execute embodiments.

FIG. 7 generally illustrates certain components of a computing device 700 that may be utilized or that that system components include for execution of various computer instructions according to embodiments. For example, the computing device may include a memory 710, program instructions 712, a processor or controller 720 to execute instructions 712, a network or communications interface 730, e.g., for communications with a network or interconnect 740 between such components. The memory 710 may be or include one or more of cache, RAM, ROM, SRAM, DRAM, RDRAM, EEPROM and other types of volatile or non-volatile memory capable of storing data. The processor unit 720 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 740 may include a system bus, LDT, PCI, ISA, or other types of buses, and the communications or network interface may, for example, be an Ethernet interface, a Frame Relay interface, or other interface. The network interface 730 may be configured to enable a system component to communicate with other system components across a network which may be a wireless or various other networks. It should be noted that one or more components of computing device 700 may be located remotely and accessed via a network. Accordingly, the system configuration provided in FIG. 7 is provided to generally illustrate how embodiments may be configured and implemented, and it will be understood that embodiments may also involve communications through one or more networks between a user computer and a computer hosting system embodiments of on-line or cloud based tax return preparation applications.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 720 performs steps or executes program instructions 712 within memory 710 and/or embodied on the carrier to implement method embodiments.

Although particular embodiments have been shown and described, it should be understood that the above discussion is not intended to limit the scope of these embodiments and that embodiments may be utilized in various other ways. Thus, while embodiments and variations of the many aspects of the invention have been disclosed and described herein, such disclosure is provided for purposes of explanation and illustration only. Thus, various changes and modifications may be made without departing from the scope of the claims.

For example, it will be understood that systems may be implemented using various platforms and system configurations and confirmation modules may include predictive models, business logic or rules, or both. Further, while examples of predictive models of the confirmation module have been described (six exemplary predictive models for tax return preparation fees, charitable contributions, medical expenses, job expenses, car registration fees and home ownership), other predictive models, or combinations of these and other predictive models, may also be utilized to determine questions and/or response options for the generated interface of FIG. 5, and that numerical range data may be reflected in a text of a question, within a user interface element encoded with or representing a response options, or both. Moreover, embodiments may include an override module, and in these embodiments, while override or disqualifying criteria including income data of multiple states, property tax, mortgage interest, mortgage points, adjusted gross income=0, a taxpayer can be claimed as a dependent by another taxpayer, the electronic tax return is for a pre-determined state tax authority, a filing status of the electronic tax return being married and filing jointly, and a charitable contribution deduction carryover from a prior tax year have been described, it will be understood that various types and combinations of disqualifying criteria may be utilized.

Figure 8B:
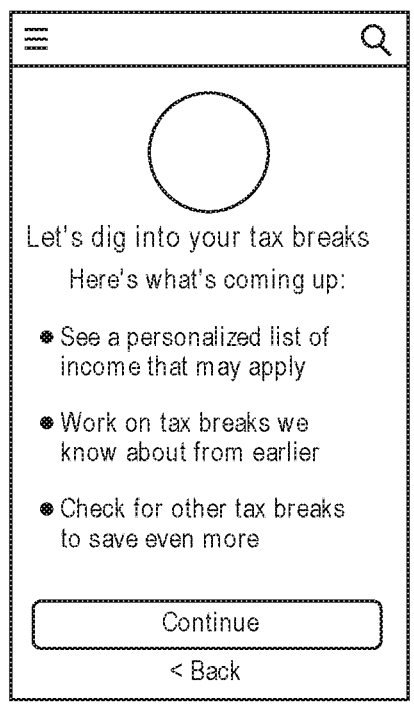
Figure 8B:
Figure 8B:
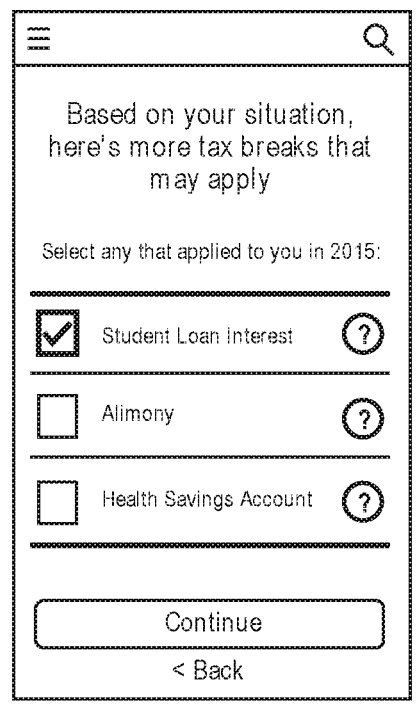
Figure 8C:
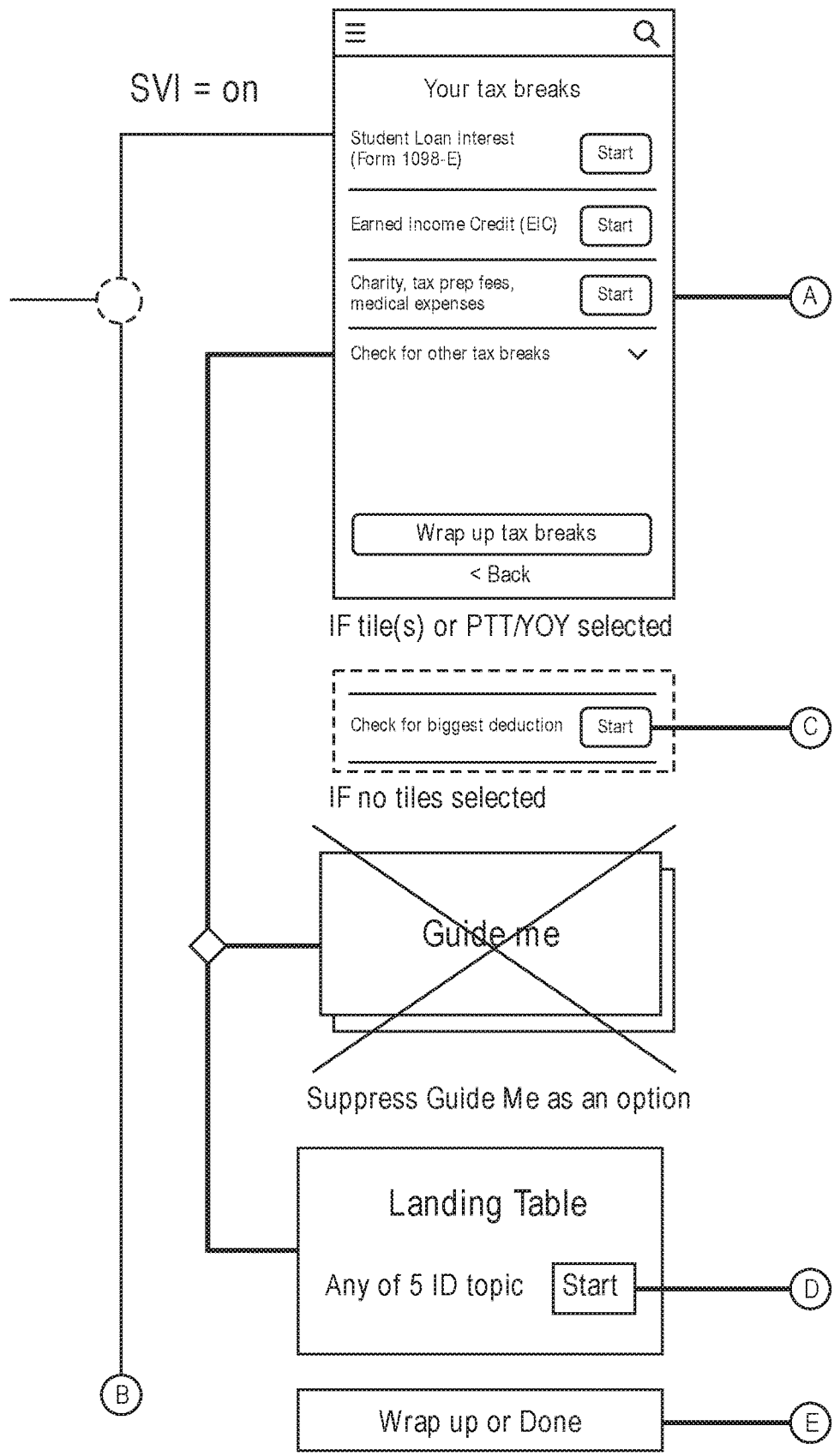
Figure 8D:
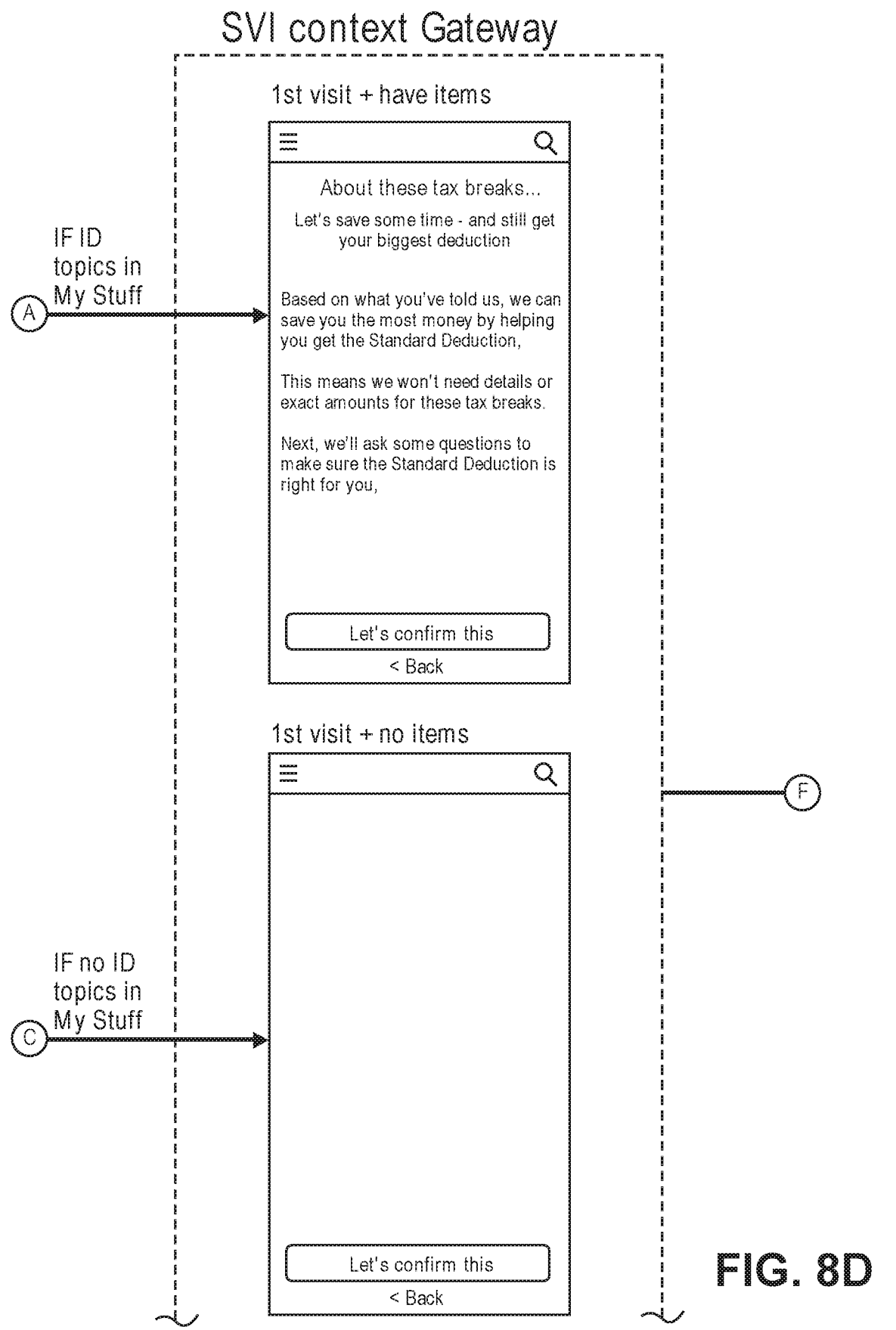
Figure 8E:
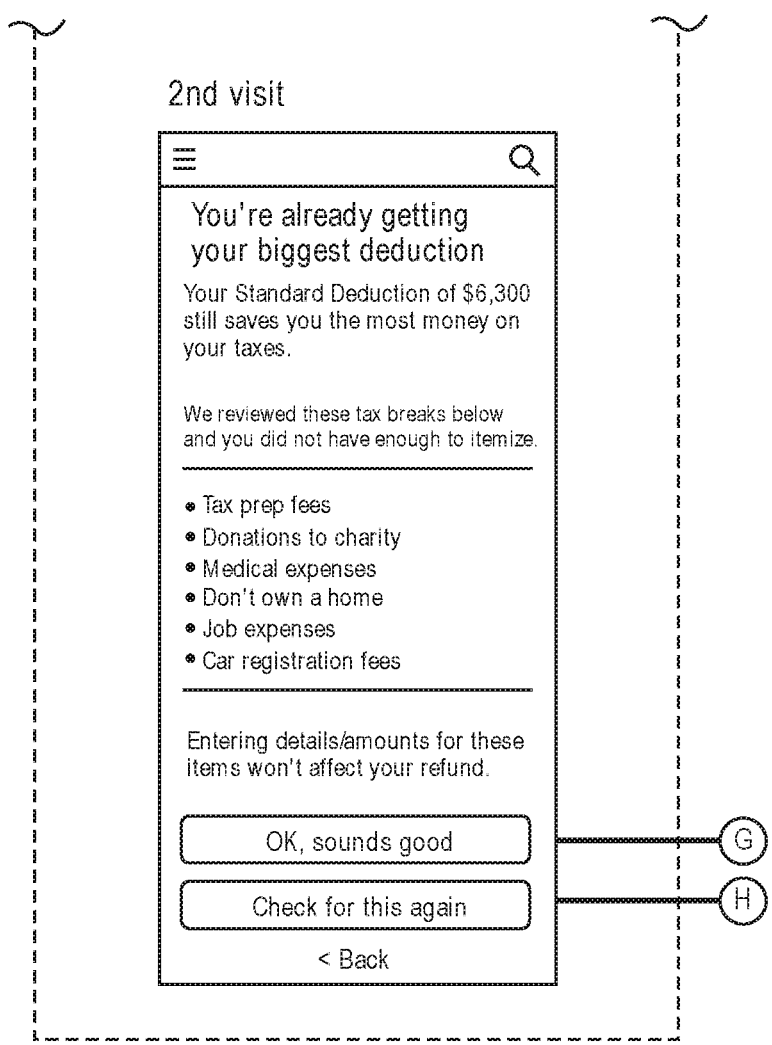
Figure 8F:
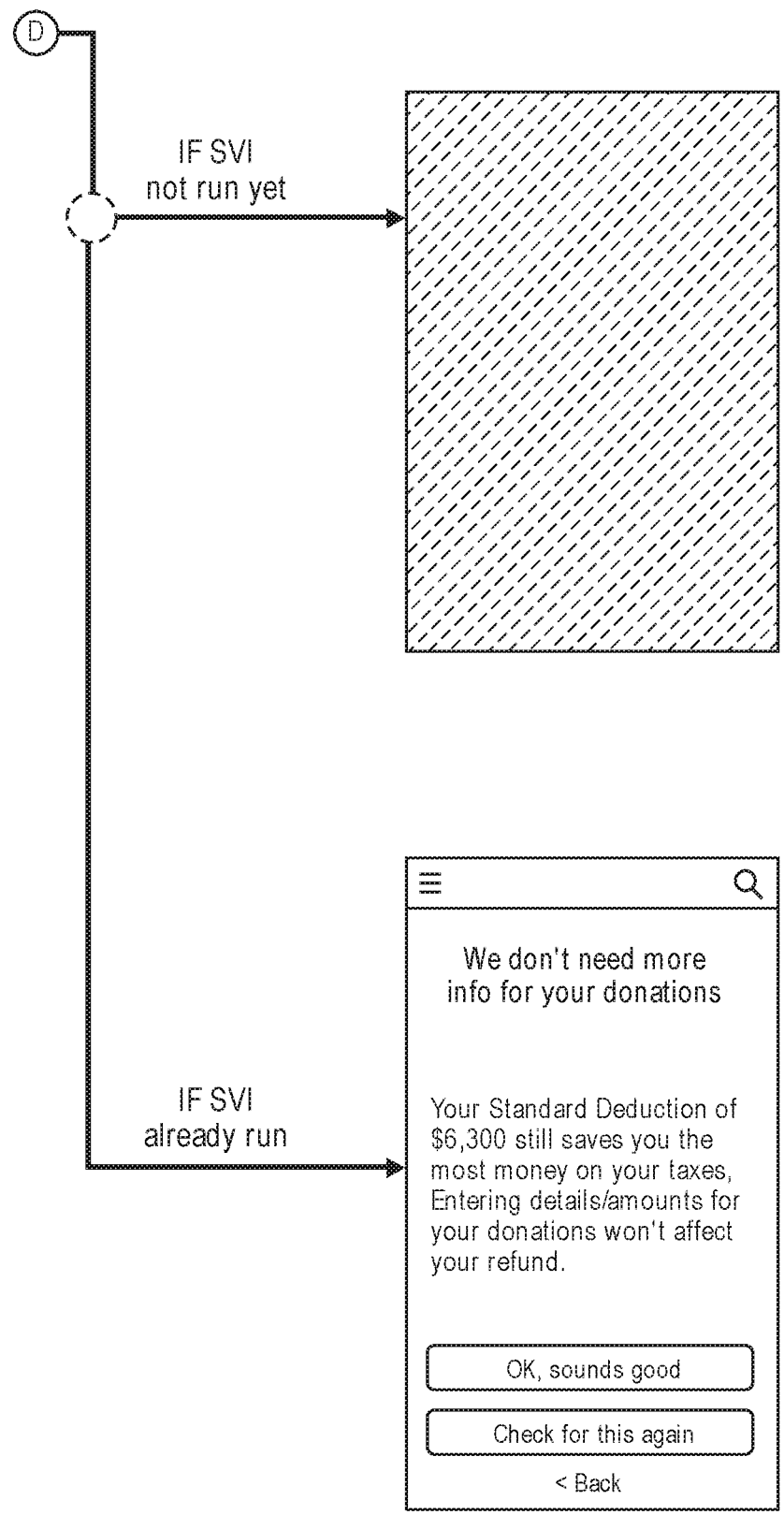
Figure 8G:
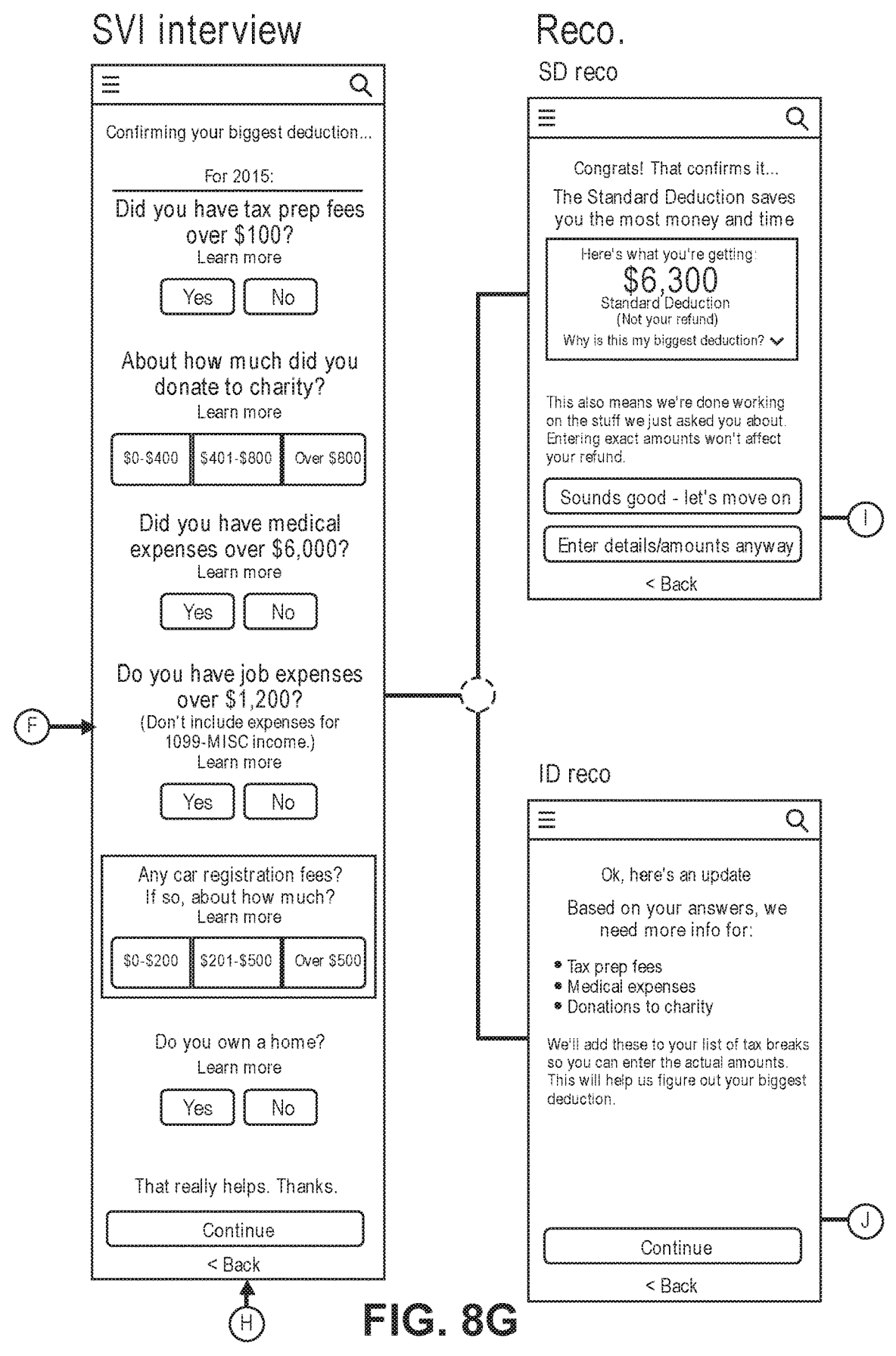
Figure 8H:
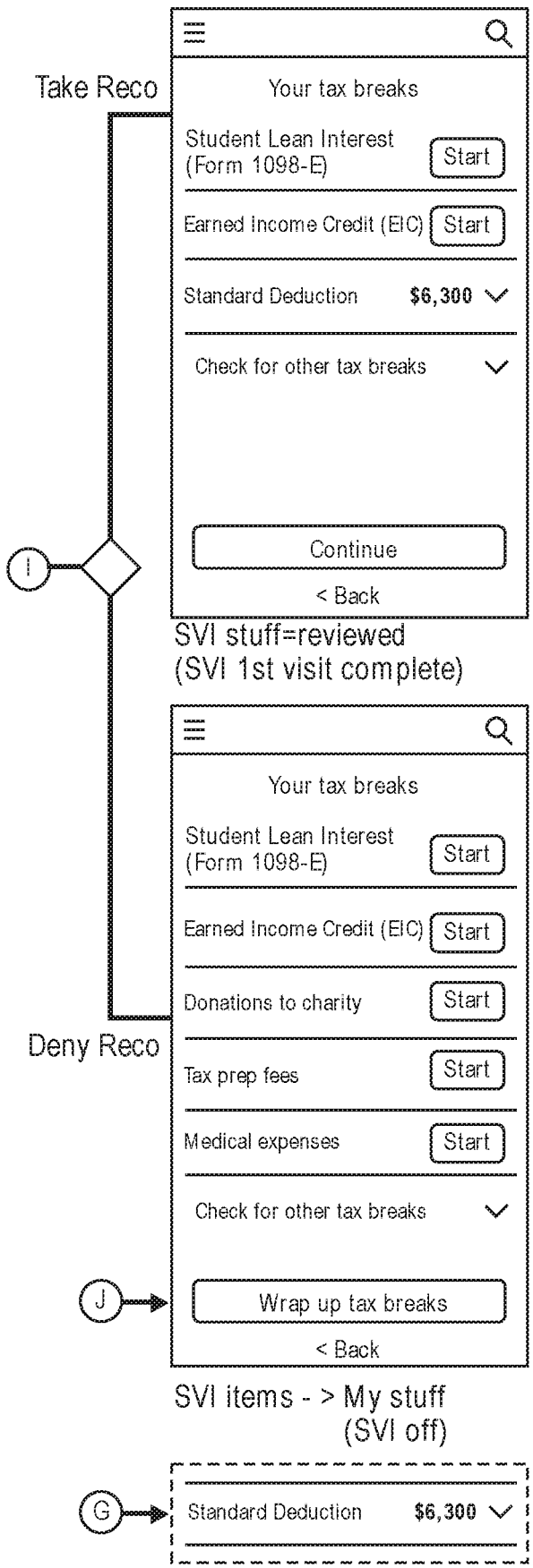
Figure 8I:
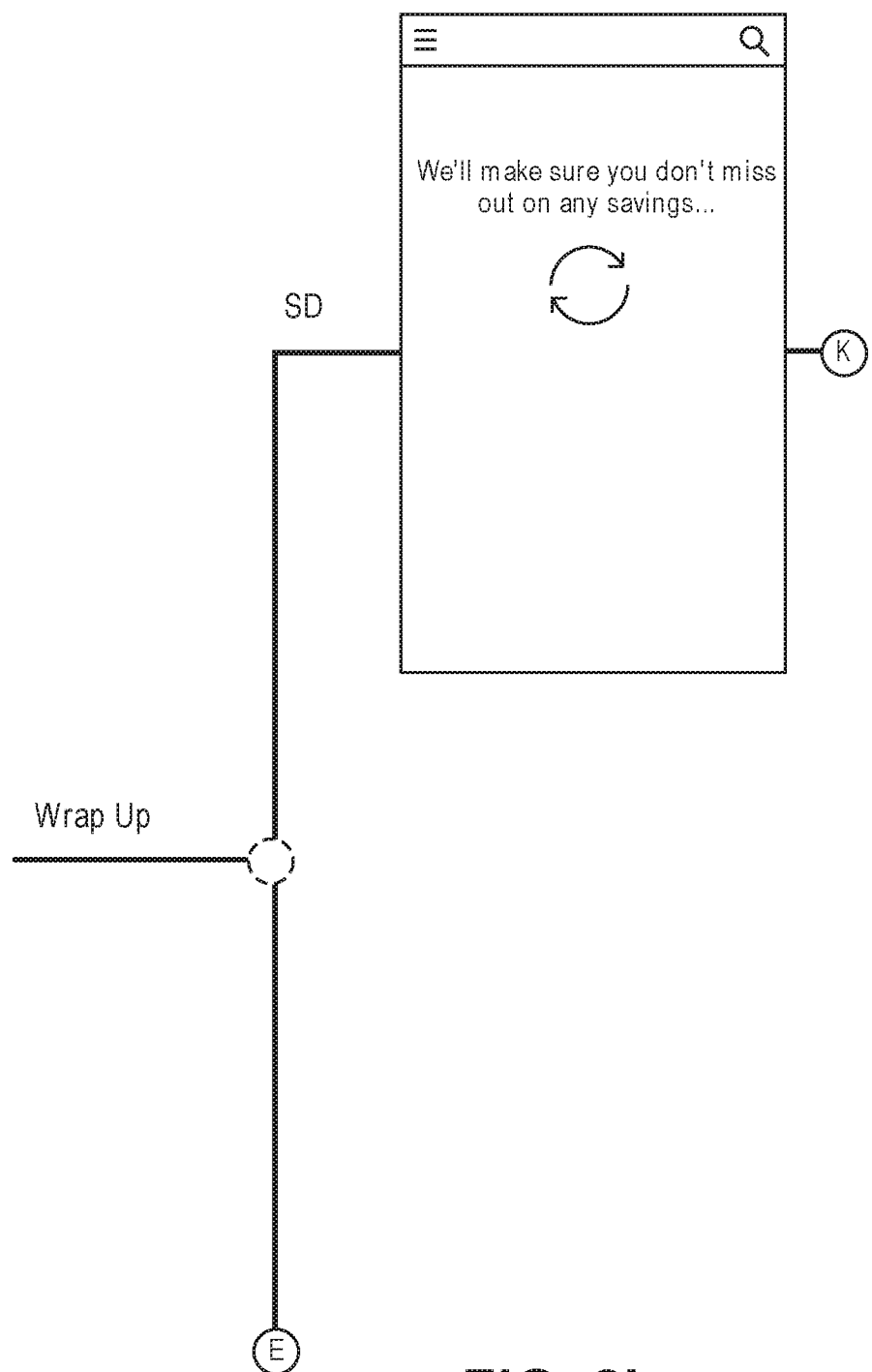
Figure 8J:
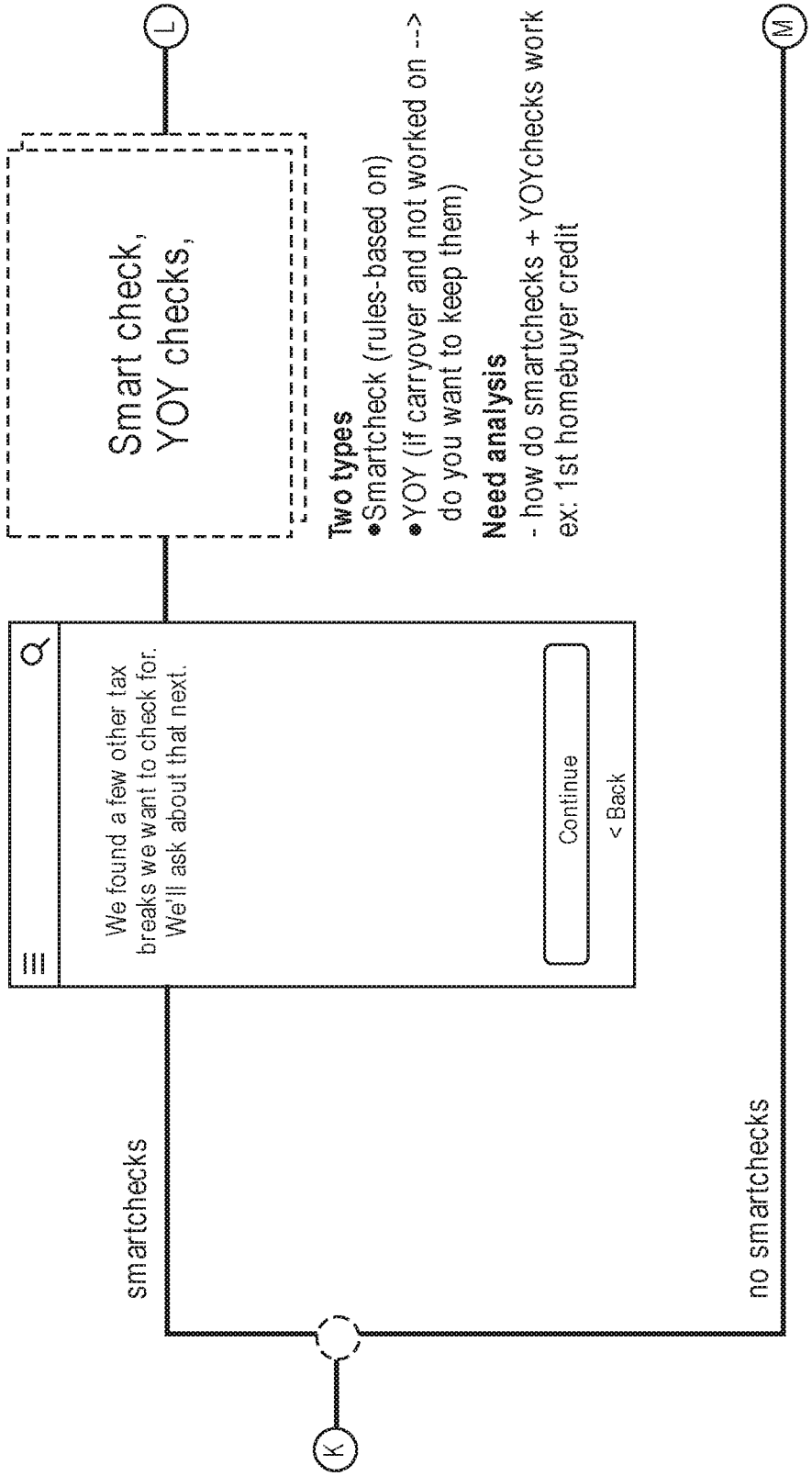
Figure 9A:
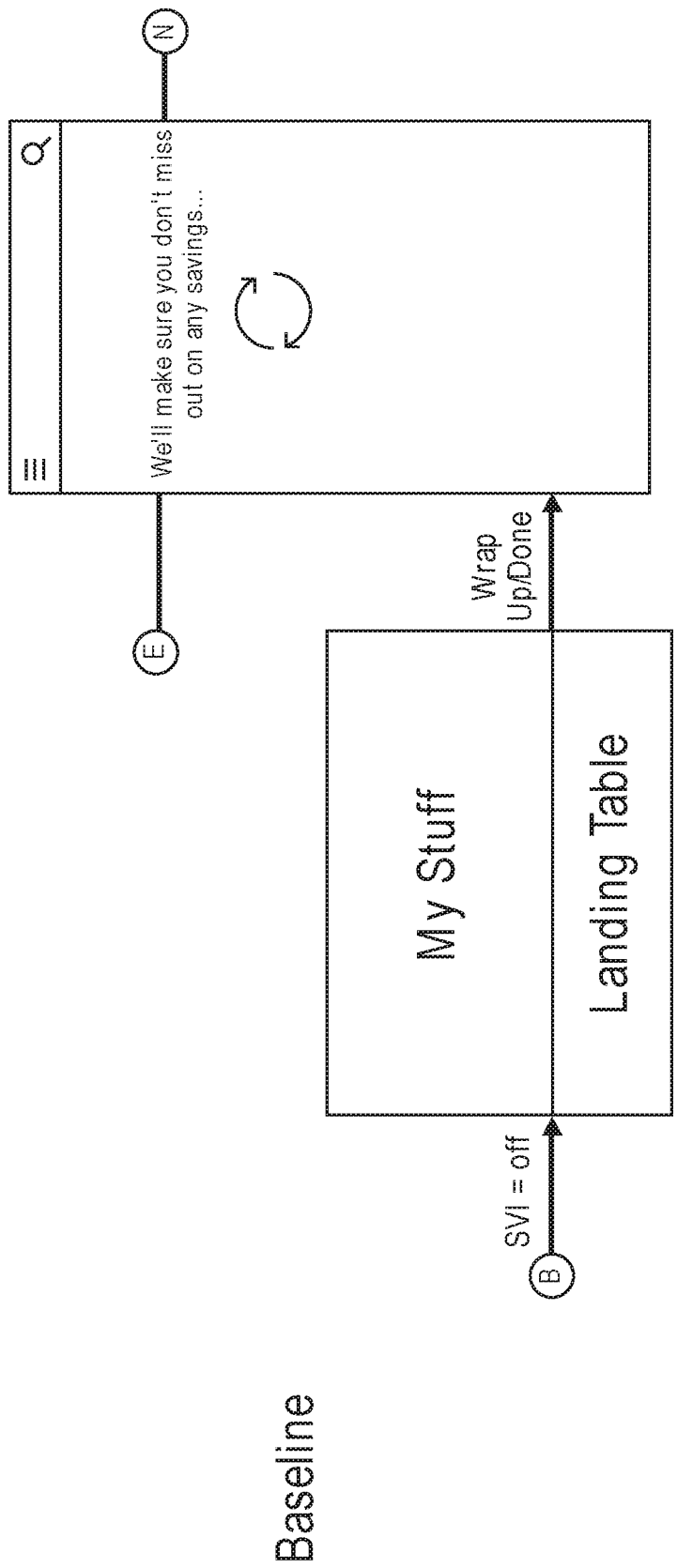
Figure 9B:
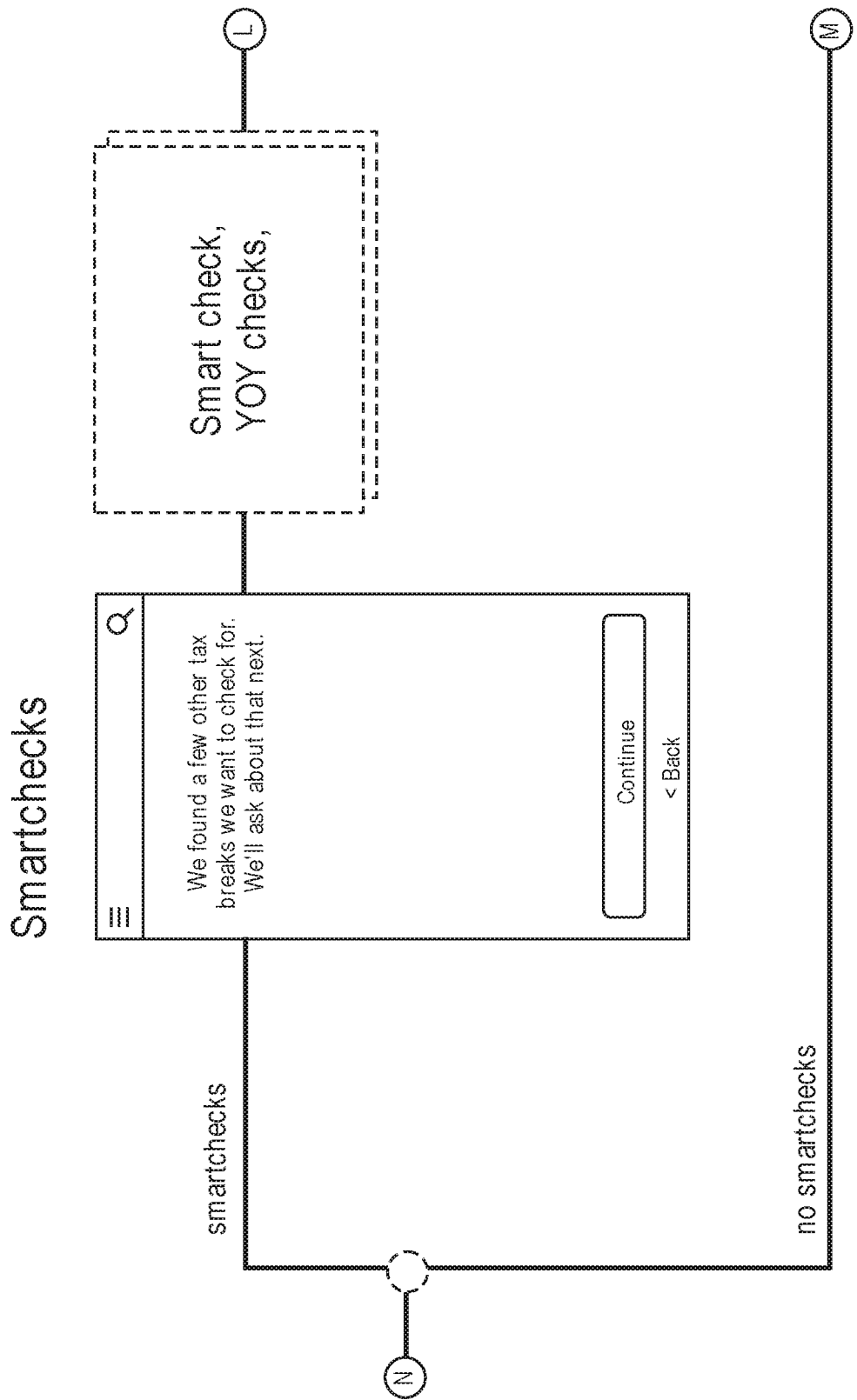
Figure 10A:
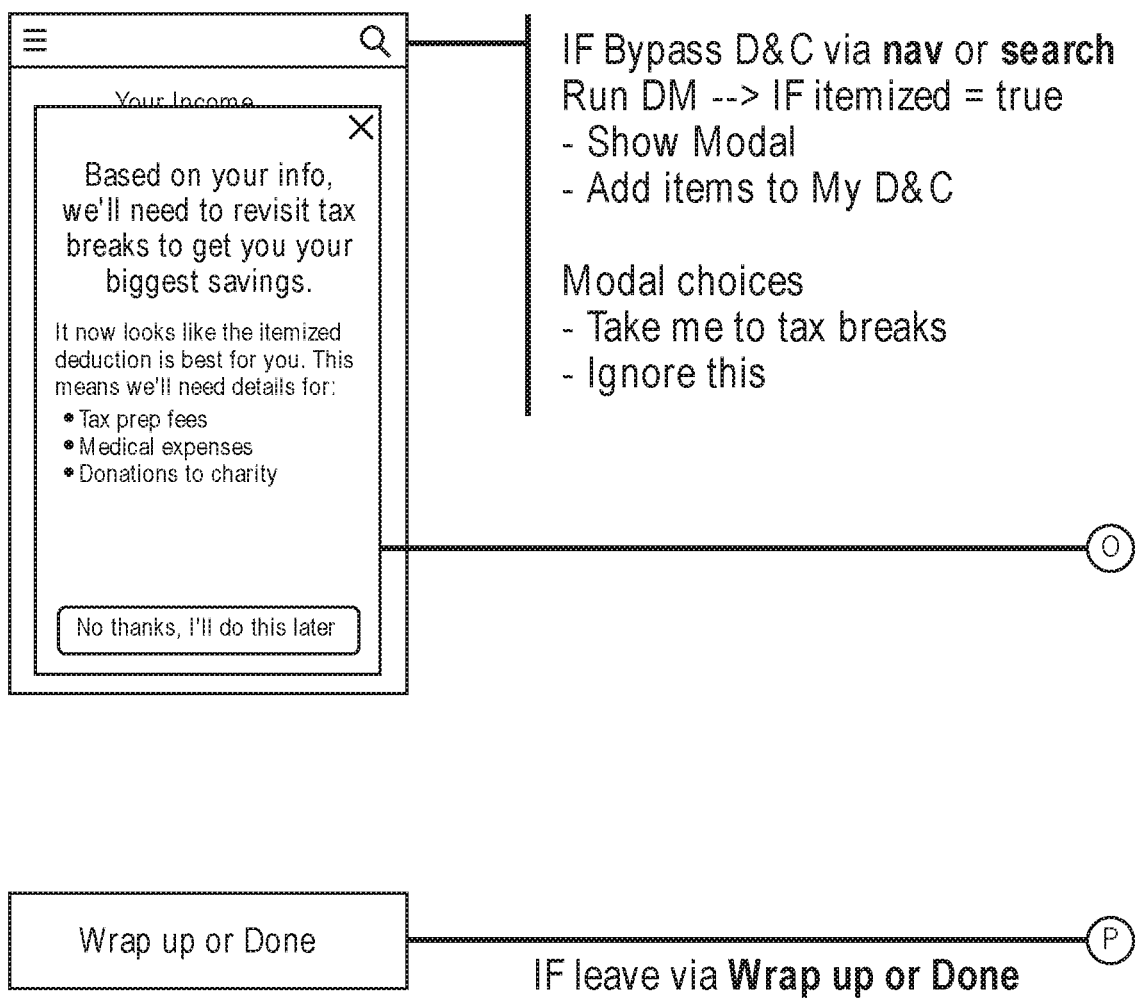
Figure 10B:
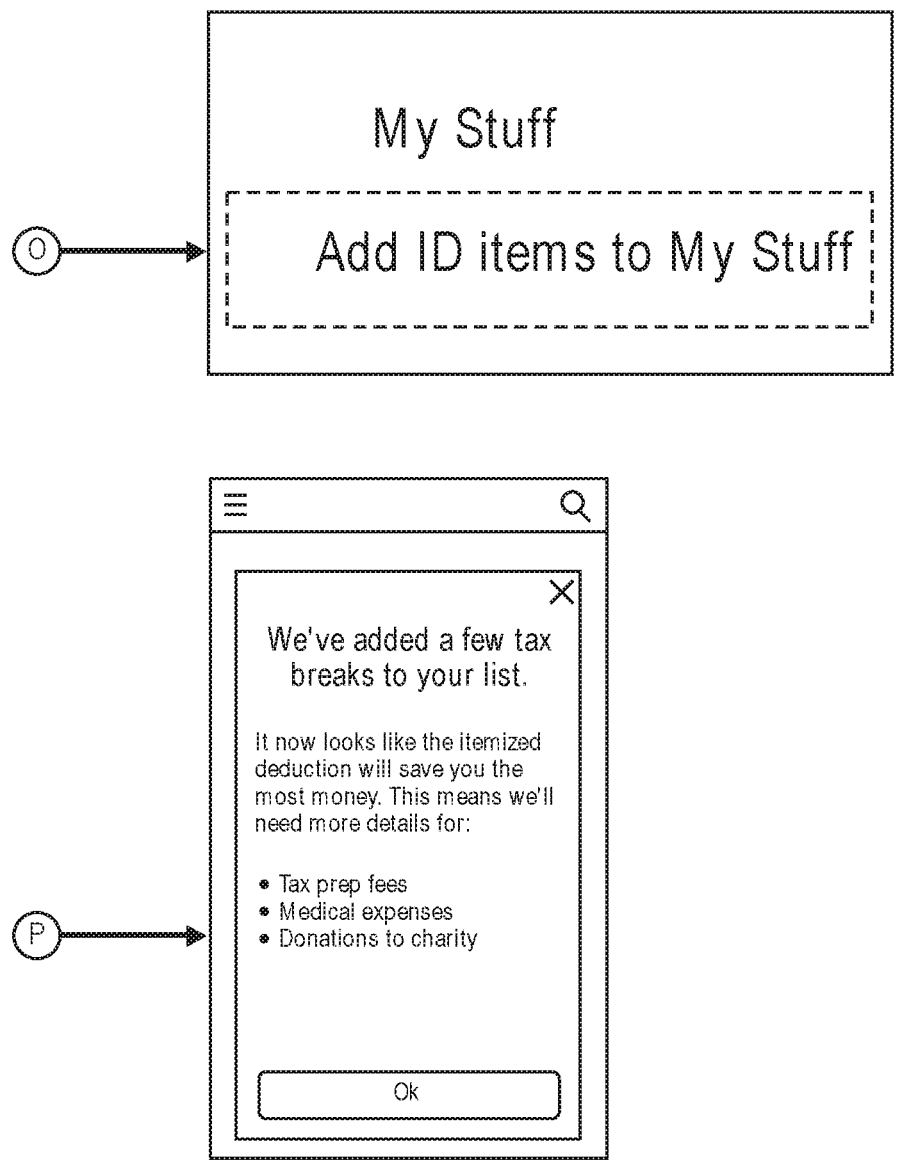
Figure 10C:
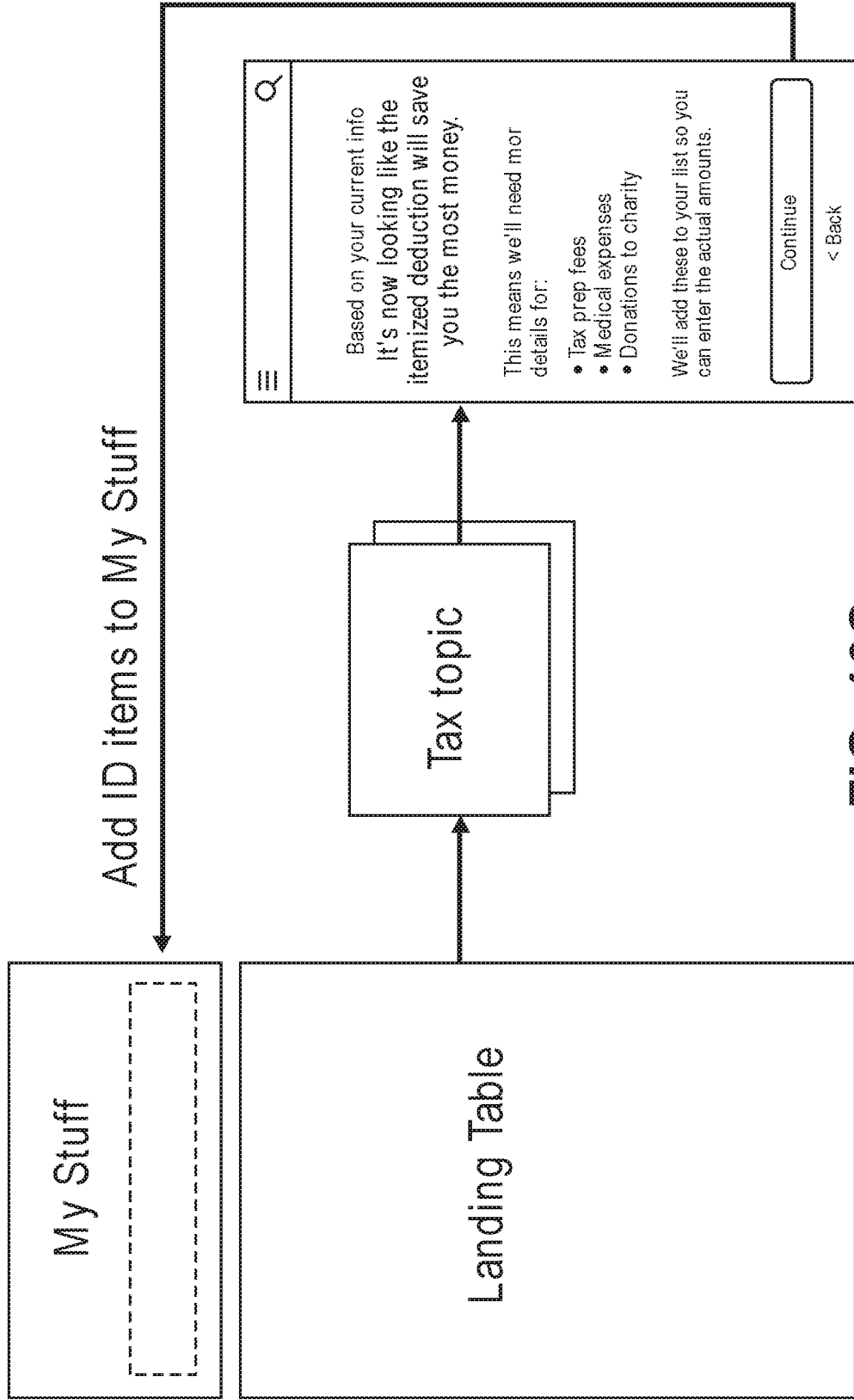
Figure 11A:
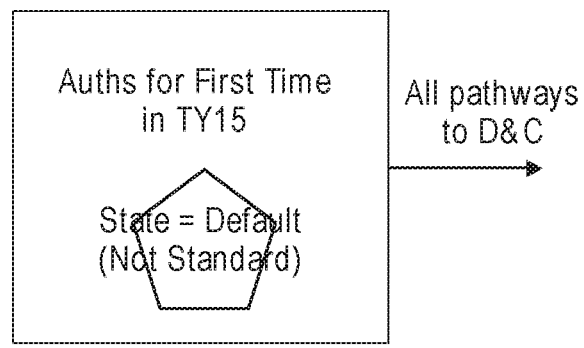
Figure 11A:
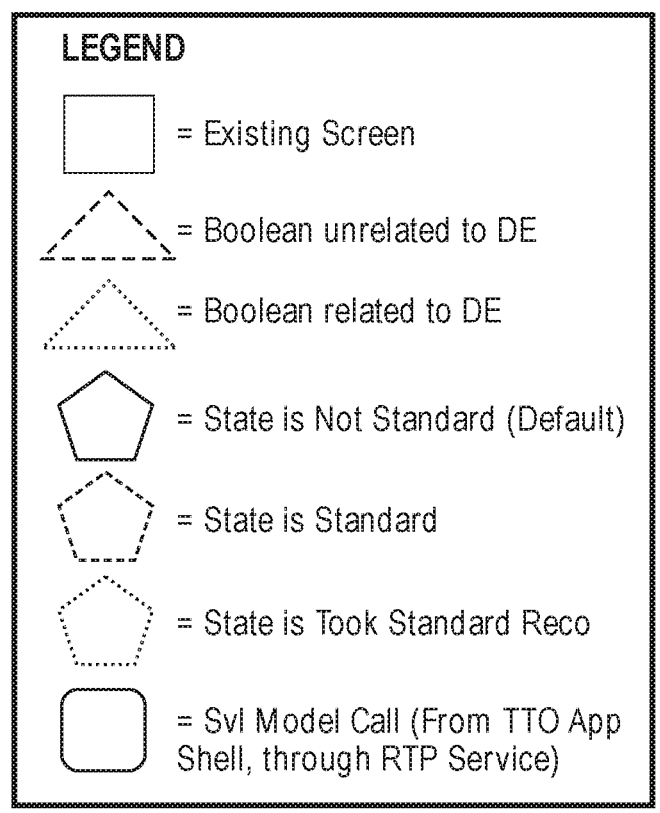
Figure 11B:
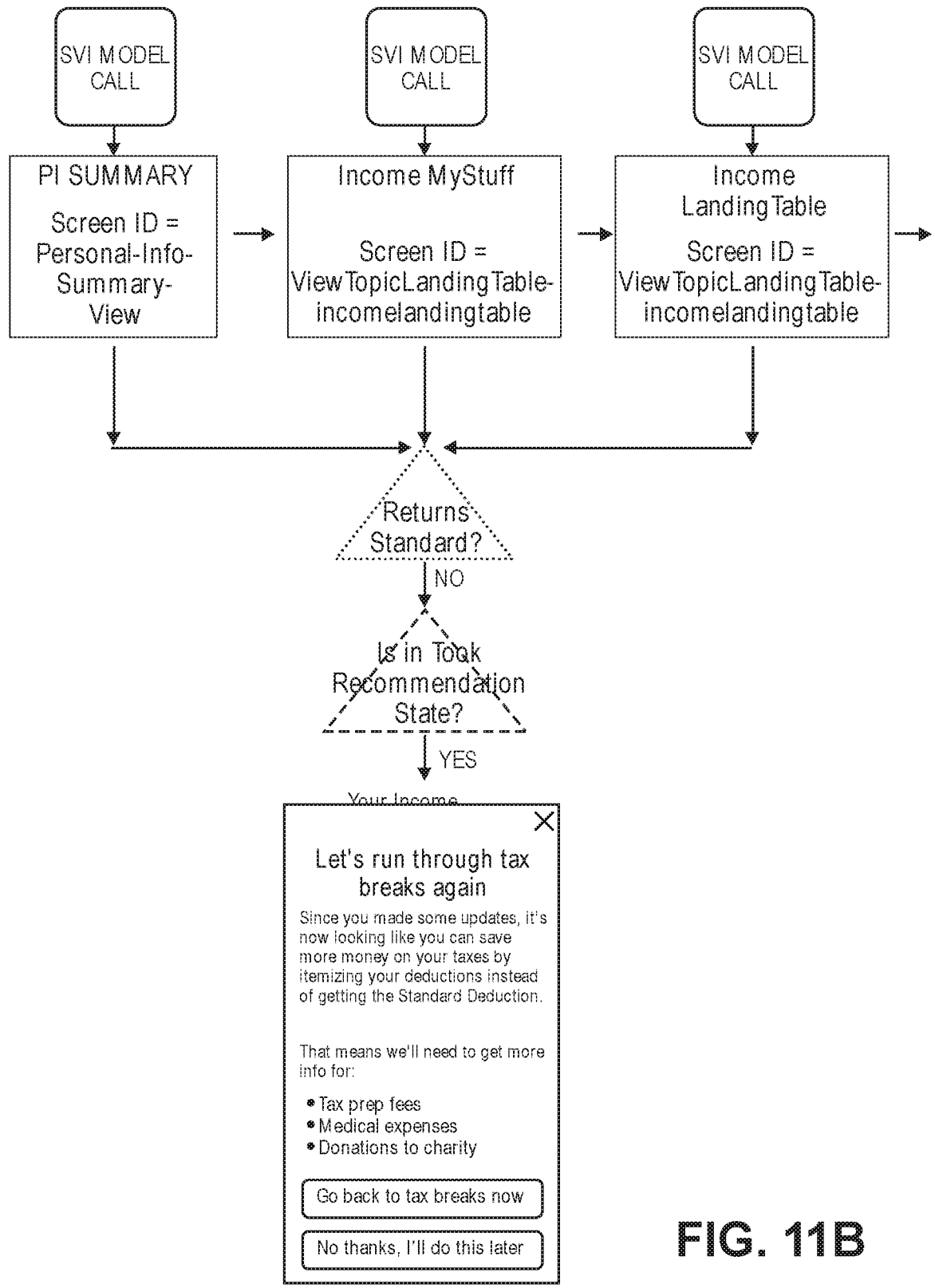
Figure 11C:
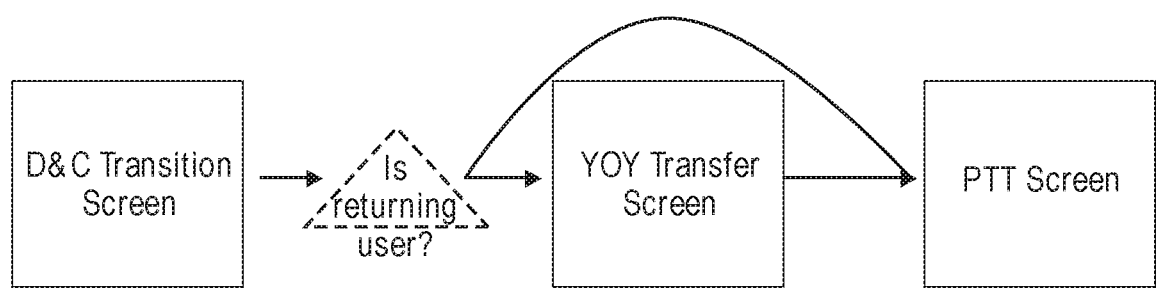
Figure 11E:
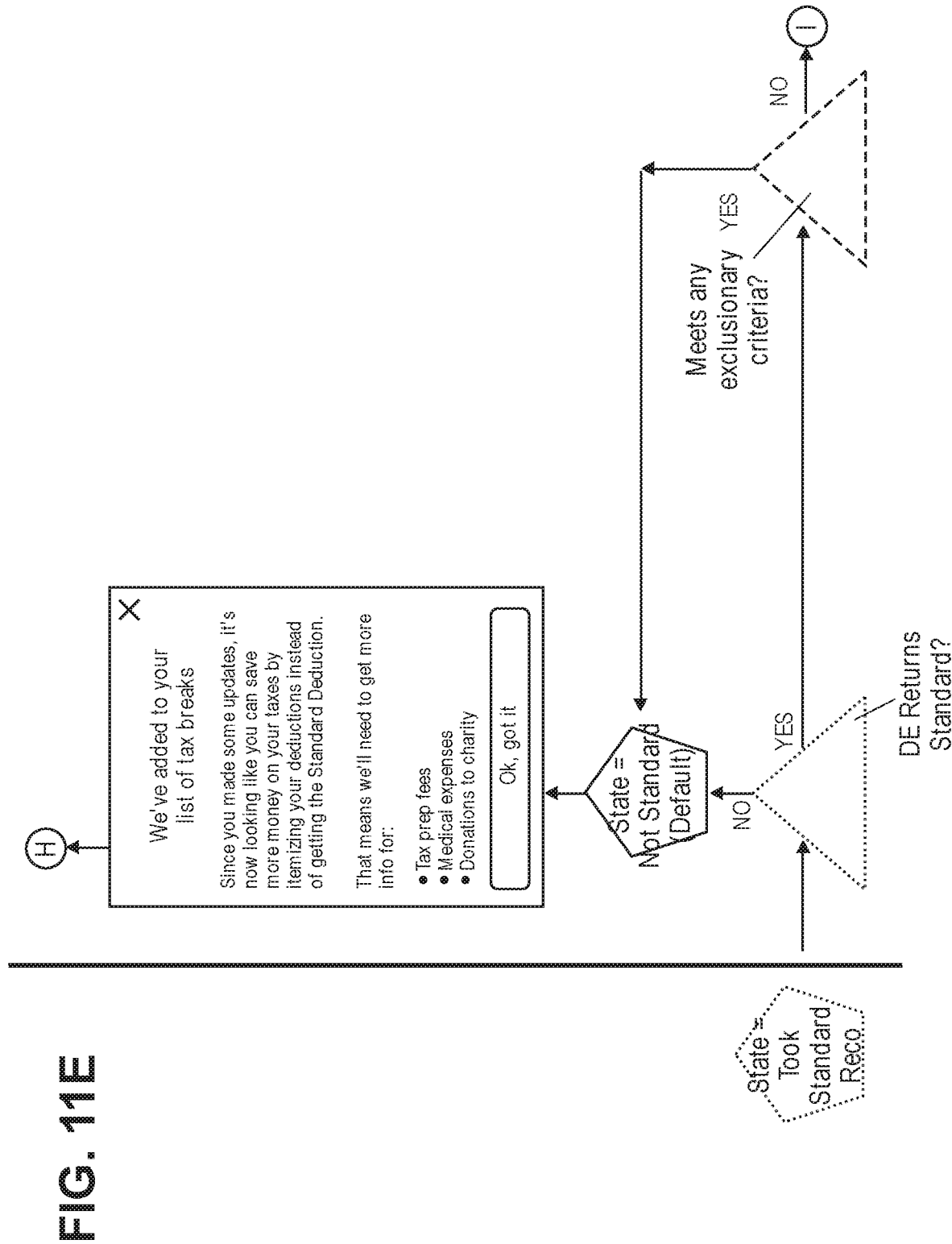
Figure 11F:
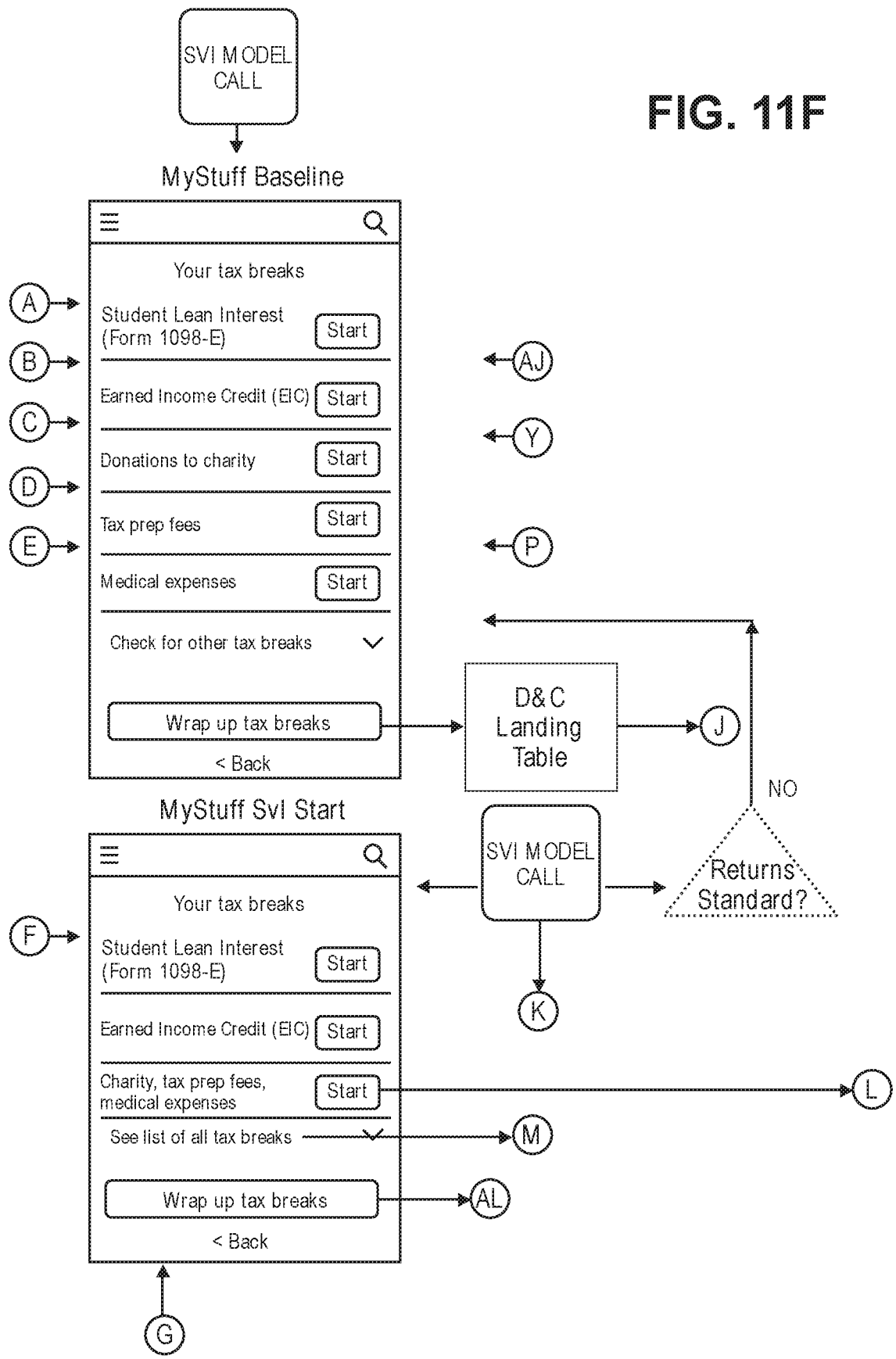
Figure 11G:
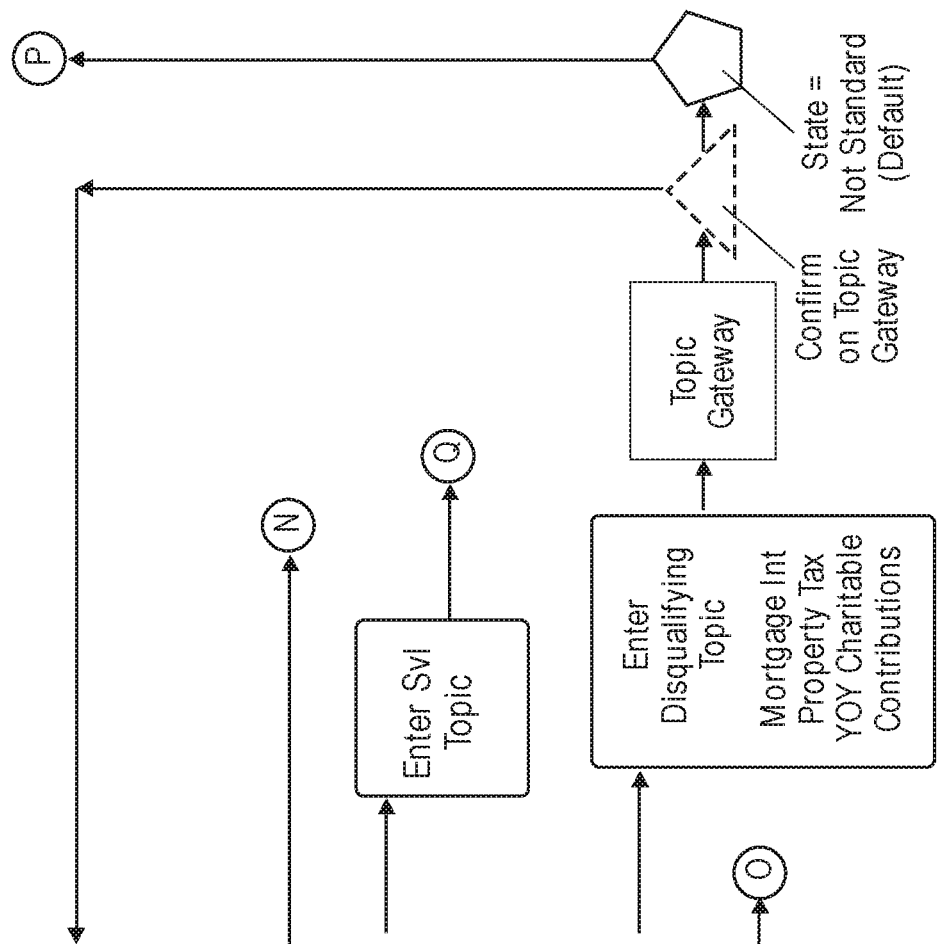
Figure 11H:
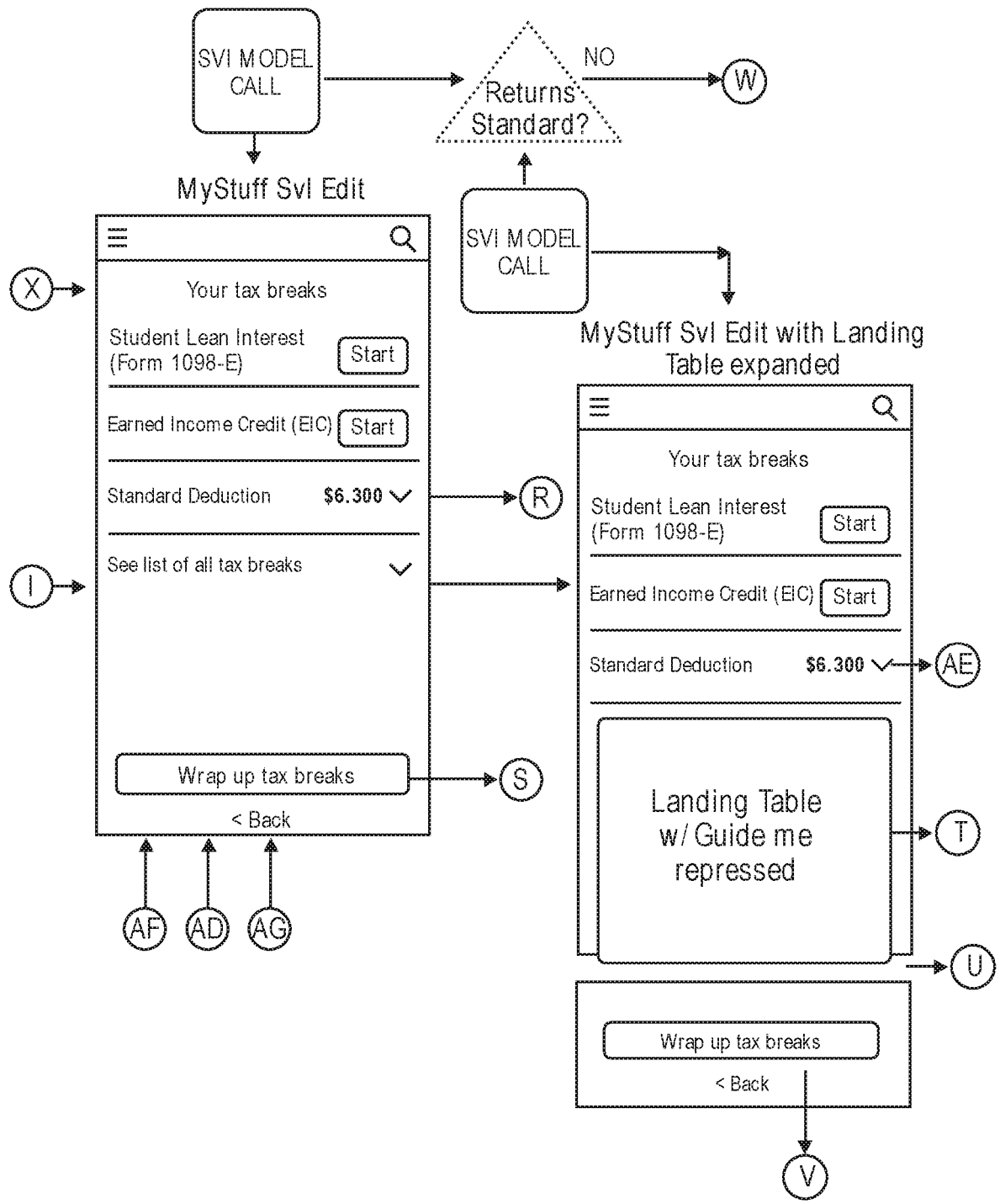
Figure 11I:
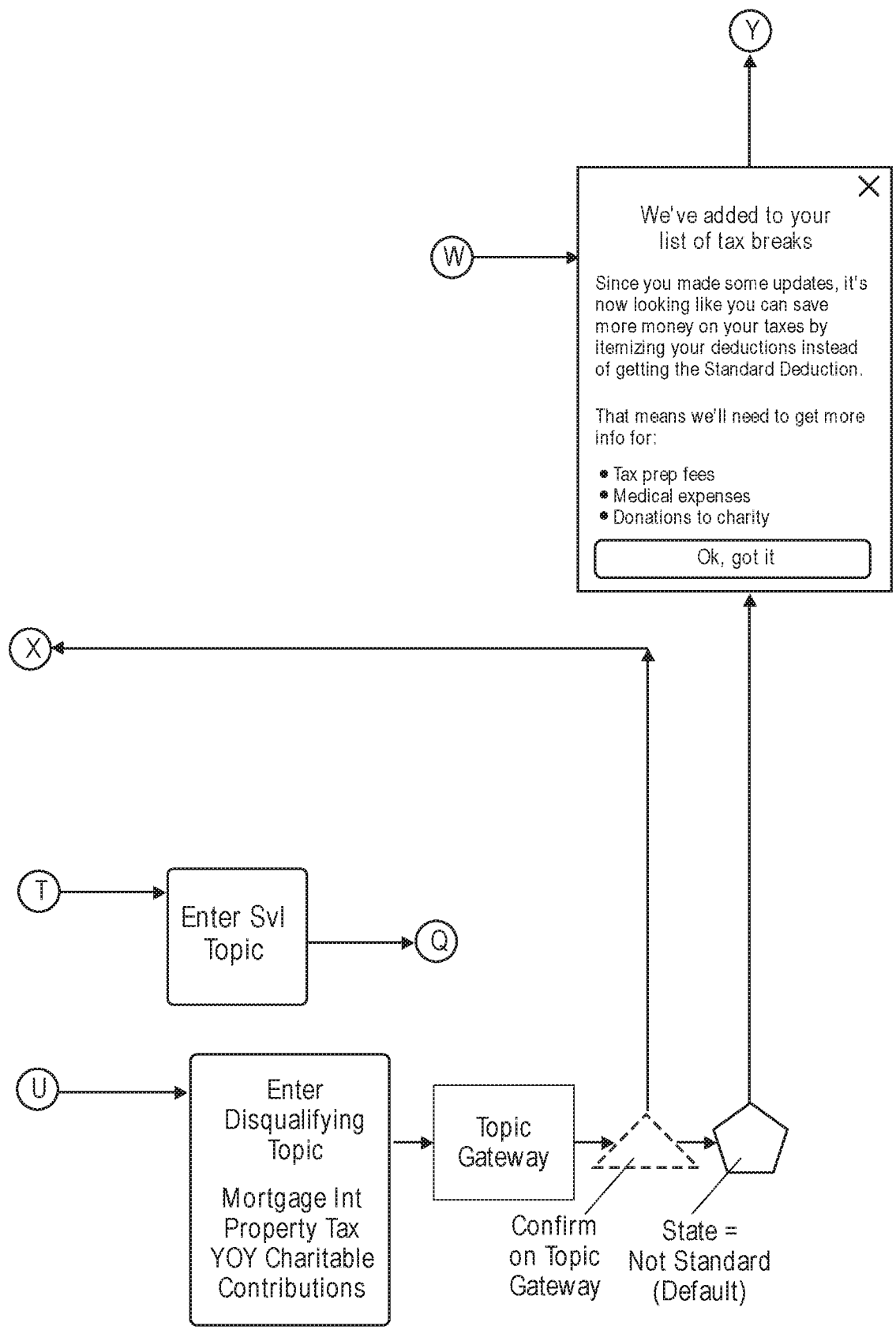
Figure 11J:
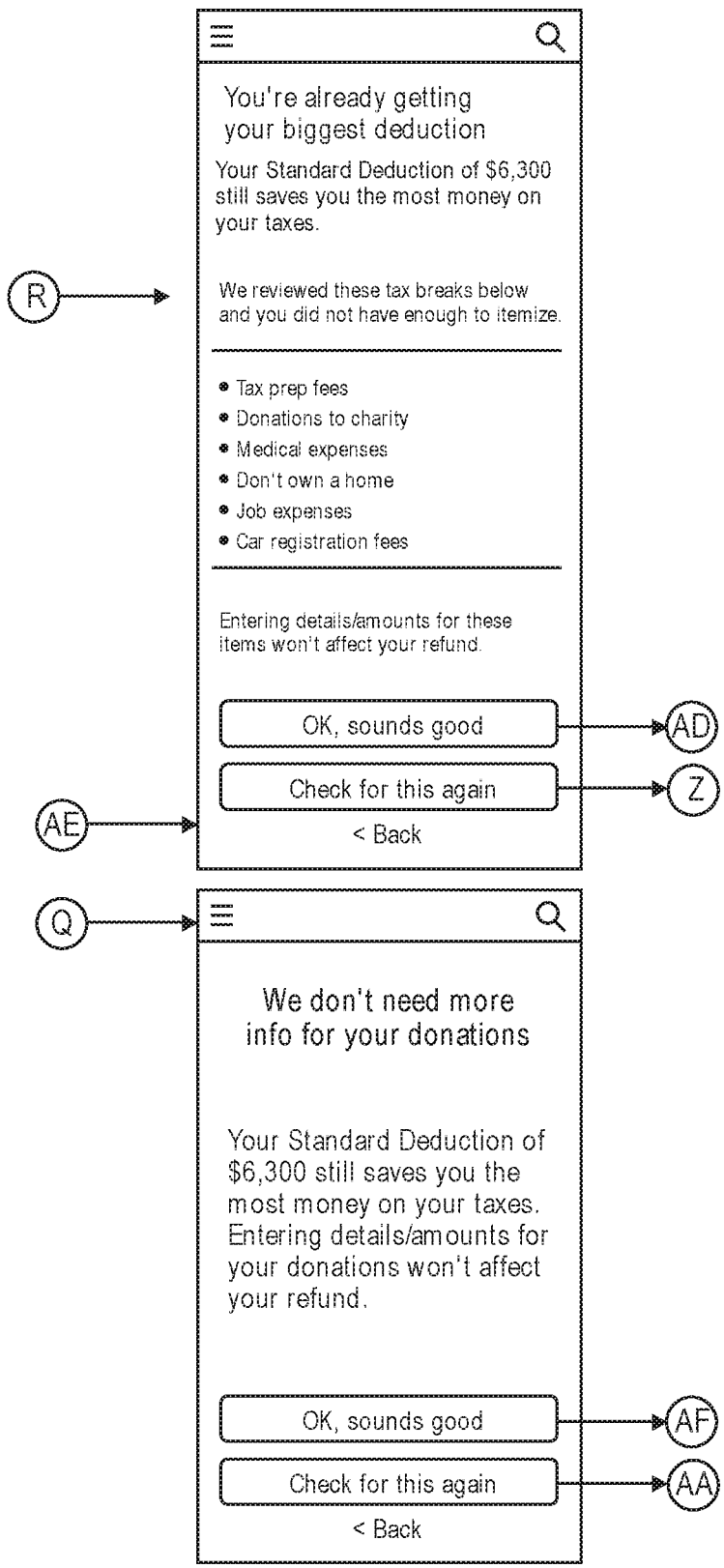
Figure 11K:
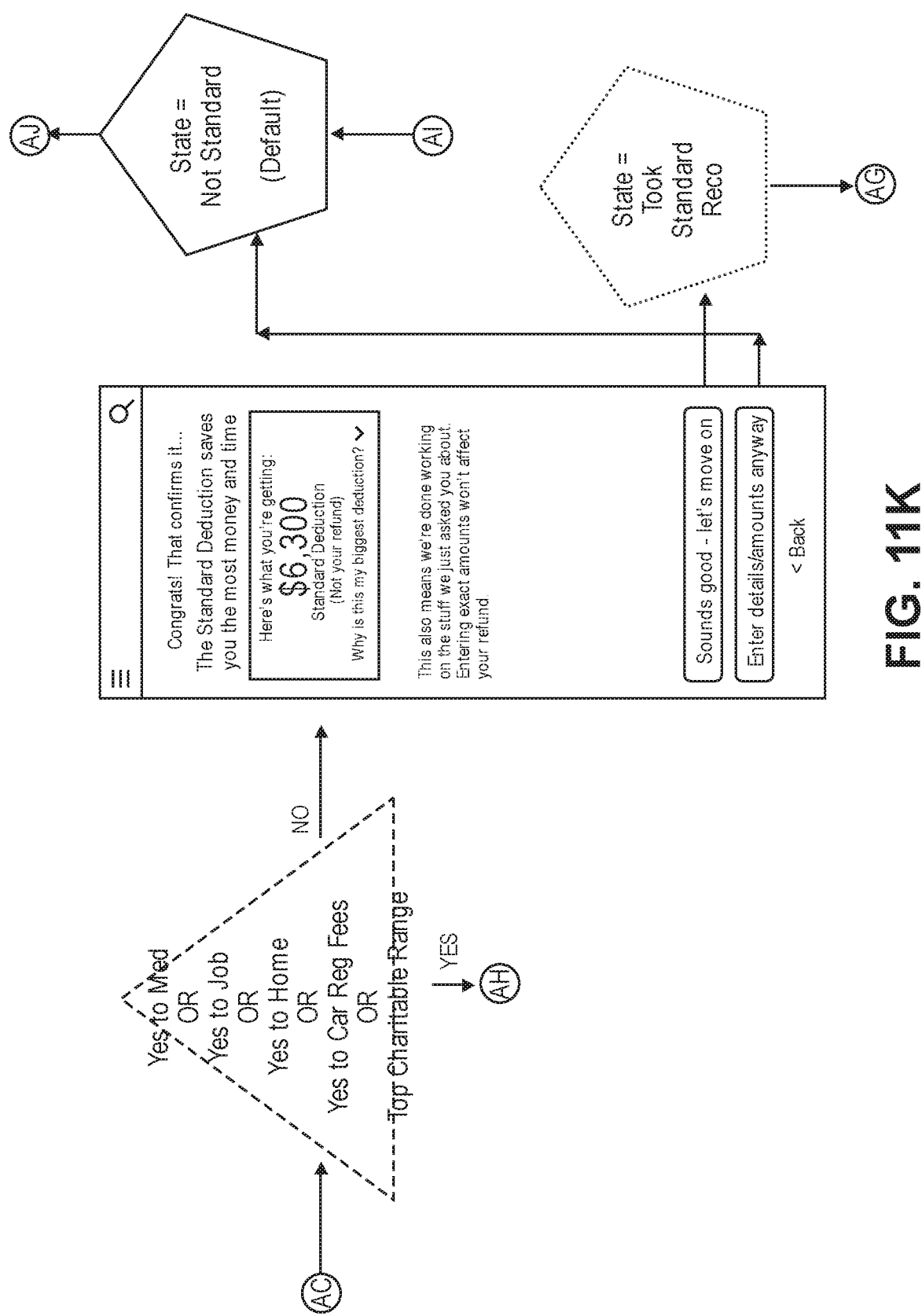
Figure 11L:
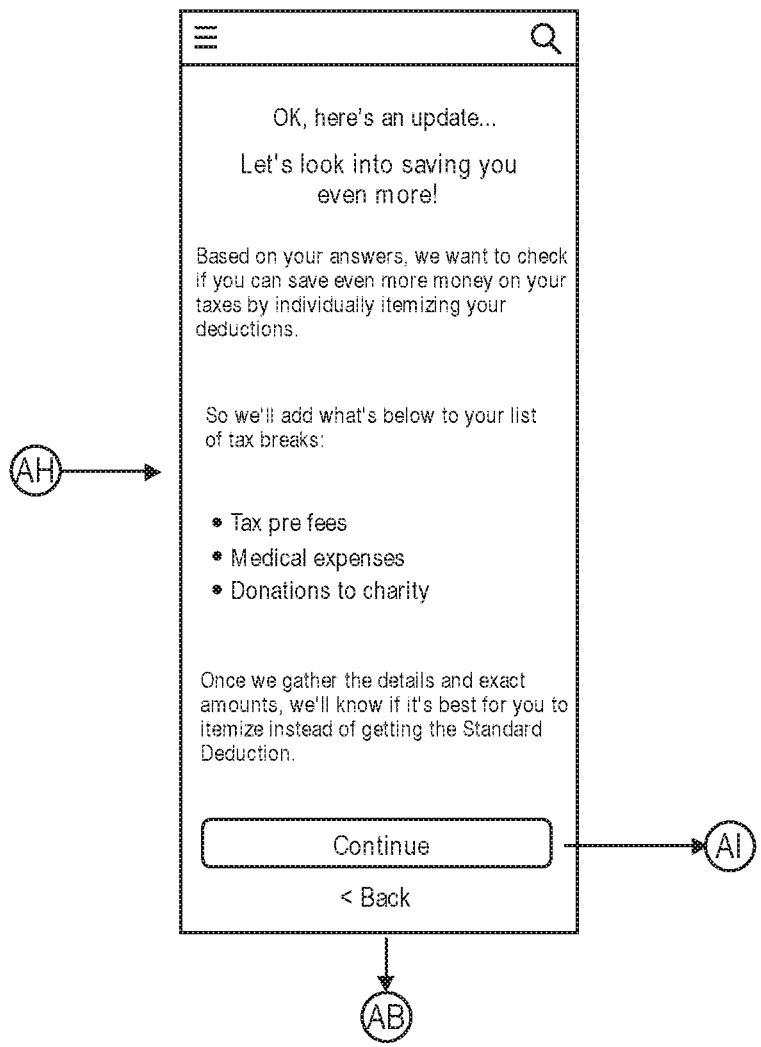
Figure 11M:
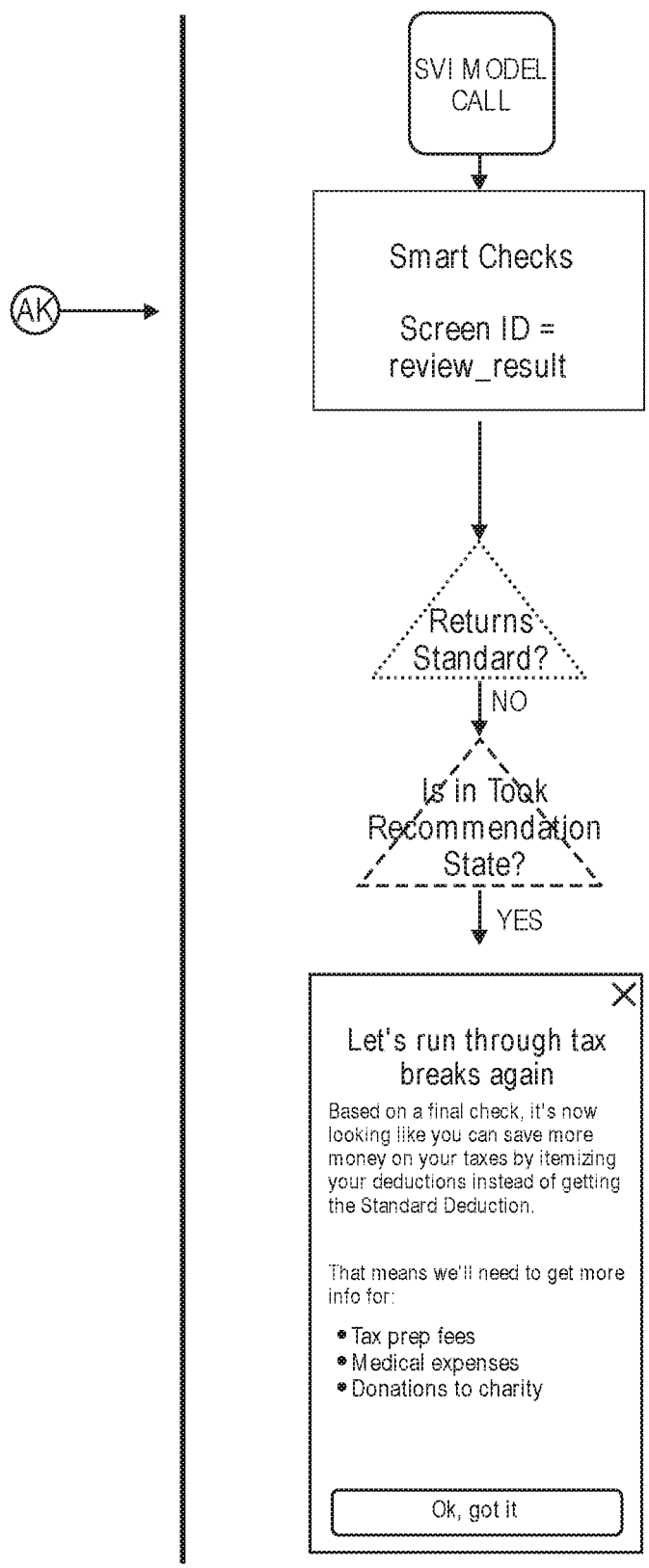
Figure 11N:
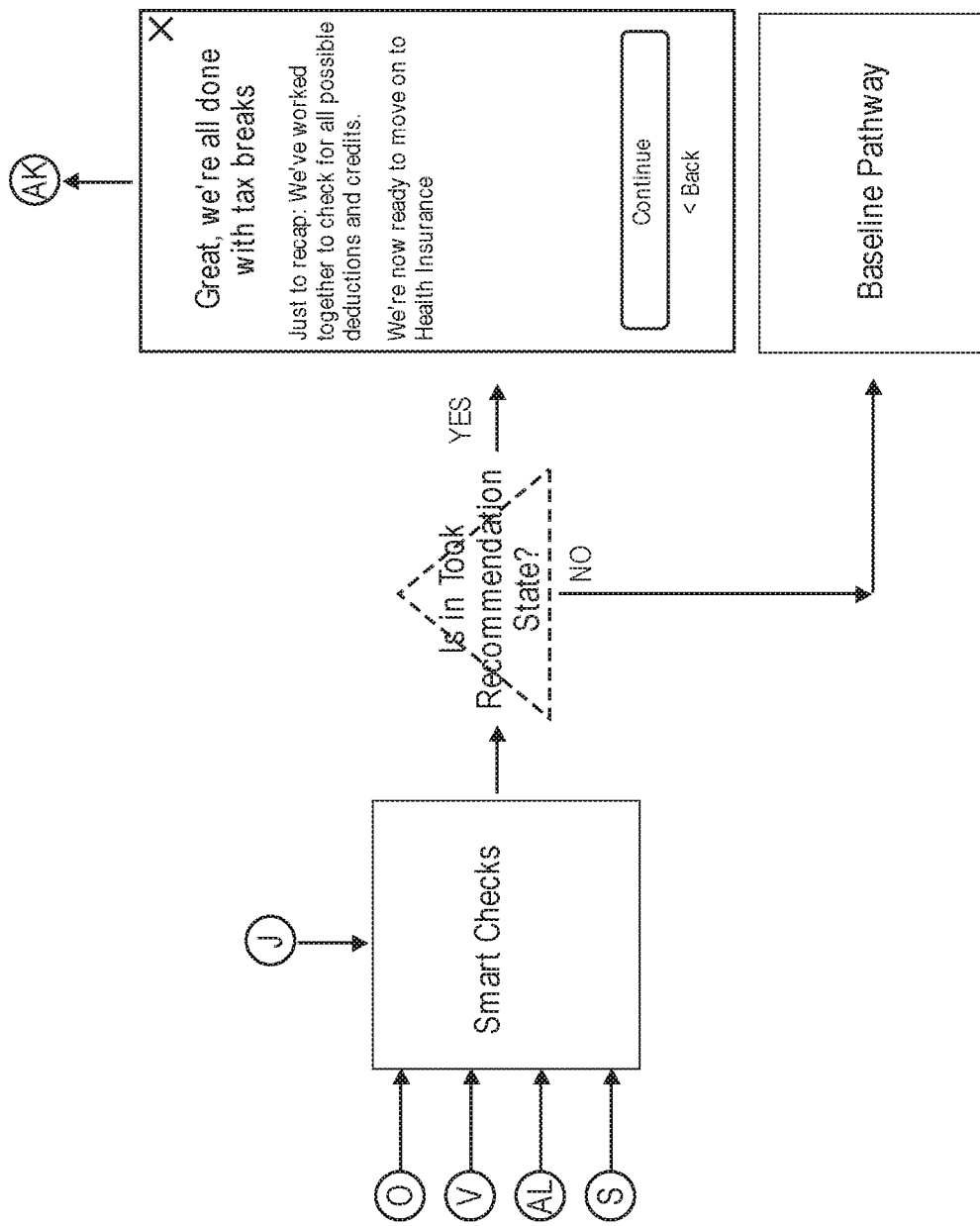

Moreover, while embodiments have been described with reference to FIGS. 1A-6, and described with reference to exemplary interview screens or UIs, FIGS. 8A-K, 9A-B, 10A-C and 11A-N provide additional examples of process flows and UIs that involve various types of user input (including "MyStuff" and topic landing tables discussed above), and standard vs. itemized deduction determinations, interview screens and how svi, confirmation and override modules are implemented for svi predictive model confirmation, e.g., using UI 500 as discussed with reference to FIG. 5 and also as shown in FIGS. 8G and 11J, for example.

Further, where methods and steps described above with reference to various system-flow diagrams indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various system-flow diagrams are not intended to be limited to a particular sequential order, unless otherwise stated or required.

Accordingly, embodiments are intended to exemplify alternatives, modifications, and equivalents that may fall within the scope of the claims.

APPENDIX

Examples of Analytic Data Element Inputs that May be Utilized

Current Year Tax Fields:
ZIP,
FILING_STATUS,
OTHER_STATE_INCOME,
OCCUPATION_TAXPAYER,
OCCUPATION_SPOUSE,
AGE_TAXPAYER,
AGE_SPOUSE,
TAXPAYER_CAN_BE_CLAIMED,
SPOUSE_CAN_BE_CLAIMED,
TAXPAYER_CLAIMED,
SPOUSE_CLAIMED,
DEPENDENT_CODE_L,
DEPENDENT_CODE_N,
DEPENDENT_CODE_O,
DEPENDENT_CODE_Q,
DEPENDENT_CODE_X,
FLAG_ITEMIZE_SEPARATELY,
FLAG_OLD_OR_BLIND,
RETURNING,
MFS_SPOUSE_ITEMIZED,
AGI,
AMOUNT_SALARIES_AND_WAGES,
AMOUNT_TAXABLE_INTEREST,
AMOUNT_ORDINARY_DIVIDENDS,
AMOUNT_QUALIFIED_DIVIDENDS,
AMOUNT_BUSINESS_INCOME,
AMOUNT_FARM_INCOME,
AMOUNT_CAPITAL_GAIN,
AMOUNT_TAXABLE_IRA,
AMOUNT_TAXABLE_PENSIONS,
AMOUNT_UNEMPLOYMENT,
AMOUNT_TAXABLE_SOCIAL_SEC,
AMOUNT_STATE_LOCAL_TAX,
AMOUNT_IRA_DISTRIBUTIONS,
AMOUNT_PENSIONS,
AMOUNT_SOCIAL_SEC,
AMOUNT_STATE_LOCAL_TAX_ACTUAL,
AMOUNT_STATE_LOCAL_SALES_TAX_ACTUAL,
AMOUNT_PERSONAL_PROPERTY_TAXES_ACTUAL,
AMOUNT_CHARITABLE_CONTRIBUTIONS_ACTUAL,
AMOUNT_STATE_LOCAL_SALES_TAX,
AMOUNT_PERSONAL_PROPERTY_TAXES
AMOUNT_CHARITABLE_CONTRIBUTIONS,
COMPLETED_FLAG,
Previous Year Tax Fields:
PY_ITEMIZED_FLAG,
PY_AGI,
PY_AMOUNT_SALARIES_AND_WAGES,
PY_AMOUNT_TAXABLE_INTEREST,
PY_AMOUNT_ORDINARY_DIVIDENDS,
PY_AMOUNT_QUALIFIED_DIVIDENDS,
PY_AMOUNT_BUSINESS_INCOME, PY_AMOUNT_FARM_INCOME,
PY_AMOUNT_CAPITAL_GAIN,
PY_AMOUNT_TAXABLE_IRA,
PY_AMOUNT_TAXABLE_PENSIONS,
PY_AMOUNT_UNEMPLOYMENT,
PY_AMOUNT_TAXABLE_SOCIAL_SEC,
PY_AMOUNT_STATE_LOCAL_TAX,
PY_AMOUNT_IRA_DISTRIBUTIONS,
PY_AMOUNT_PENSIONS,
PY_AMOUNT_SOCIAL_SEC,
PY_AMOUNT_CHARITABLE_CONTRIBUTIONS,
PY_AMOUNT_STATE_LOCAL_SALES_TAX,
PY_AMOUNT_IRA_DEDUCTION,
PY_AMOUNT_STUDENT_LOAN_INTEREST_DEDUCTION,
PY_AMOUNT_REAL_ESTATE_TAX,
PY_AMOUNT_TAXES_PAID,
PY_AMOUNT_MEDICAL_DENTAL_EXPENSES,
PY_AMOUNT_PERSONAL_PROPERTY_TAXES,
PY_AMOUNT_OTHER_DEDUCTIBLE_TAXES,
PY_AMOUNT_MORTGAGE_INTEREST,
PY_AMOUNT_MORTGAGE_INTEREST_NON_1098,
PY_AMOUNT_MORTGAGE_POINTS_NON_1098,
PY_AMOUNT_MORTGAGE_INSURANCE,
PY_AMOUNT_INVESTMENT_INTEREST_PAID,
PY_AMOUNT_CASUALTY_LOSSES,
PY_AMOUNT_EMPLOYEE_EXPENSES,
PY_AMOUNT_TAX_PREP_FEES,
PY_AMOUNT_OTHER_DEDUCTIBLE_EXPENSES,
click streams:
Click to S1040PERbfdi10103342,
Click to S1040PERbfdi4180,
Click to S1040PERbfdi7886,
Click to S1040PERbfdi85682126,
Click to S1040PERbfdi85682127,
Click to S1040PERbfdi2151,
Click to S1040PERbfdi10103311,
Click to S1040PERbfdi10103886,
Click to S1040PERbfdi10103333,
Click to S1040PERbfdi3402,
Click to S1040PERbfdi4147,
Click to S1040PERbfdi3344,
Click to S1040PERbfdi760,
Click to S1040PERbfdi3321,
Click to S1040PERbfdi7953,
Click to S1040PERbfdi3359,
Click to S1040PERbfdi10103291,
Click to S1040PERbfdi7554,
Click to S1040PERbfdi7960,
Click to S1040PERbfdi10103927,
Click to S1040PERbfdi4224,
Click to S1040PERbfdi997,
Click to S1040PERbfdi7336,
Click to S1040PERbfdi1875,
Click to S1040PERbfdi8358,
Click to S1040PERbfdi3346,
Click to S1040PERbfdi1386,
Click to S1040PERbfdi7423,
Click to S1040PERbfdi7345,
Click to S1040PERbfdi10102632,
Click to S1040PERbfdi10102661,
Click to S1040PERbfdi1686,
Click to S1040PERbfdi10102560,
Click to S1040PERbfdi8675,
Click to S1040PERbfdi146,
Click to S1040PERbfdi10103549,
Click to S1040PERbfdi867590,
Click to S1040PERbfdi10102770,
Click to S1040PERbfdi3360,
Click to AGE TILE,
Click to MARITAL_STATUS TILE,
Click to MOVED TILE,
Click to CHANGEDJOB TILE,
Click to MARITALCHANGE TILE,
Click to BOUGHTHOME TILE,
Click to SOCIALSECURITY TILE,
Click to REFINANCEDHOME TILE,
Click to OWNBUSINESS TILE,
Click to RAISEBONUS TILE,
Click to MARRIED TILE,
Click to RETIREMENTINCOME TILE,
Click to COLLEGETUITIONEXPENSES TILE,
Click to NEWCHILD TILE,
Click to SIDEJOB TILE,
Click to OTHER TILE,
Click to RETIREMENTWITHDRAWAL TILE,
Click to RECEIVEDUNEMPLOYMENT TILE,
Click to SOLDHOME TILE,
Click to FEELING
Click to HAD_A_JOB TILE,
Click to BANK_ACCOUNT_INTEREST TILE,
Click to UNEMPLOYMENT TILE,
Click to DONATIONS_TO_CHARITY_TILE,
Click to RETIREMENT_PLAN_WITHDRAWAL TILE,
Click to SIDE_JOB TILE,
Click to RECEIVED_DIVIDENDS TILE,
Click to COLLEGE TILE,
Click to STUDENT_LOAN_INTEREST TILE,
Click to SSA TILE,
Click to SOLD_STOCKS TILE,
Click to OWNED_A_BUSINESS TILE,
Click to ALIMONY TILE,
Click to JOB_EXPENSES TILE,
Click to CHILD_CARE TILE,
Click to GAMBLING TILE,
Click to RETIREMENT_SAVINGS TILE,
Click to MEDICAL_EXPENSES TILE,
Click to HSA TILE,
Click to CAR_STUFF TILE,
Click to RENTAL_PROPERTY TILE,
Click to MARITAL_STATUS TILE,
Click to PY_PREPARATION_METHOD
Click to FEELING TILE,
Click to SUPPORT_A_FAMILY_MEMBER TILE,
Click to RETIRED TILE,
Click to STUDENTS TILE,
Click to OWN_A_HOME TILE,
Click to RENT_A_HOME TILE,

What is claimed is:

1. A computing system implemented method, comprising:
receiving, by a computerized tax return preparation system, stored in a memory of a computing system and executed by a processor of the computing system and operable to prepare and electronically file an electronic tax return, taxpayer data that has been entered into the electronic tax return;
executing, by the computerized tax return preparation system, a first predictive model, wherein the received taxpayer data is an input to the first predictive model;
personalizing, by the computerized tax return preparation system, the taxpayer's user experience by:
modifying a state of the computerized tax return preparation system from an itemized deduction state, in which a default set of questions and a default set of response options with a first range of numerical data is available for presentation through a personalized user interface, to a standard deduction state, in which a reduced set of questions including fewer questions than the default set, and a second set of response options with a second range of numerical data, is available for presentation through the personalized user interface, wherein the first range of numerical data is different from the second range of numerical data, based at least in part upon a result generated by the first predictive model, generating, during preparation of the electronic tax return, the personalized user interface in response to the modifying, the personalized user interface including interactive user interface elements that are selectable by manipulation of an input element of the computing system and that are not pre-defined, programmed components of the computerized tax return preparation system, the interactive user interface elements including:

a plurality of questions and respective response options for respective questions determined by the computerized tax return preparation system based at least in part upon execution of a first data analytics element with the received taxpayer data as an input after modification to the standard deduction state, interactive user interface elements that are encoded for respective response options, wherein respective interactive user interface elements are associated with respective questions and are selectable to answer respective questions in the personalized user interface, and respective ranges of numerical data associated with respective determined questions and respective response options and that are personalized for the received taxpayer data, wherein respective interactive user interface elements for respective response options are selectable by use of an input device of the computing system and through a display screen, a generated interactive user interface element is selected without entering specific electronic tax return data, data of the selected interactive interface element is not entered into the electronic tax return, and the respective ranges of numerical data are determined by execution of the first data analytics element comprising a second predictive model different from the first predictive model, and a result generated by execution of the second predictive model is also an input to the first predictive model;

confirming, by the computerized tax return preparation system, the standard deduction state; and in response to the confirming, bypassing, by the computerized tax return preparation system, itemized deduction questions to reduce a number of questions presented to a preparer and computing system resources required to prepare the electronic tax return based on response options corresponding to respective selected interactive user interface elements.

2. The computing system implemented method of claim 1, the generated user interface comprising a plurality of questions, each question being associated with a plurality of interactive user interface elements that are encoded as respective response options to a question.

3. The computing system implemented method of claim 1, the generated user interface comprising at least one determined question and associated generated interactive user interface elements encoded as binary response options.

4. The computing system implemented method of claim 1, wherein the determined question and associated response options are determined by execution of the first data analytics element comprising programmed logic of the computerized tax return preparation system.

5. The computing system implemented method of claim 1, the generated user interface including at least one determined question associated with generated interactive user interface elements encoded as response options for respective determined ranges of numerical data reflective of the taxpayer's electronic tax return data.

6. The computing system implemented method of claim 1, wherein each of the first predictive model and the second predictive model is a logistic regression model; naive bayes model; k-means classification model; K-means clustering model; other clustering techniques model; k-nearest neighbor model; neural networks model; decision trees model; random forests model; boosted trees model; k-nn classification model; kd trees model; generalized linear model; or support vector machines model.

7. The computing system implemented method of claim 1, the generated user interface comprising:
at least one determined question associated with interactive user interface elements encoded with interactive binary response options; and
at least one determined question specifying a determined range of numerical data and associated with interactive binary response options.

8. The computing system implemented method of claim 1, wherein respective generated interactive user interface elements are encoded as respective response options for respective ranges of numerical data determined by execution of the first data analytics element such that text of the determined question for respective response options does not include numerical data ranges.

9. The computing system implemented method of claim 1, wherein both of the first predictive model and the second predictive model receive the taxpayer data as an input.

10. The computing system implemented method of claim 9, wherein the second predictive model is a charitable contribution predictive model, a job expense predictive model, a medical expense predictive model, or an income tax predictive model.

11. The computing system implemented method of claim 10, wherein a result generated by execution of the second predictive model is an input to the first predictive model that is executed to determine whether to modify the user experience state and is also utilized to determine questions and respective response options for confirming the modified user experience.

12. The computing system implemented method of claim 10, wherein the second predictive model is executed independently of the first predictive model and after the first predictive model has determined to modify the user experience.

13. The computing system implemented method of claim 1, the received taxpayer data comprising at least one of:
data that is manually entered into the electronic tax return by the preparer, and electronic data that is imported into the electronic tax return from an electronic source.

14. The computing system implemented method of claim 1, wherein the determined questions and respective response options involve tax return preparation application fees, charitable donations, medical expenses, employment expenses, automobile registration fees, home ownership, or a combination thereof.

15. The computing system implemented method of claim 1, wherein the determined questions and respective response options are presented in the generated user interface comprising a single screen view in an interview screen generated by the tax return preparation system.

16. The computing system implemented method of claim 1, wherein the determined questions and respective response options are generated based at least in part upon execution of the first data analytics element of a first type and a second data analytics element of a second type different from the first type.

17. The computing system implemented method of claim 1, wherein an interactive user interface element encoded as a response option is selectable by the input device comprising a computer mouse, a keyboard or a touchscreen.

18. The computing system implemented method of claim 1, wherein the personalized user interface is inoperable to receive the preparer's selection of an interactive user interface element associated with a response option to answer a determined question.

\* \* \* \* \*